US012801247B2

(12) United States Patent
Shimizu et al.

(10) Patent No.: US 12,801,247 B2
(45) Date of Patent: Nov. 17, 2026

(54) SENSOR, ARTICLE, METHOD FOR MANUFACTURING SENSOR, AND CONDUCTOR

(71) Applicant: DAI NIPPON PRINTING CO., LTD., Tokyo (JP)

(72) Inventors: Yuji Shimizu, Tokyo (JP); Takashi Takekoshi, Tokyo (JP); Hiroaki Mutou, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 18/247,375

(22) PCT Filed: Sep. 29, 2021

(86) PCT No.: PCT/JP2021/035938
§ 371 (c)(1),
(2) Date: Aug. 23, 2023

(87) PCT Pub. No.: WO2022/071422
PCT Pub. Date: Apr. 7, 2022

(65) Prior Publication Data

US 2023/0418424 A1 Dec. 28, 2023

(30) Foreign Application Priority Data

Sep. 30, 2020 (JP) ................................ 2020-166235
Dec. 1, 2020 (JP) ................................ 2020-199842

(51) Int. Cl.
*G06F 3/044* (2006.01)

(52) U.S. Cl.
CPC .. *G06F 3/0446* (2019.05); *G06F 2203/04103* (2013.01); *G06F 2203/04111* (2013.01)

(58) Field of Classification Search
CPC ......... G06F 3/0446; G06F 2203/04103; G06F 2203/04111
See application file for complete search history.

(56) References Cited

U.S. PATENT DOCUMENTS 7,675,303 B2 * 3/2010 Kimura .............. G01R 31/2808 439/91
2011/0134055 A1 6/2011 Jung et al.
(Continued)

FOREIGN PATENT DOCUMENTS

JP 2010-231288 10/2010
JP 2011-076155 4/2011
(Continued)

OTHER PUBLICATIONS

International Preliminary Report on Patentability, issued in the corresponding PCT application No. PCT/JP2021/035938, dated Mar. 28, 2023, 14 pages with the translation.
(Continued)

*Primary Examiner* — Ariel A Balaoing
(74) *Attorney, Agent, or Firm* — HSML P.C.

(57) ABSTRACT

One aspect of the present invention provides a sensor 10 including: a base material 11; a first electroconductive part 12 provided on a first face 11A side of the base material 11; and a second electroconductive part 13 provided on the first face 11A side of the base material 11, and disposed apart from the first electroconductive part 12; wherein the first electroconductive part 12 has a plurality of first electrode portions 12A and a wiring portion 12B electrically connecting the first electrode portions 12A adjacent to each other; wherein the second electroconductive part 13 has a plurality of second electrode portions 13A, and a bridge wiring portion 13B straddling the wiring portion 12B and electrically connecting the second electrode portions 13A adjacent to each other; and wherein the bridge wiring portion 13B
(Continued)

contains a resin portion 17B and an electroconductive fiber 18B disposed in the resin portion 17B.

6 Claims, 17 Drawing Sheets

(56) References Cited

U.S. PATENT DOCUMENTS

| | | | | |
|---|---|---|---|---|
| 2011/0148780 | A1* | 6/2011 | Lu | G06F 3/0446 29/829 |
| 2012/0056664 | A1 | 3/2012 | Nam | |
| 2012/0113021 | A1 | 5/2012 | Liu et al. | |
| 2012/0234663 | A1 | 9/2012 | Hwang et al. | |
| 2014/0125731 | A1 | 5/2014 | Katsuragi | |
| 2014/0174902 | A1 | 6/2014 | Yang et al. | |
| 2014/0191771 | A1 | 7/2014 | Nam et al. | |
| 2015/0004327 | A1* | 1/2015 | Yamamoto | H05K 1/11 174/253 |
| 2015/0041302 | A1 | 2/2015 | Okumura et al. | |
| 2015/0060252 | A1* | 3/2015 | Wang | G06F 3/0412 200/5 R |
| 2015/0138138 | A1 | 5/2015 | Chung et al. | |
| 2016/0073494 | A1 | 3/2016 | Uchida et al. | |
| 2019/0220117 | A1 | 7/2019 | Yamai et al. | |
| 2019/0283128 | A1 | 9/2019 | Saito et al. | |
| 2019/0302925 | A1* | 10/2019 | Ogumi | B32B 23/00 |
| 2020/0057517 | A1 | 2/2020 | Ogumi et al. | |
| 2020/0183541 | A1* | 6/2020 | Toyooka | G06F 3/0418 |
| 2020/0321404 | A1* | 10/2020 | Kim | H10K 59/40 |
| 2021/0064164 | A1* | 3/2021 | Inou | B32B 27/36 |
| 2022/0083170 | A1 | 3/2022 | Liu et al. | |

FOREIGN PATENT DOCUMENTS

| | | | | |
|---|---|---|---|---|
| JP | 2011-254046 | | 12/2011 | |
| JP | 2012-519897 | | 8/2012 | |
| JP | 2013-530468 | | 7/2013 | |
| JP | 5245113 | | 7/2013 | |
| JP | 2013-206197 | | 10/2013 | |
| JP | 2013-206198 | | 10/2013 | |
| JP | 2014-111355 | | 6/2014 | |
| JP | 2015-056068 | | 3/2015 | |
| JP | 2015-081843 | | 4/2015 | |
| JP | 2016-057712 | | 4/2016 | |
| JP | 2017-066471 | | 4/2017 | |
| KR | 10-1311750 | | 9/2013 | |
| TW | 201401144 | | 1/2014 | |
| TW | 1444866 | | 7/2014 | |
| WO | 2013/146859 | | 10/2013 | |
| WO | 2013/151052 | | 10/2013 | |
| WO | 2013/158699 | | 10/2013 | |
| WO | 2018/066214 | | 4/2018 | |
| WO | WO2018062517 | * | 5/2018 | G06F 3/041 |
| WO | 2019/065064 | | 4/2019 | |

OTHER PUBLICATIONS

International Search Report, issued in the corresponding PCT application No. PCT/JP2021/035938, dated Dec. 28, 2021, 8 pages with the translation.
US Non-final Office Action, issued in the corresponding U.S. Appl. No. 18/987,571, dated Nov. 28, 2025, 44 pages.
Japanese Decision of Refusal, issued in the corresponding Japanese patent application No. 2022-554055, dated Sep. 2, 2025, 5 pages with the machine translation.
First Taiwanese Office Action and Search Report, issued in the corresponding Taiwanese patent application No. 110136263, dated Jun. 30, 2025, 12 pages.
US Final Office Action, issued in the corresponding U.S. Appl. No. 18/987,571, dated May 22, 2026, 24 pages.
Reconsideration Report by Examiner before Appeal, issued in the corresponding Japanese patent application No. 2022-554055, dated Mar. 4, 2026, 5 pages with the machine translation.

* cited by examiner

SENSOR, ARTICLE, METHOD FOR MANUFACTURING SENSOR, AND CONDUCTOR

CROSS-REFERENCE TO RELATED APPLICATION

The present application enjoys the benefit of priority to the prior Japanese Patent Application Publication Nos. 2020-166235 (filed on Sep. 30, 2020) and 2020-199842 (filed on Dec. 1, 2020), the entire disclosures of which are incorporated herein by reference.

TECHNICAL FIELD

The present invention relates to a sensor, an article, a method of producing the sensor, and an electric conductor.

BACKGROUND ART

A recent image display device such as a smartphone or a tablet terminal may include a touch sensor that enables direct input of information by touching an image display screen with a finger or the like.

A sensor such as a touch sensor usually includes an electroconductive part patterned in predetermined shape on a base material. Indium tin oxide (ITO) is mainly used as an electroconductive material for such an electroconductive part. However, ITO lacks flexibility, and an electroconductive part produced using ITO is thus prone to crack in cases where a flexible base material is used as a base material.

Accordingly, use of a metallic nanowire having a nanosized fiber diameter is currently studied as a substitute for ITO used as an electroconductive material to constitute the electroconductive part.

On the other hand, there is a sensor known as a bridge type sensor. A bridge type sensor includes: a base material; a first electroconductive part formed on one side of the base material, and extending, for example, in the X direction; and a second electroconductive part disposed apart from the first electroconductive part, and extending, for example, in the Y direction. The first electroconductive part has a first electrode portion and a wiring portion, and the second electroconductive part has a second electrode portion and a bridge wiring portion formed to straddle the wiring portion of the first electroconductive part, and dispose the second electroconductive part apart from the first electroconductive part (see, for example, Patent Literature 1).

In cases where the second electrode portion is constituted by electroconductive nanowires, and where the bridge wiring portion is constituted by an oxide-based material such as ITO, the oxide-based material is present densely, thus causing the refractive index of the surface of the bridge wiring portion to be higher. Accordingly, a difference in the refractive index between the electrode portion and the bridge wiring portion makes the bridge wiring portion more visible.

Conventional examples of a known technology for making a bridge wiring portion invisible include: controlling the refractive index; making the wiring of a bridge wiring portion thinner; and the like. According to Patent Document 1, a reflection-decreasing layer is formed to cover an electrode portion and a bridge wiring portion in order to control the refractive index.

PRIOR ART DOCUMENTS

Patent Document

Patent Document 1: WO2018-066214

SUMMARY OF THE INVENTION

However, a large amount of labor and cost is necessary for making a bridge wiring portion invisible using a conventional invisibilizing technology, such as controlling the refractive index with a reflection-decreasing layer as in Patent Literature 1, or making the wiring of a bridge wiring portion thinner. Accordingly, in respect of making a bridge wiring portion invisible, there is a demand for a new invisibilizing technology different from a conventional one.

In addition, it has been desired in recent years that a metal nanowire pattern containing a metal nanowire is formed on the three-dimensional surface of a three-dimensional object having any of various shapes. However, when an attempt is made to form such a metal nanowire pattern on a three-dimensional surface, the aspect ratio of the metal nanowire is influential, hindering the metal nanowire from being applied uniformly, and thus, making it difficult to obtain the performance suitable for the purpose. Hence, the conformity to a three-dimensional surface has not been achieved.

The present invention is designed to solve the above-described problems. That is, an object of the present invention is to provide: a sensor that has good flexibility, and can achieve the invisibility of a bridge wiring portion using a new invisibilizing technology different from a conventional one; an article including this sensor; and a method of producing such a sensor. Another object is to provide an electric conductor having an electroconductive fiber pattern that can conform to a three-dimensional surface having any of various shapes.

The present invention includes the following inventions.

[1] A sensor including: a base material; a first electroconductive part provided on a first face side of the base material; and a second electroconductive part provided on the first face side of the base material, and disposed apart from the first electroconductive part; wherein the first electroconductive part has a plurality of first electrode portions disposed in a first direction, and a wiring portion electrically connecting the first electrode portions adjacent to each other; wherein the second electroconductive part has a plurality of second electrode portions disposed in a second direction intersecting with the first direction, and a bridge wiring portion straddling the wiring portion and electrically connecting the second electrode portions adjacent to each other; and wherein the bridge wiring portion contains a resin portion and an electroconductive fiber disposed in the resin portion.

[2] A sensor including: a base material; a first electroconductive part provided on a first face side of the base material; and a second electroconductive part provided on the first face side of the base material, and disposed apart from the first electroconductive part; wherein the first electroconductive part has a plurality of first electrode portions disposed in a first direction, and a wiring portion electrically connecting the first electrode portions adjacent to each other; wherein the second electroconductive part has a plurality of second electrode portions disposed in a second direction intersecting with the first direction, and a bridge wiring portion straddling the wiring portion and electrically connecting the second electrode portions adjacent to each other; wherein the second electrode portion contains an electroconductive material; and wherein the bridge wiring portion contains a resin portion and an electroconductive material that is disposed in the resin portion, and is the same kind of electroconductive material contained in the second electrode portion.

[3] The sensor according to [2], wherein the electroconductive material of the second electrode portions and the electroconductive material of the bridge wiring portion are electroconductive fibers.

[4] The sensor according to any one of [1] to [3], wherein the second electrode portions have a width of 10 mm or less.

[5] The sensor according to any one of [1] to [4], wherein the bridge wiring portion has a width of 0.35 mm or more.

[6] The sensor according to any one of [1] to [5], wherein the first electrode portions and the wiring portion of the first electroconductive part each contain an electroconductive fiber.

[7] The sensor according to any one of [1] to [6], further including an electrically-insulating layer provided between the wiring portion and the bridge wiring portion.

[8] The sensor according to [7], wherein the absolute value of a difference in the refractive index between the bridge wiring portion and the electrically-insulating layer is 0.08 or less.

[9] An article including the sensor according to any one of [1] to [8].

[10] The article according to [9], wherein the article is an image display device.

[11] A method of producing a sensor, including the steps of: disposing, on a first face side of a base material, a first electroconductive fiber in each of a region in which a first electroconductive part is to be formed and a region in which a plurality of second electrode portions are to be formed, wherein the first electroconductive part has a plurality of first electrode portions disposed in a first direction, and has a wiring portion electrically connecting the first electrode portions adjacent to each other, and wherein the plurality of second electrode portions are disposed apart from the first electroconductive part, and disposed in a second direction intersecting with the first direction; forming an electrically-insulating layer to cover the first electroconductive fiber disposed in the region in which the wiring portion is to be formed; disposing, on the electrically-insulating layer, a second electroconductive fiber in a region in which a bridge wiring portion straddling the wiring portion and electrically connecting the second electrode portions adjacent to each other is to be formed; and forming a resin layer to cover the first electroconductive fiber and the second electroconductive fiber.

[12] The method of producing a sensor according to [11], wherein the step of disposing the first electroconductive fiber comprises the steps of: forming, on the first face side of the base material, an electroconductive layer containing a resin portion and the first electroconductive fiber; and removing, from the electroconductive layer, at least the first electroconductive fiber present in a region other than the region in which the first electroconductive part is to be formed and the region in which the second electrode portions are to be formed.

[13] The method of producing a sensor according to or [12], wherein the second electrode portions have a width of 10 mm or less.

[14] The method of producing a sensor according to any one of to [13], wherein the bridge wiring portion has a width of 0.35 mm or more.

[15] An electric conductor including: a three-dimensional object having a three-dimensional surface; and an electroconductive part provided on the three-dimensional surface and containing a first electroconductive fiber pattern composed of a plurality of electroconductive fibers and in conformity to the shape of the three-dimensional surface.

[16] The electric conductor according to [15], wherein the three-dimensional object comprises: a base material; a first electroconductive part provided on a first face side of the base material, having a plurality of first electrode portions disposed in a first direction, and having a wiring portion electrically connecting the first electrode portions adjacent to each other; second electroconductive fiber patterns provided on the first face side of the base material, disposed apart from the first electroconductive part, disposed in a second direction intersecting with the first direction, and composed of a plurality of electroconductive fibers; and an electrically-insulating layer provided on the wiring portion; wherein the three-dimensional surface is constituted by the surface of the electrically-insulating layer and the surface of the second electroconductive fiber patterns, and wherein the first electroconductive fiber pattern is formed on the adjacent surfaces of the second electroconductive fiber patterns and on the surface of the electrically-insulating layer between the second electroconductive fiber patterns in such a manner that the first electroconductive fiber pattern straddles the wiring portion, and electrically connects the second electroconductive fiber patterns adjacent to each other.

[17] A sensor including the electric conductor according to or [16].

[18] An article including the sensor according to [17].

[19] The article according to [18], wherein the article is an image display device.

[20] An aspect of the present invention and another aspect make it possible to provide: a sensor that has good flexibility, and can achieve the invisibility of a bridge wiring portion using a new invisibilizing technology different from a conventional one; an article including this sensor; and a method of producing such a sensor. Another aspect of the present invention makes it possible to provide an electric conductor including an electroconductive fiber pattern that can conform to a three-dimensional surface having any of various shapes.

DESCRIPTION OF EMBODIMENTS

Figure 1:
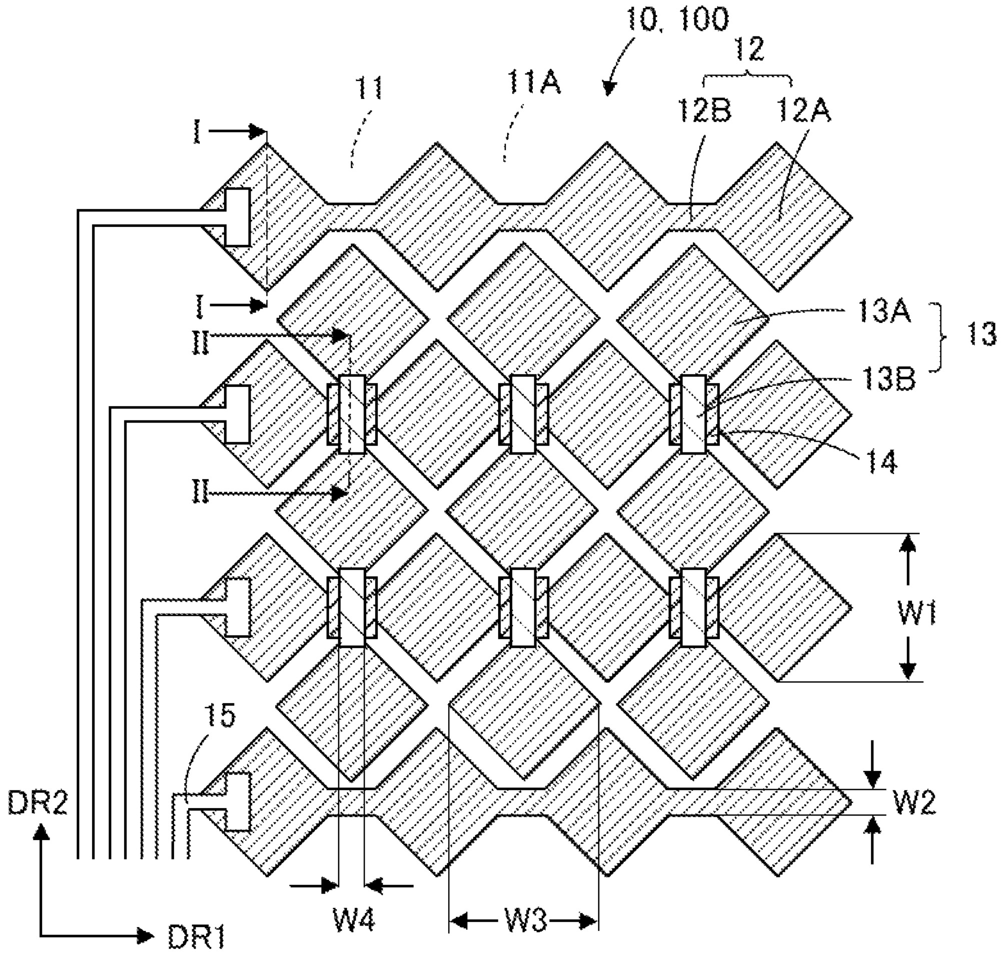
FIG. 1 is a schematic diagram of a sensor (electric conductor) according to an embodiment.
Figure 2:
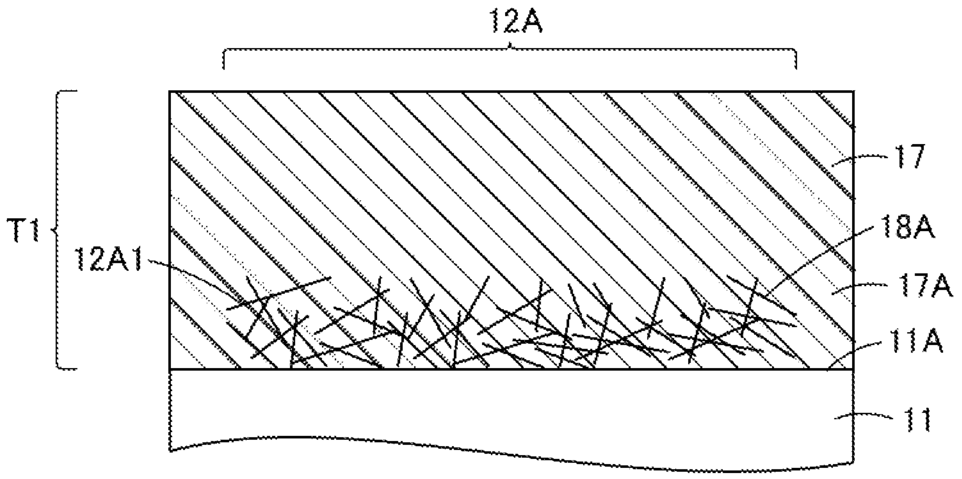
FIG. 2 is a cross-sectional view of the sensor depicted in FIG. 1, taken along line I-I.
Figure 3:
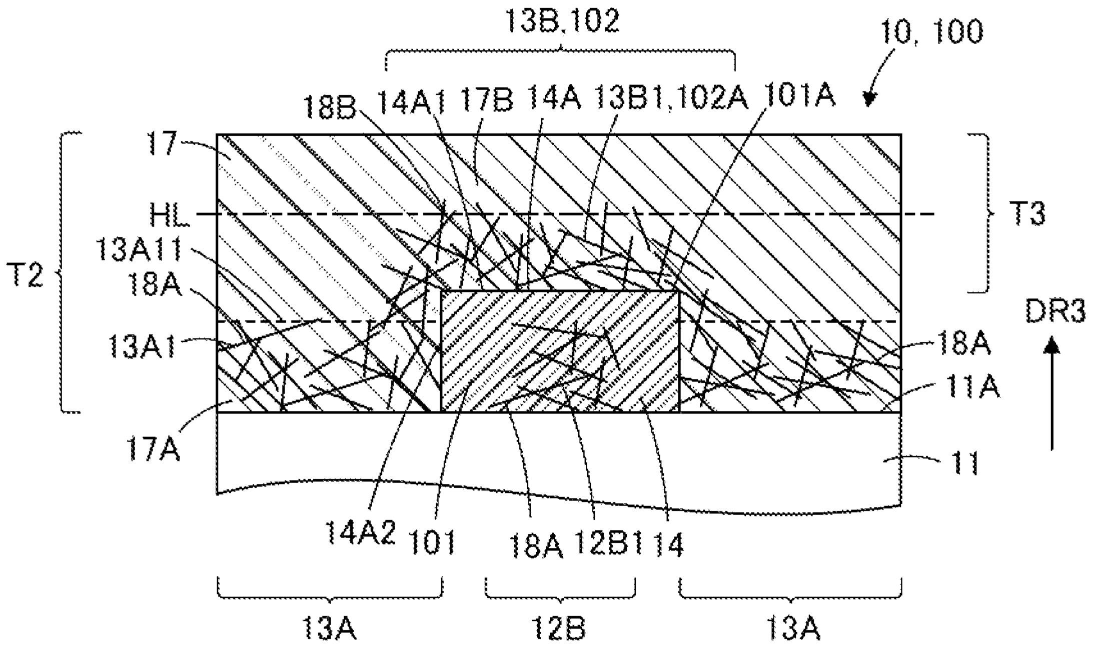
FIG. 3 is a cross-sectional view of the sensor depicted in FIG. 1, taken along line II-II.
Figure 4:
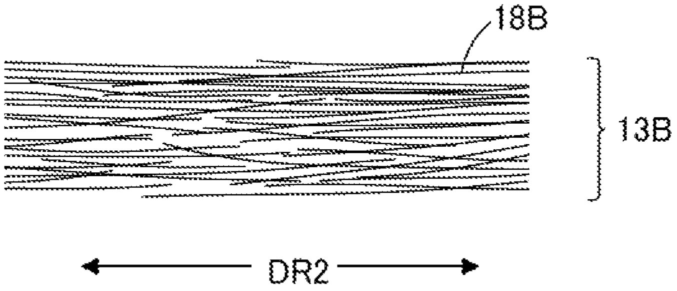
FIG. 4 is a top view of a bridge wiring portion of the sensor depicted in FIG. 1.
Figure 5:
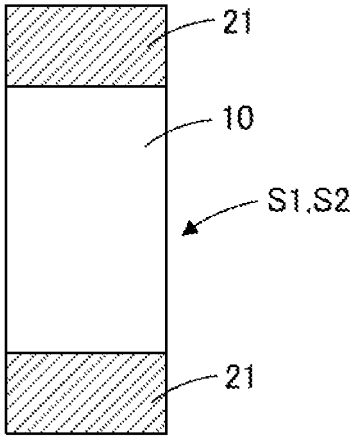
FIG. 5 is a top view of a sample S1 or S2 the electrical resistance value of which is to be measured.
Figure 6:
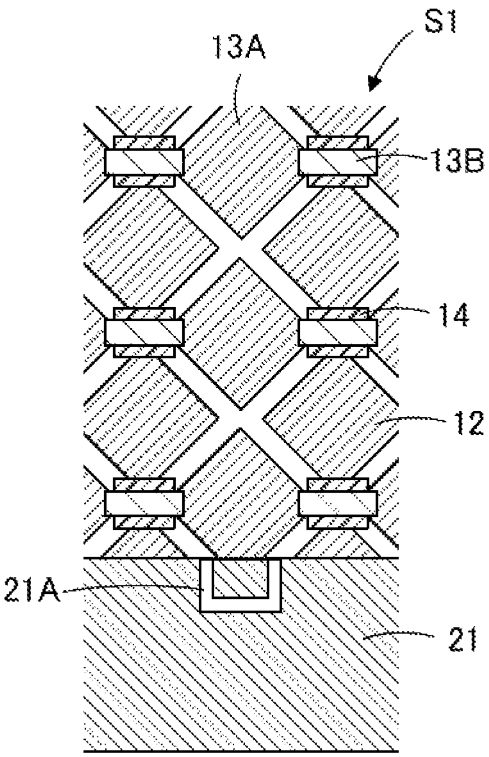
FIG. 6 is an enlarged view depicting a part of the sample S1 in FIG. 5.
Figure 7:
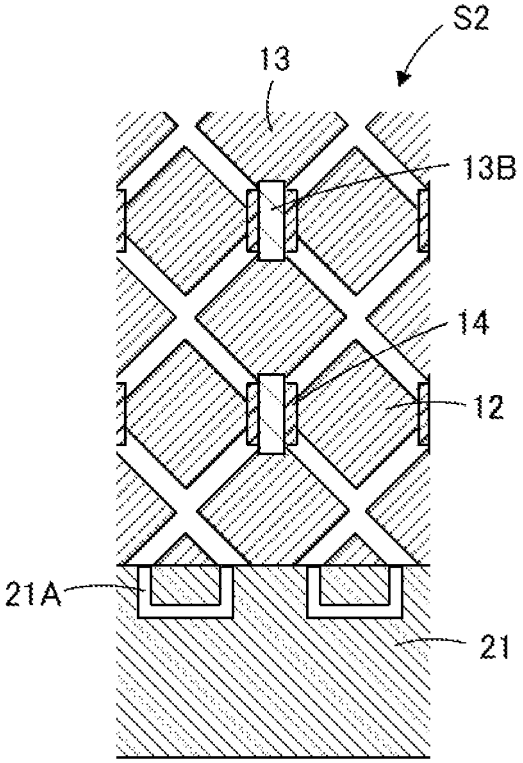
FIG. 7 is an enlarged view depicting a part of the sample S2 in FIG. 5.
Figure 8A:
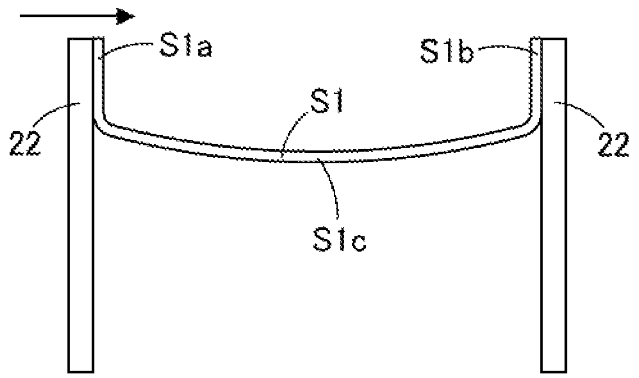
FIGS. 8(A) to 8(C) schematically illustrate each step of a foldability test.
Figure 8B:
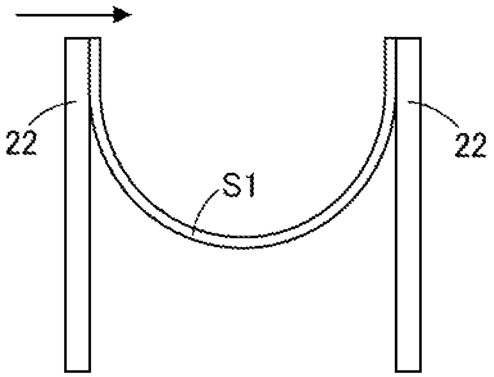
Figure 8C:
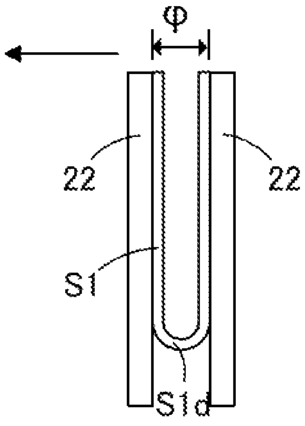
Figure 9:
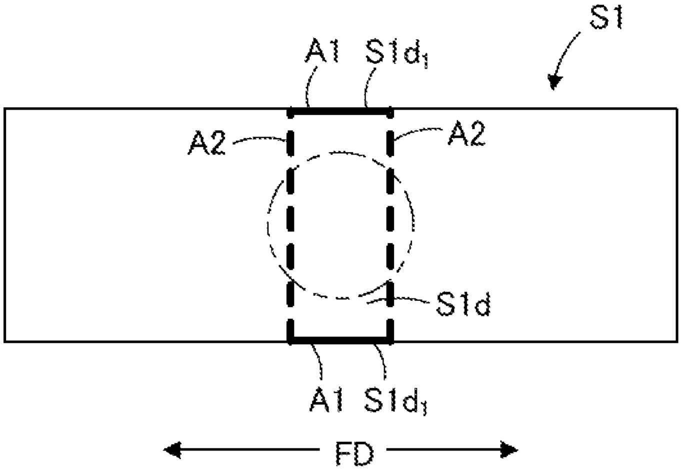
FIG. 9 is a top view of a sample tested in the foldability test.
Figure 10:
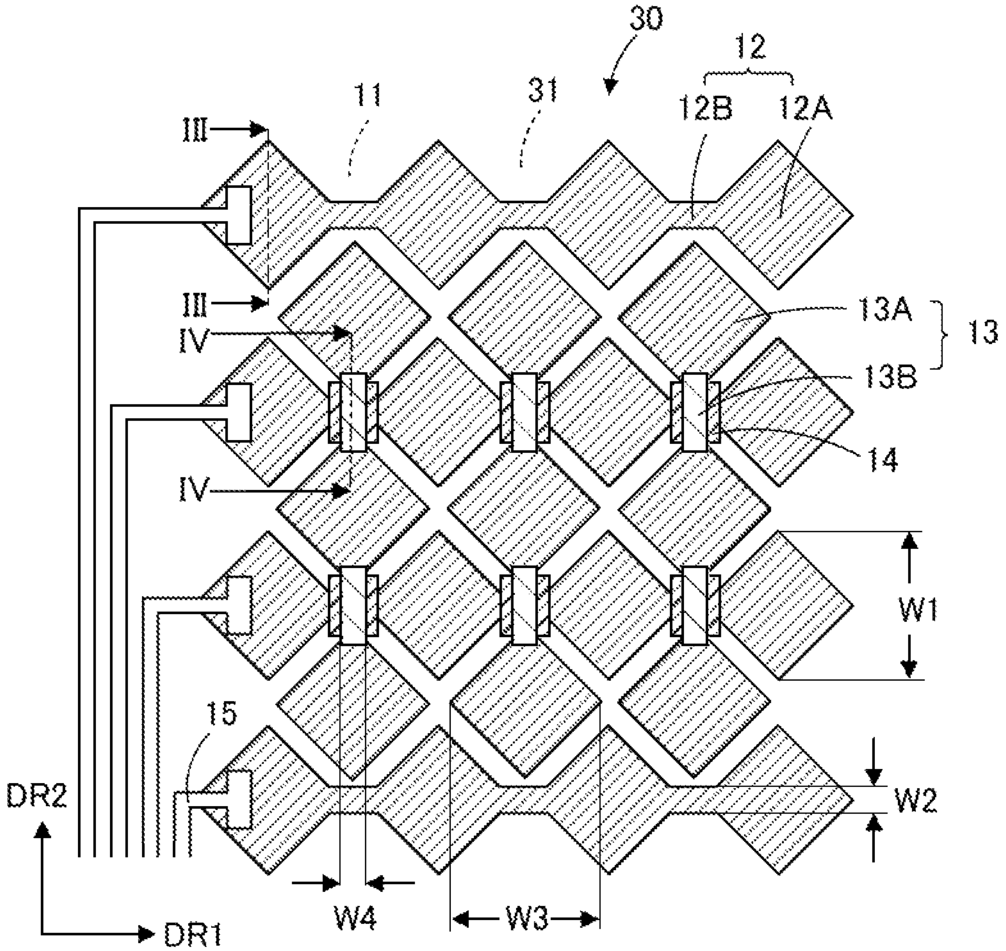
FIG. 10 is a schematic diagram of another sensor according to an embodiment.
Figure 11:
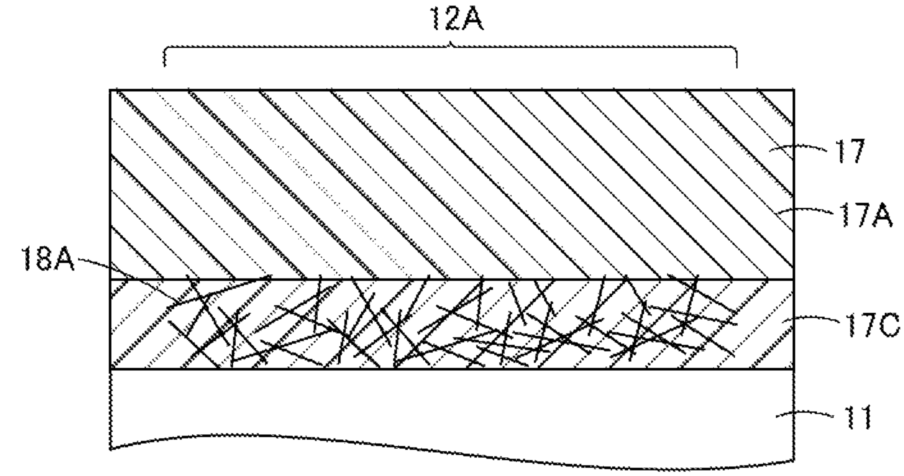
FIG. 11 is a cross-sectional view of the sensor depicted in FIG. 10, taken along line III-III.
Figure 12:
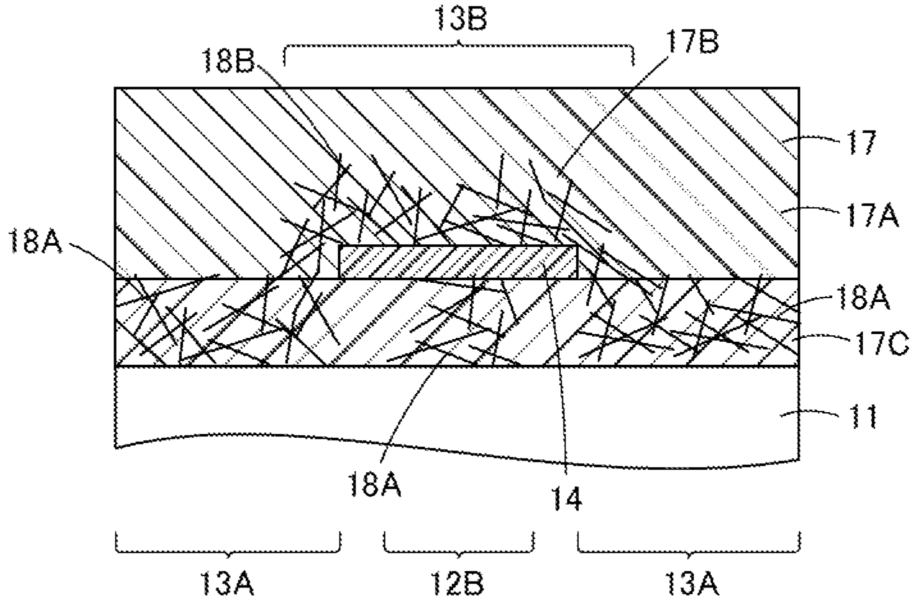
FIG. 12 is a cross-sectional view of the sensor depicted in FIG. 10, taken along line IV-IV.
Figure 13:
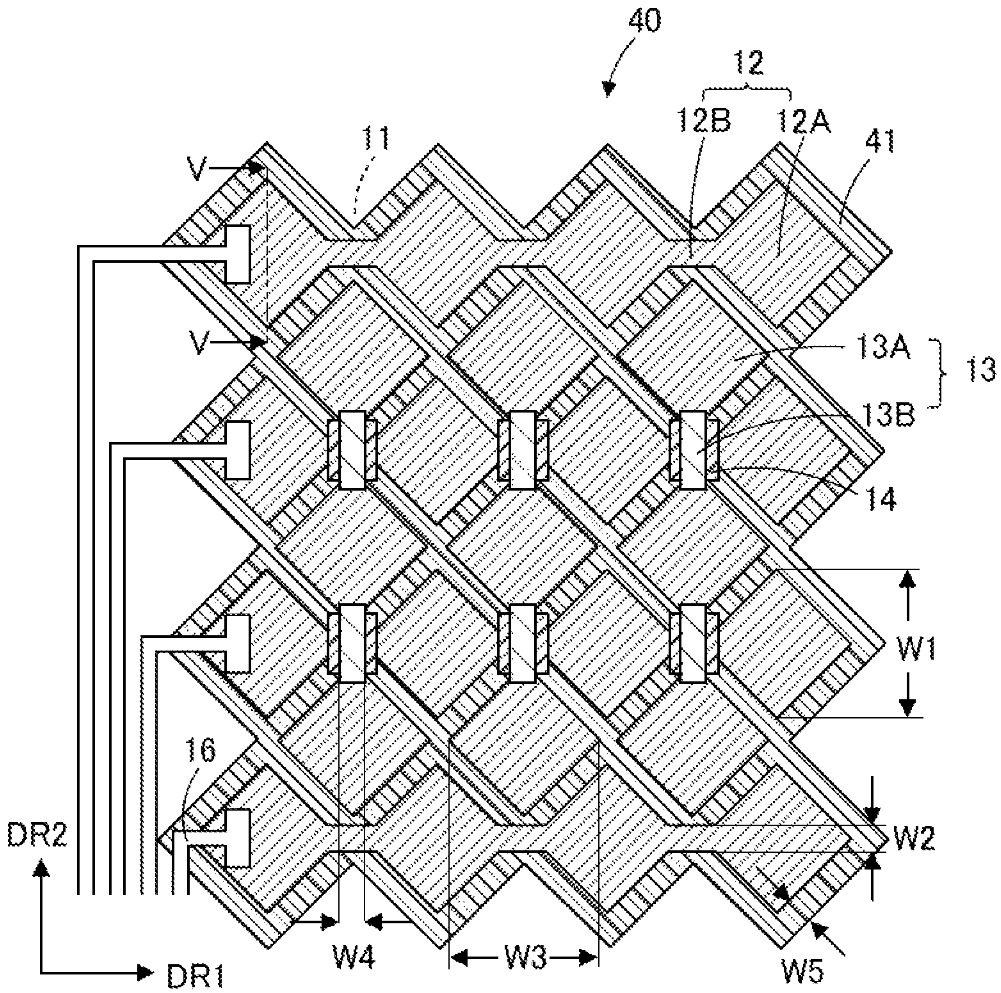
FIG. 13 is a schematic diagram of another sensor according to an embodiment.
Figure 14:
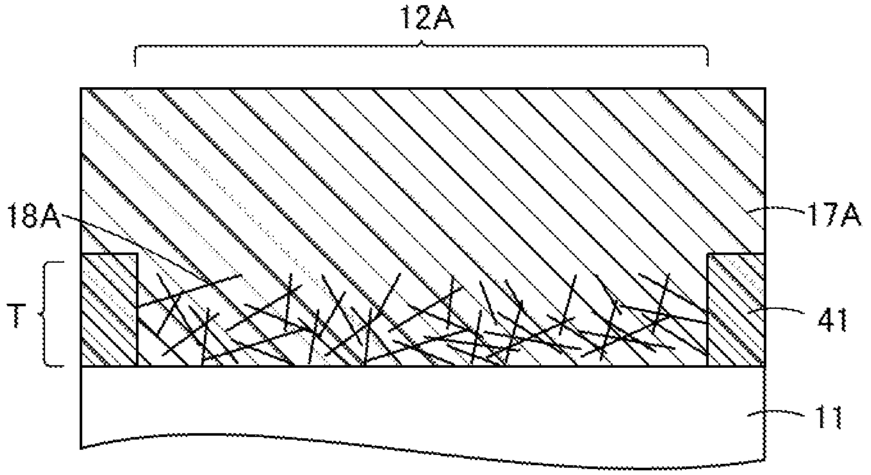
FIG. 14 is a cross-sectional view of the sensor depicted in FIG. 13, taken along line V-V.
Figure 15A:
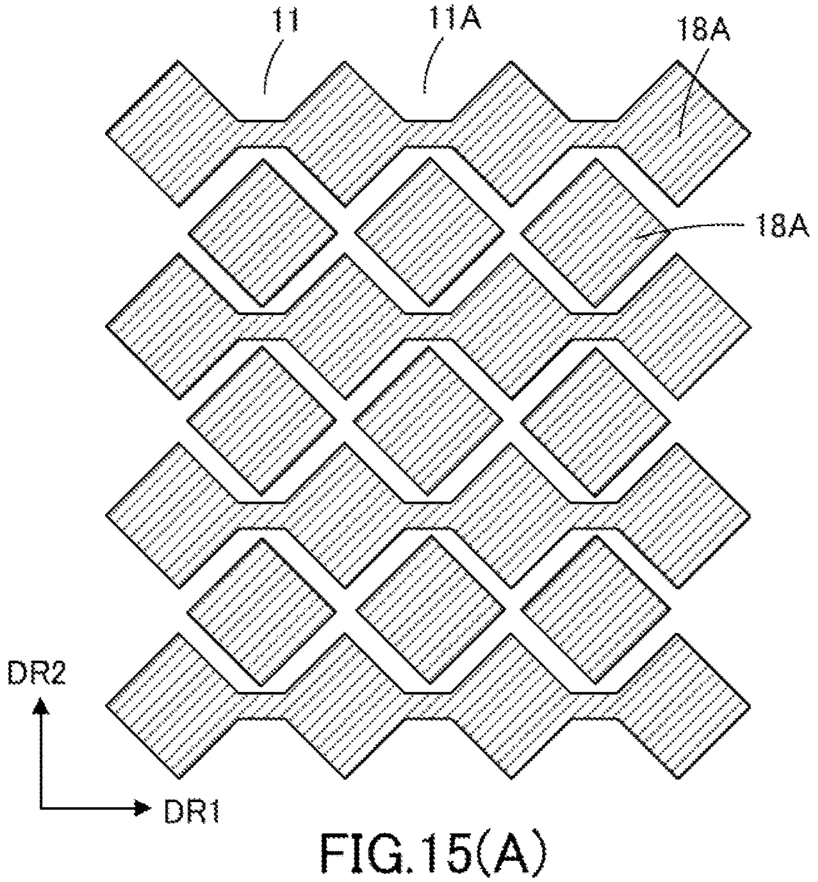
FIGS. 15(A) and 15(B) schematically illustrate a process for producing a sensor according to an embodiment.
Figure 15B:
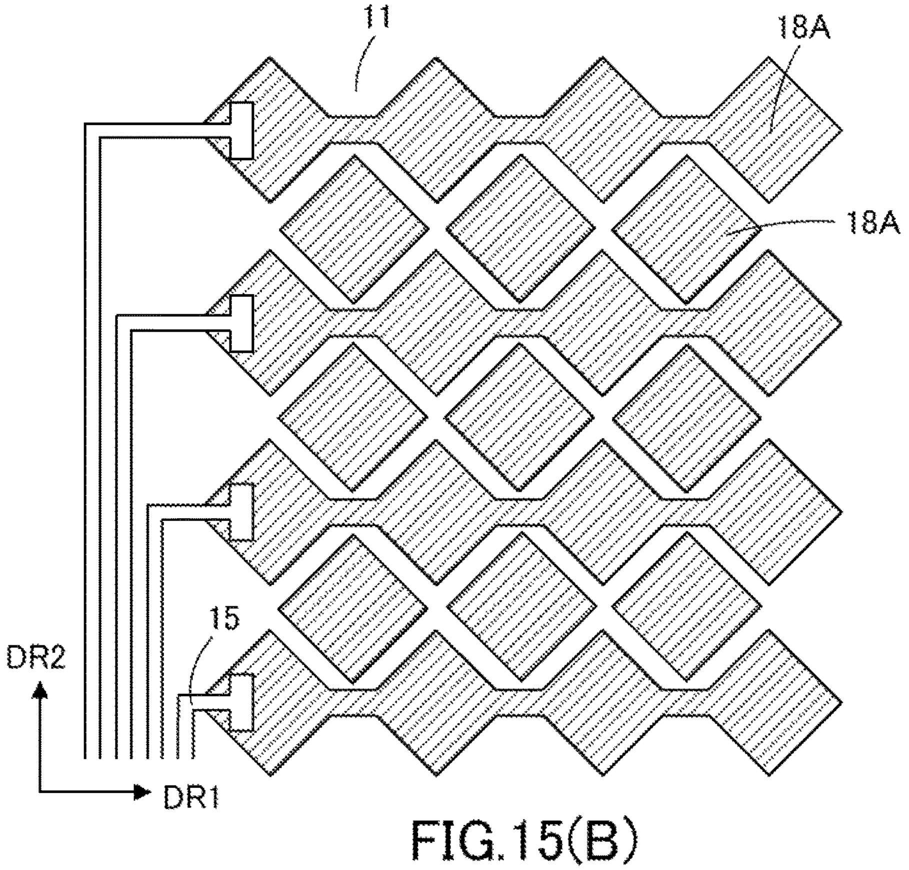
Figure 16A:
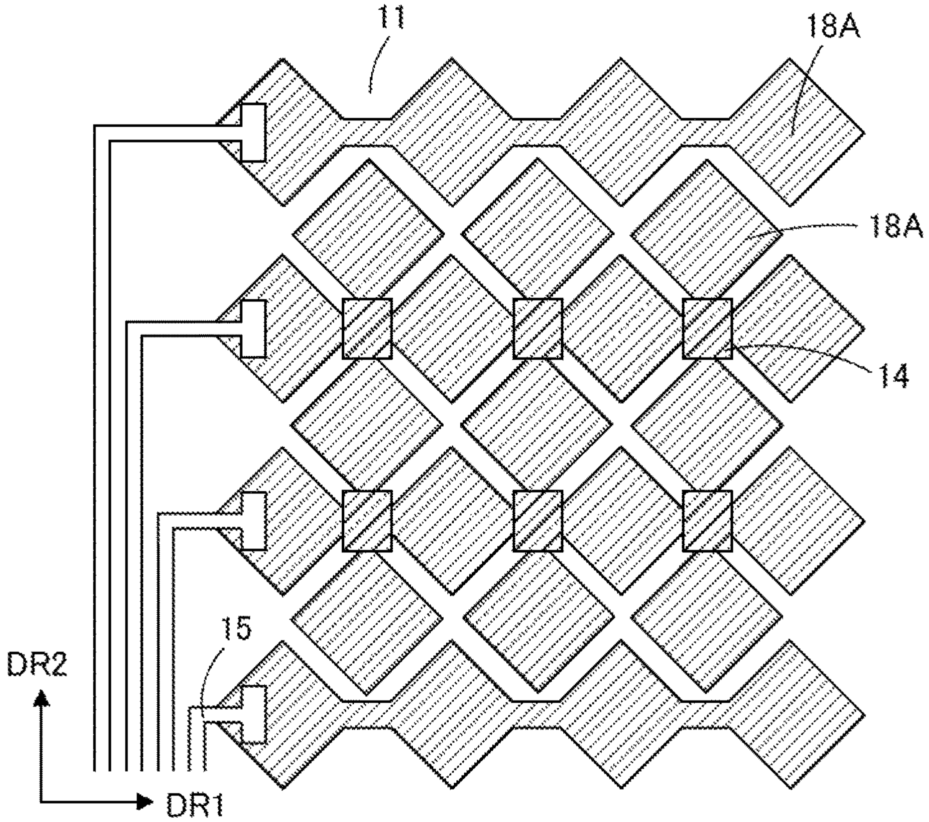
FIGS. 16(A) and 16(B) schematically illustrate a process for producing a sensor according to an embodiment.
Figure 16B:
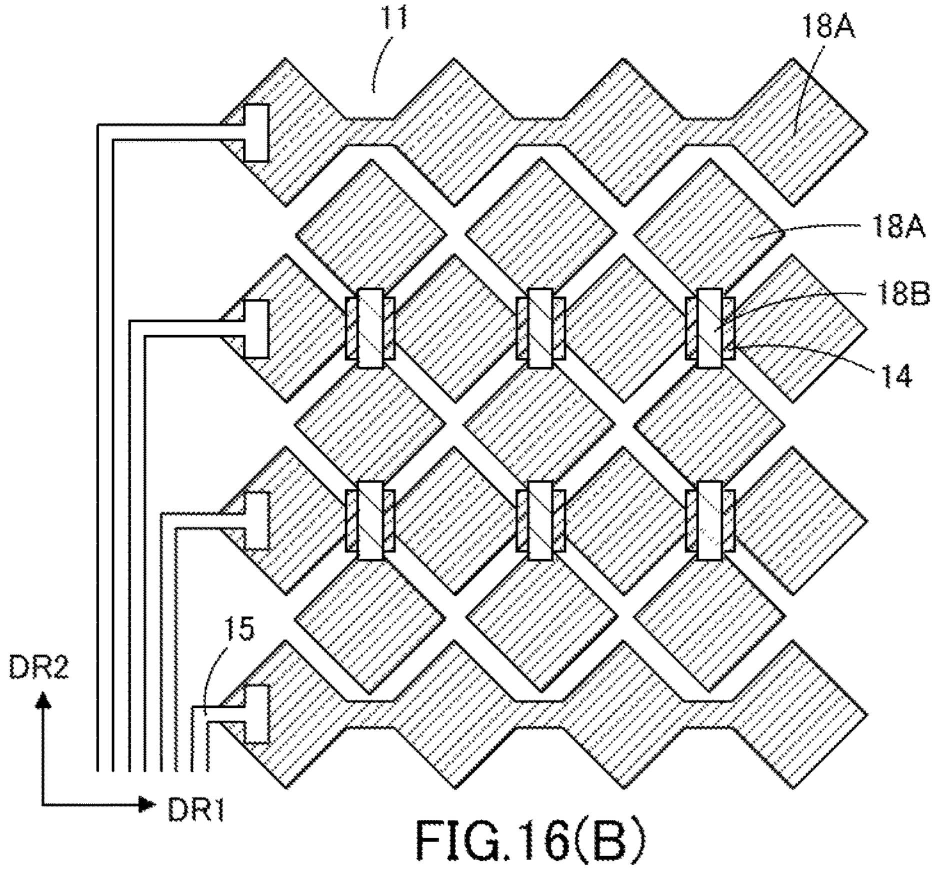
Figure 17:
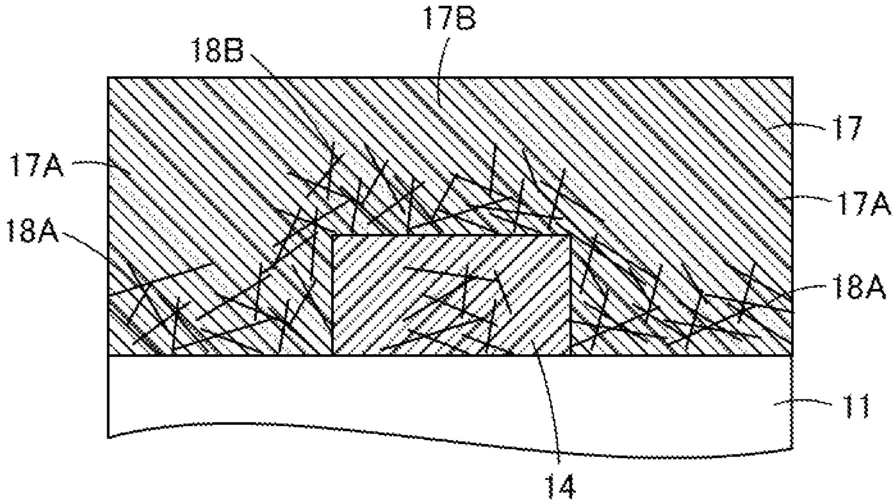
FIG. 17 schematically illustrates a process for producing a sensor according to an embodiment.
Figure 18A:
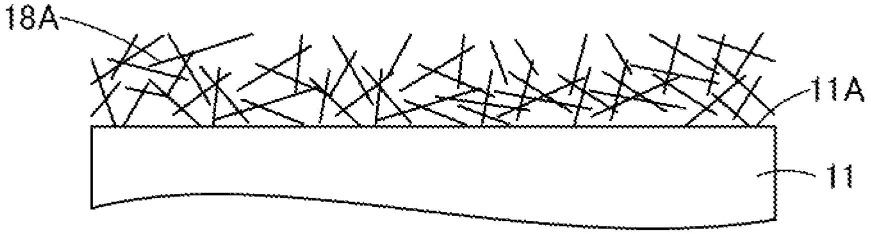
FIGS. 18(A) and 18(B) schematically illustrate a process for producing another sensor according to an embodiment.
Figure 18B:
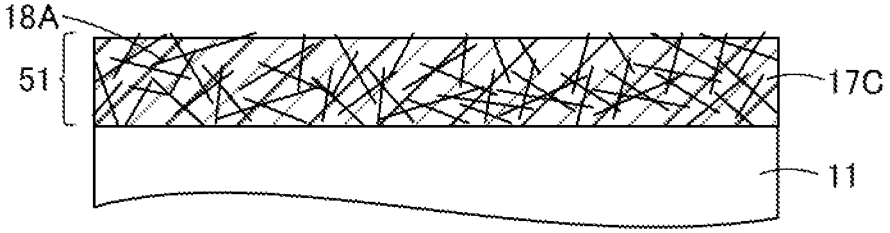
Figure 19A:
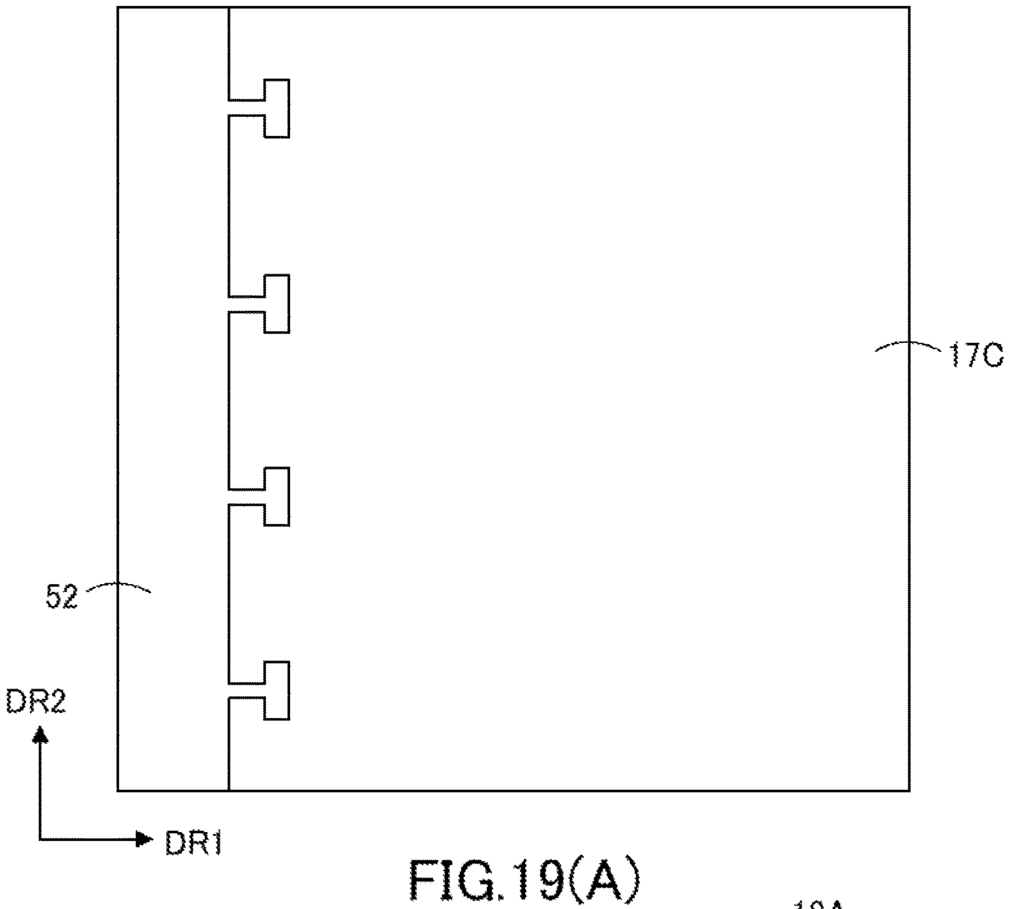
FIGS. 19(A) and 19(B) schematically illustrate a process for producing another sensor according to an embodiment.
Figure 19B:
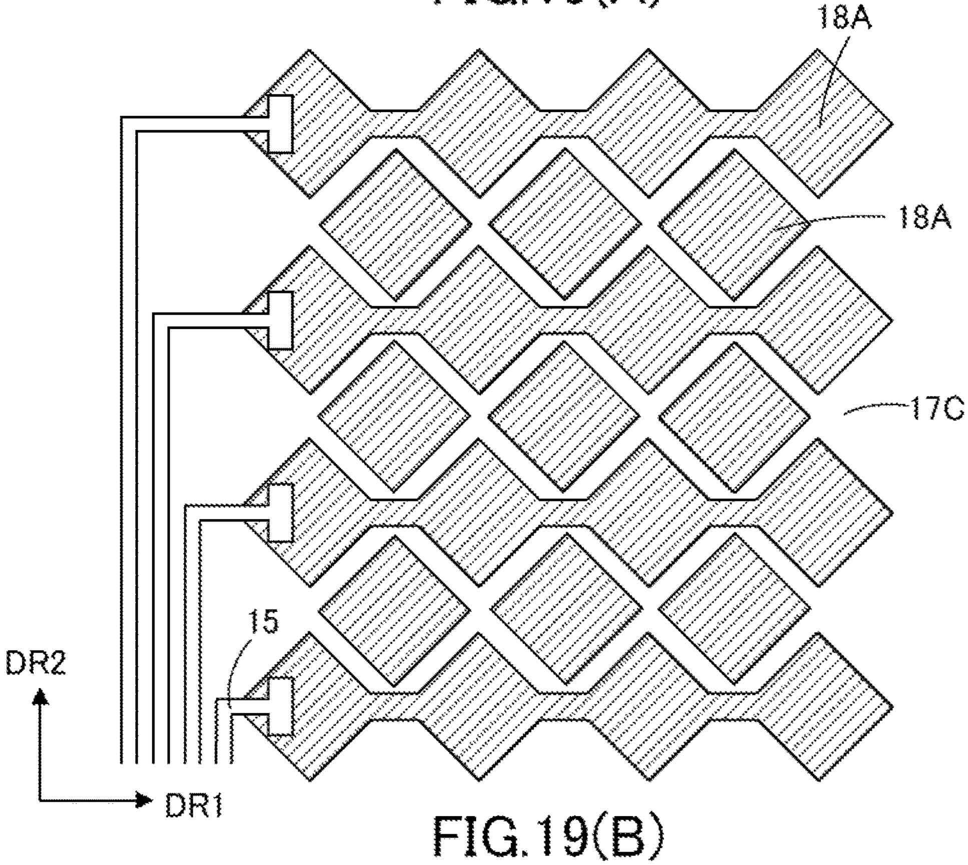
Figure 20:
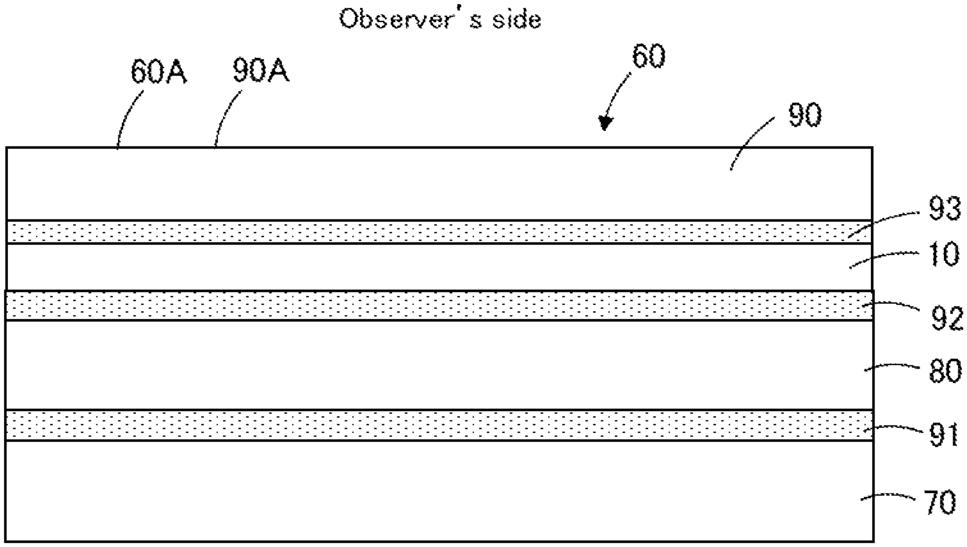
FIG. 20 is a schematic diagram of an image display device according to an embodiment.
Figure 21:
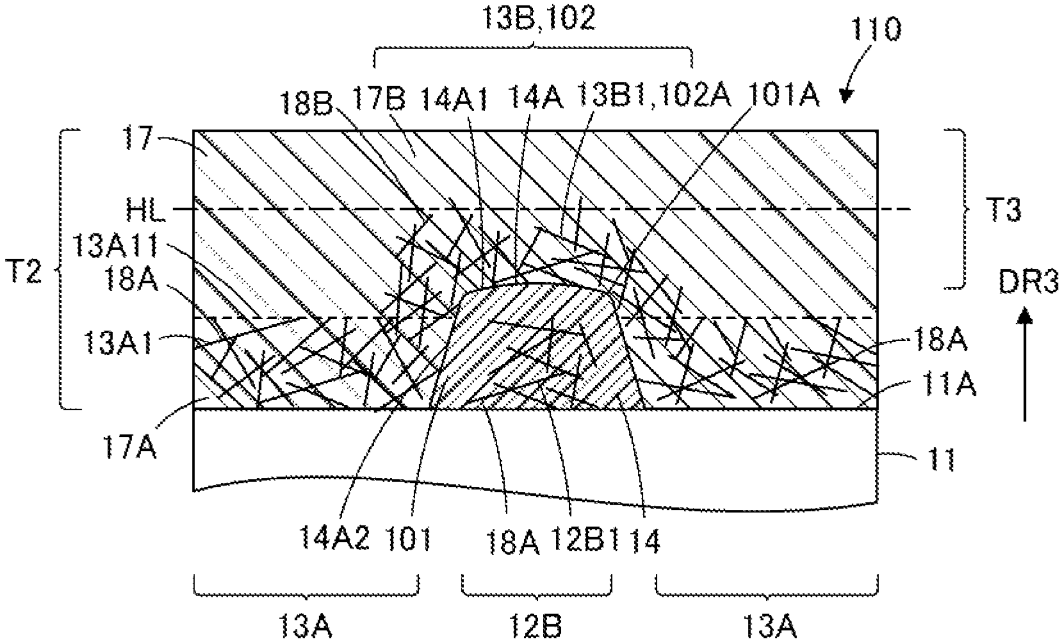
FIG. 21 is a cross-sectional view of another electric conductor according to an embodiment.
Figure 22:
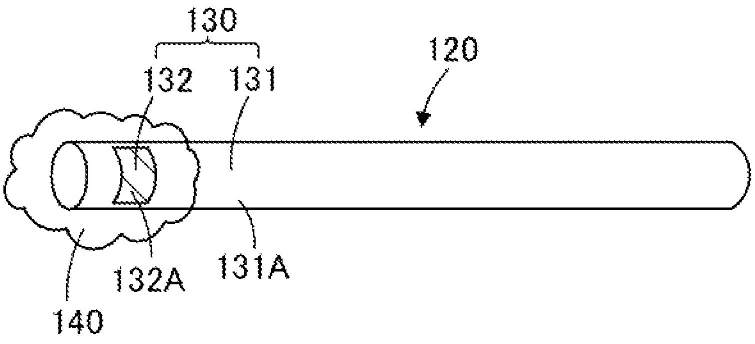
FIG. 22 is a schematic diagram of a biosensor according to an embodiment.

Below, a sensor, a method of producing the same, an article, and an electric conductor according to an embodiment of the present invention will be described with reference to the drawings. FIG. 1 is a schematic diagram of a sensor (electric conductor) according to the present embodiment. FIG. 2 is a cross-sectional view of the sensor depicted in FIG. 1, taken along line I-I. FIG. 3 is a cross-sectional view of the sensor depicted in FIG. 1, taken along line II-II. FIG. 4 is a top view of a bridge wiring portion of the sensor depicted in FIG. 1. FIG. 5 is a top view of a sample S1 or S2 the electrical resistance value of which is to be measured. FIG. 6 is an enlarged view depicting a part of the sample S1 in FIG. 5. FIG. 7 is an enlarged view depicting a part of the sample S2 in FIG. 5. FIGS. 8(A) to 8(C) schematically illustrate each step of a foldability test. FIG. 9 is a top view of a sample tested in the foldability test. FIG. 10 and FIG. 13 are each a schematic diagram of another sensor according to the present embodiment. FIG. 11 is a cross-sectional view of the sensor depicted in FIG. 10, taken along line III-III. FIG. 12 is a cross-sectional view of the sensor depicted in FIG. 10, taken along line IV-IV. FIG. 14 is a cross-sectional view of the sensor depicted in FIG. 13, taken along line V-V. FIG. 15 and FIG. 16 schematically illustrate a process for producing a sensor according to the present embodiment. FIG. 17 to FIG. 19 schematically illustrate a process for producing another sensor according to the present embodiment. FIG. 20 is a schematic diagram of an image display device according to the present embodiment. FIG. 21 is a cross-sectional view of another electric conductor according to the embodiment. FIG. 22 is a schematic diagram of a biosensor according to the embodiment.

<<<Sensor>>>

A sensor 10 depicted in FIG. 1 includes: a base material 11; a first electroconductive part 12 provided on a first face 11A side of the base material 11; a second electroconductive part 13 provided on the first face 11A side of the base material 11, and disposed apart from the first electroconductive part 12; an electrically-insulating layer 14 provided between the below-described wiring portion 12B and bridge wiring portion 13B, and an electrical lead-out line portion 15 electrically connected to the below-described first electrode portion 12A. In this regard, the sensor 10 is one example of the below-described electric conductor.

The sensor 10 includes the electrically-insulating layer 14, but the sensor 10 optionally does not include the electrically-insulating layer 14 if the first electroconductive part 12 and the second electroconductive part 13 are disposed apart from each other. In addition, the sensor 10 includes the electrical lead-out line portion 15, but optionally does not include the electrical lead-out line portion 15.

The first electroconductive part 12 has a plurality of the first electrode portions 12A disposed in a first direction DR1 (see FIG. 1) and the wiring portion 12B electrically connecting the first electrode portions 12A adjacent to each other. The second electroconductive part 13 has a plurality of the second electrode portions 13A disposed in a second direction DR2 (see FIG. 1) intersecting with the first direction DR1, and the bridge wiring portion 13B straddling the wiring portion 12B and electrically connecting the second electrode portions 13A adjacent to each other. As used herein, the phrase “straddling the wiring portion” means that the bridge wiring portion extends over the wiring portion from the second electrode portion to an adjacent second electrode portion. In FIG. 1, the second direction DR2 is perpendicular to the first direction DR1.

The haze value (total haze value) of the sensor 10 is preferably 5% or less. The sensor 10 having a haze value of 5% or less can obtain sufficient optical performance. The haze value can be measured using a haze meter (for example, product name “HM-150”, manufactured by Murakami Color Research Laboratory Co., Ltd.) in accordance with JIS K7136: 2000 in an environment at a temperature of 23±5 °C and a relative humidity of 30% or more and 70% or less. The haze value is a value obtained by measuring the whole sensor. The haze value is determined as the arithmetic mean of the values obtained by measuring one sample three or more times, wherein the sample having a size of 50 mm×100 mm is cut out of the sensor, and the sample without any curl or wrinkle and without any dirt such as fingerprints or grime is then placed in the haze meter in such a manner that the first electroconductive part side is not the light source side. The phrase “measuring one sample three or more times” as used herein does not mean measuring the same location of the sample three or more times, but means measuring three or more different locations of the sample. Measuring haze values at three or more different locations on the sample cut out is considered to provide a rough average of the haze values measured on the whole face of the sensor. The number of measurements is preferably five, that is, five different locations are preferably measured, and it is preferable that the average value is obtained from the measurements of three locations obtained by excluding the maximum value and the minimum value from the five measurements. Additionally, if a sample having the above-mentioned size cannot be cut out, a sample having a size of 21 mm or more in diameter is required because, for example, the HM-150 haze meter has an entrance port aperture having a diameter of 20 mm for use in the measurement. Thus, a sample having a size of 22 mm×22 mm or larger may be cut out, as appropriate. In cases where the sample is small in size, the sample is gradually shifted or turned to such an extent that the light source spot is within the sample, to secure three measurement locations. The haze value of the sensor 10 is more preferably 3% or less, 2% or less, 1.5% or less, 1.2% or less, or 1.1% or less. The deviation of the haze value obtained is within 30%, preferably±10%, even though the object of measurement has such a long size as a size of 1 m×3000 m or has almost the same size as that of a 5-inch smartphone. In cases where the deviation is within the above-mentioned preferable range, a low haze value and a low resistance value are more easily obtained. Additionally, also in a whole multi-layered laminate such as a touch panel including a sensor, the haze value is preferably the same as above-mentioned.

The total light transmittance of the sensor 10 is preferably 80% or more. The sensor 10 having a total light transmittance of 80% or more can obtain sufficient optical performance. The total light transmittance can be measured using a haze meter (for example, product name "HM-150", manufactured by Murakami Color Research Laboratory Co., Ltd.) in accordance with JIS K7361-1: 1997 in an environment at a temperature of 23±5 °C and a relative humidity of 30% or more and 70% or less. The total light transmittance of the sensor 10 is more preferably 85% or more, 88% or more, or 89% or more. The total light transmittance is determined as the mean of the total light transmittance values measured at three locations, wherein the values are obtained by measuring the total light transmittance values at five locations, and excluding the maximum value and the minimum value from the total light transmittance values measured at the five locations.

Even in cases where a test is repeated 100,000 times in which the sensor 10 is folded back in a manner that leaves a gap φ of 3 mm between the opposite edges of the sensor 10, and then unfolded (a foldability test), the below-described electrical resistance value ratio in the first electroconductive part 12 of the sensor 10 and the electrical resistance value ratio in the second electroconductive part 13 of the sensor, between before and after the foldability test, are each preferably 3 or less. In cases where the electrical resistance value ratio in the first electroconductive part of the sensor and the electrical resistance value ratio in the second electroconductive part of the sensor, between before and after the foldability test, are each more than 3 when the foldability test for the sensor is repeated 100,000 times, there is an undesirable possibility that the sensor is broken or otherwise damaged, which in turn means that the sensor has poor flexibility. In this respect, any breakage or other damage to the sensor by the foldability test reduces the electroconductivity, which causes the electrical resistance values in the electroconductive parts of the sensor after the foldability test to be higher than the electrical resistance values in the electroconductive parts of the sensor before the foldability test. Because of this, the determination of whether a sensor is broken or otherwise damaged can be achieved by determining the electrical resistance value ratio in the electroconductive part of the sensor between before and after the foldability test. The foldability test may be performed by folding the sensor 10 with the first electroconductive part 12 and the second electroconductive part 13 facing either inward or outward. In either case, the electrical resistance value ratio in each of the first electroconductive part 12 of the sensor 10 and the second electroconductive part 13 of the sensor, between before and after the foldability test, is preferably 3 or less.

Even in cases where the foldability test is performed by repeating the folding and unfolding process 200,000 times, 300,000 times, 500,000 times, or 1,000,000 times, it is more preferable that the electrical resistance value ratio in each of the first electroconductive part 12 and second electroconductive part 13 of the sensor 10, between before and after the foldability test, is 3 or less. In this regard, the more times the above-mentioned folding and unfolding process is repeated, the more difficult it is to bring the electrical resistance value ratio in the electroconductive part between before and after the foldability test to 3 or less, and hence, there is a technically marked difference between the following: that the electrical resistance value ratio in each of the first electroconductive part 12 and the second electroconductive part 13 between before and after the foldability test in which the folding and unfolding process is repeated 200,000 times, 300,000 times, 500,000 times, or 1,000,000 times is 3 or less; and that the electrical resistance value ratio in each of the first electroconductive part 12 and the second electroconductive part 13 between before and after the foldability test in which the folding and unfolding process is repeated 100,000 times is 3 or less. In addition, the reason why the folding and unfolding process in the foldability test is repeated at least 100,000 times for evaluation purposes is as described below. For example, assuming that a sensor is incorporated in a foldable smartphone, the frequency of folding and unfolding (the frequency of opening and closing) is very high. Because of this, an evaluation made by repeating the folding and unfolding process, for example, times or 50,000 times in the above-described foldability test will fail to be an evaluation on a practical level. Specifically, assuming, for example, a person who constantly uses a smartphone, the smartphone is supposed to be opened and closed at a frequency of 5 to 10 times even during a morning commute by, for example, train or bus, and is supposed to be opened and closed at least 30 times even in only one day. Thus, assuming that a smartphone is opened and closed 30 times a day, which gives 30 times×365 days=10950 times, a foldability test performed by repeating the folding and unfolding process 10,000 times is a test performed on the assumption of one-year use. In other words, the result of the foldability test performed by repeating the folding and unfolding process 10,000 times can be favorable, but in some cases, the sensor will undesirably generate a crease or a crack after one year passes. Thus, an evaluation based on a foldability test performed by repeating the folding and unfolding process 10,000 times can only verify whether a product is on an unusable level, and a product that can be used but insufficiently will be regarded as good, failing to be duly evaluated. Thus, an evaluation of whether a product is on a practical level needs to be an evaluation based on the foldability test performed by repeating the folding and unfolding process at least 100,000 times.

Even in cases where the foldability test is performed by repeating the folding and unfolding process 100,000 times, 200,000 times, 300,000 times, 500,000 times, or 1,000,000 times, it is more preferable that the electrical resistance value ratio in each of the first electroconductive part 12 and second electroconductive part 13 of the sensor 10, between before and after the foldability test, is 1.5 or less.

The above-described foldability test is performed so as to leave a gap φ of 3 mm between the opposite edges of the sensor 10. In terms of attempting to make an image display device thinner, it is more preferable that the electrical resistance value ratio in each of the first electroconductive part 12 and the second electroconductive part 13, between before and after the foldability test, is 3 or less even in cases where the foldability test is performed by repeating, 100,000 times, a process in which the sensor 10 is folded back to leave a gap φ in a narrower range, specifically 2 mm or 1 mm, between the opposite edges of the sensor 10, and unfolded. Even in cases where the folding and unfolding process is repeated the same number of times, the smaller the gap φ is, the more difficult it is to bring the electrical resistance value ratio in the electroconductive part between before and after the foldability test to 3 or less. Thus, there is a technically marked difference between the following:

that the electrical resistance value ratio in each of the first electroconductive part 12 and the second electroconductive part 13 is 3 or less between before and after the foldability test performed so as to leave the above-mentioned gap φ of 2 mm or 1 mm; and that the electrical resistance value ratio in each of the first electroconductive part 12 and the second electroconductive part 13 is 3 or less between before and after the foldability test performed so as to leave the above-mentioned gap φ of 3 mm.

The foldability test is performed as follows: first, samples S1 and S2 which each have a predetermined size (for example, a rectangular shape of 125 mm in length×50 mm in width) and which each include a first electroconductive part 12 and a second electroconductive part 13 are cut out of the freely selected locations of the sensor 10 before the foldability test (see FIG. 5). Here, the sample S1 is cut out of the sensor 10 in such a manner that the longitudinal direction of the sample S1 is the direction (the conduction direction) in which the first electroconductive part 12 extends, and the sample S2 is cut out of the sensor 10 in such a manner that the longitudinal direction of the sample S2 is the direction (the conduction direction) in which the second electroconductive part 13 extends. If a sample cannot be cut into a size of 125 mm×50 mm, the sample may have a size enough to carry out each of the below-described evaluations to be performed after the foldability test, and a sample may be cut out in the form of a rectangle having a size of, for example, 80 mm×25 mm. After the samples S1 and S2 are cut out of the sensor 10 before the foldability test, the electrical resistance value of the first electroconductive part 12 is measured in the sample S1 before the foldability test, and in addition, the electrical resistance value of the second electroconductive part 13 is measured in the sample S2 before the foldability test. Specifically, as depicted in FIG. 5, a silver paste (product name "DW-520H-14", manufactured by Toyobo Co., Ltd.) is applied to both longitudinal ends of each of the samples S1 and S2 (for example, each end having a size of 10 mm in length×50 mm in width) to prevent any change in the distance between points for measuring the electrical resistance value, and heated at 130 °C for 30 minutes to provide a cured silver paste 21 at both ends of each of the samples S1 and S2. Then, in the sample S1, the cured silver paste 21 is exposed to a laser light for part of the silver paste 21 to be removed so that the first electroconductive part 12 cannot be electrically conduct to the second electroconductive part 13. In the sample S2, the cured silver paste 21 is exposed to a laser light for part of the silver paste 21 to be removed so that the second electroconductive part 13 cannot electrically conduct to the first electroconductive part 12 (see FIG. 6 and FIG. 7). In this regard, the portion denoted by the reference sign 21A in FIG. 6 and FIG. 7 is the portion from which the silver paste 21 has been removed. The electrical resistance value of each sample in this state is measured using a tester (product name "Digital MΩ Hitester 3454-11", manufactured by Hioki E.E. Corporation). The distance between the silver pastes 21 (the length of the portion having no silver paste 21) is a distance along which the electrical resistance value is measured in each of the samples S1 and S2 (for example, 100 mm), and this distance of measurement should be the same between the samples S1 and S2. When the electrical resistance value is measured in the sample S1, the probe terminals of the tester are contacted with the respective portions of the cured silver paste 21 provided at both ends, wherein the portions are in contact with the first electroconductive part 12. In the case of the sample S2, the probe terminals of the tester are contacted with the respective portions of the cured silver paste 21 provided at both ends, wherein the portions are in contact with the second electroconductive part 13. The measurement of the electrical resistance value is performed in an environment at a temperature of 23±5 °C and a relative humidity of 30% or more and 70% or less. The electrical resistance value of the first electroconductive part 12 is measured in the sample S1 before the foldability test, and in addition, the electrical resistance value of the second electroconductive part 13 is measured in the sample S2 before the foldability test. Then, the foldability test is performed on each of the samples S1 and S2.

The foldability test is performed as follows. As depicted in FIG. 8(A), the foldability test starts with anchoring the edge S1*a* and opposite edge S1*b* of the selected sample S1 to anchoring members 22 of a folding endurance testing machine (for example, product name "U-shape Folding Test Machine DLDMLH-FS", manufactured by Yuasa System Co., Ltd.; in accordance with IEC62715-6-1) which are arranged in parallel to each other. A portion of about 10 mm on each side of the sample S1 in the longitudinal direction of the sample S1 is retained by the anchoring members 22, and thus anchored. However, in cases where the sample S1 has a much smaller size than the above-described size, the sample S1 can be anchored to the anchoring members 22 by means of a tape, and then be provided for the measurement if the length required for anchoring the sample is up to about 20 mm. (That is, the smallest sample is 60 mm×25 mm.) Additionally, the anchoring members 22 can slide in the horizontal direction, as depicted in FIG. 8(A). The above-mentioned device is preferable because, unlike the conventional method such as by winding a sample around a rod, the durability of the sample against bending load can be evaluated without generating tension or friction on the sample.

Next, the anchoring members 22 are moved close to each other to fold and deform the sample S1 along the center line Sic, as depicted in FIG. 8(B); the anchoring members 22 are further moved until a gap φ of 3 mm is left between the two opposite edges S1*a* and S1*b* of the sample S1 anchored to the anchoring members 22, as depicted in FIG. 8(C), subsequently, the anchoring members 22 are moved in opposite directions to resolve the deformation of the sample S1.

As depicted in FIG. 8(A) to FIG. 8(C), the anchoring member 22 can be moved to allow the sample S1 to be folded 180° back about the middle point Sic. Additionally, a gap φ of 3 mm can be maintained between the two opposite edges S1*a* and S1*b* of the sample S1 by performing the foldability test under the following conditions in a manner that prevents the bent part S1*d* of the sample S1 from being forced out beyond the lower edges of the anchoring members 22 and controls the anchoring members 22 to keep a gap of 3 mm when they approach each other closest. In this case, the outer diameter of the bent part S1*d* is regarded as 3 mm. The thickness of the sample S1 is small enough as compared with the gap between the anchoring members 22 (3 mm). Thus, it seems unlikely that a difference in the thickness of the sample S1 affects the result of the foldability test on the sample S.

(Folding Conditions)

Reciprocation rate: 80 rpm (every minute)

Test stroke: 60 mm

Bending angle: 180°

After the foldability test is performed, the electrical resistance value of the first electroconductive part 12 is measured in the sample S1 after the foldability test, in the same manner as in the sample S1 before the foldability test. Then, the ratio of the electrical resistance value of the sample S1 after the foldability test to the electrical resistance value of the sample S1 before the foldability test (electrical resistance value of sample S1 after foldability test/electrical resistance value of sample S1 before foldability test) is calculated. In this regard, the electrical resistance value ratio is determined as the arithmetic mean of three electrical resistance value ratios obtained by excluding the maximum value and the minimum value from five electrical resistance value ratios, wherein the electrical resistance value ratios are measured at five different locations, that is, the ratio is measured five times. Additionally, in the same manner as described above, the ratio of the electrical resistance value of the sample S2 after the foldability test to the electrical resistance value of the sample S2 before the foldability test (electrical resistance value of sample S2 after foldability test/electrical resistance value of sample S2 before foldability test) is calculated.

Even if the electrical resistance value ratio between before and after the foldability test is 3 or less for each of the first electroconductive part and the second electroconductive part of the sensor, the sensor after the foldability test will undesirably generate a crease at the bent part and also generate microcracks, causing poor appearance, specifically white turbidity and delamination (poor adhesion) starting from the microcracks. One cause of the white turbidity is considered to be the change in the crystalline state of an organic compound, which is the material of a layer of the sensor. When poor adhesion locally occurs, moisture may accumulate in the delaminated portion or air may enter this delaminated portion due to a change in temperature/humidity, which may increase white turbidity. In this regard, the microcracks hardly occur in the case of a base material alone or a laminate alone in which a certain functional layer is provided on the base material. That is, although the origin of the generation is unknown, it is presumed that an electroconductive part containing electroconductive fibers is a factor. In recent years, instead of just flat displays, there has increasingly been a variety of three-dimensional designs such as foldable displays and curved displays. Thus, inhibiting creases and microcracks from being generated at the bent part is extremely important for the sensor to be used in an image display device. Accordingly, the sensor 10 preferably has excellent flexibility. As used herein, "excellent flexibility" refers to not only having an electrical resistance value ratio of 3 or less in the electroconductive part between before and after the foldability test, but also generating no observed crease or microcrack in the test.

Whether the above-mentioned crease is present is to be observed visually, and in observing such a crease, the bent part is uniformly observed with transmitted light and reflected light under white illumination (at 800 lux to 2000 lux) in a bright room, and both the portion corresponding to the internal side and the portion corresponding to the external side at the bent part after folding are observed. The observation of the crease is performed in an environment at a temperature of 23±5 °C and a relative humidity of 30% or more and 70% or less.

The above-mentioned microcracks are observed using a digital microscope (digital microscope). Examples of digital microscopes include VHX-5000 manufactured by Keyence Corporation. Such microcracks are observed in a dark field, with reflected light, and with ring lighting selected as the illumination of a digital microscope. Specifically, a sample after the foldability test is first spread slowly, and the sample is fixed with a tape to the stage of a microscope. If the crease is persistent in this case, the region to be observed is made as flat as possible. However, the region to be observed (the bent part) at and around the center of the sample is not touched with a hand and handled to a degree to which no force is applied. When the sample is folded, both the portion corresponding to the internal side and the portion corresponding to the external side are observed. The microcracks are observed in an environment at a temperature of 23±5 °C and a relative humidity of 30% or more and 70% or less.

In order that the position to be observed can be easily known in observing the above-mentioned crease and microcracks, it is advisable to place a sample before the foldability test between the anchoring members of an endurance testing machine, fold the sample once, and use a permanent marker or the like to put, on both ends S1$d_1$, marks A1 indicating the bent part, as depicted in FIG. 9, wherein both the ends S1$d_1$ are opposed in the direction along the bent part S1*d* and perpendicular to the folding direction FD. In cases where no crease or the like is observed on the sample after the foldability test, the sample is removed from the endurance testing machine after the foldability test, and then, a permanent marker may be used to draw lines A2 (dotted lines in FIG. 9) connecting both the marks A1 for both the ends S1$d_1$ along the bent part S1*d* so that the position to be observed can be prevented from being unclear. Then, in observing the crease, the whole bent part Sid, which is a region formed by the marks A1 for both the ends S1$d_1$ of the bent part S1*d* and the lines A2 connecting the marks A1, is observed visually. In observing the microcracks, the microscope is set in such a manner that the center of the field-of-view range (the range surrounded by the two-dot chain line in FIG. 9) of the microscope is aligned with the center of the bent part S1*d*. It is assured that the marks with a permanent marker do not appear in the area required for the actual measurement.

Additionally, performing the foldability test on the sensor will undesirably cause the adhesion between the base material and the resin layer to decrease. Because of this, it is preferable that no peeling or the like is observed at and around the interface between the base material 11 and the below-described resin layer 17 when a digital microscope is used to observe the region at and around the interface between the base material 11 and the resin layer 17 at the bent part of the sensor after the foldability test. Examples of digital microscopes include VHX-5000 manufactured by Keyence Corporation.

In cases where an additional film is provided on the sensor through an adhesive or adhesion layer, the additional film and the adhesive or adhesion layer are peeled away before the haze value and the total light transmittance are measured and before the foldability test is performed. The additional film can be peeled away, for example, as follows. First of all, a laminate composed of a sensor and an additional film attached thereto through an adhesive layer or an adhesion layer is heated using a hair dryer, and is slowly separated by inserting a cutter blade into a possible interfacial boundary between the sensor and the additional film. By repeating such a process of heating and separation, the adhesive or adhesion layer and the additional film can be peeled away. Even if such a peeling process is performed, neither measurement of the haze value nor the foldability test is significantly affected.

In this regard, a sample having the above-mentioned size needs to be cut out of the sensor 10, as described above, when the sensor 10 is used for measurement of the haze value and the total light transmittance or is subjected to the foldability test, but in cases where the sensor 10 is large (for example, having a long size as the shape of a roll), a sample having an A4 size (210 mm×297 mm) or an A5 size (148 mm×210 mm) is cut out at any position, and out of the sample, a sample having a size for each measurement item should be cut. In addition, in cases where the sensor 10 is roll-shaped, the sensor 10 in roll shape is unrolled by a predetermined length, and cut not at the non-effective region extending along the longitudinal direction of the roll and including both ends but at the effective regions being at and around the central portion and having stable quality. In cases where the sensor 10 is used for measurement of the haze value and the total light transmittance or is subjected to the foldability test, the above-mentioned devices are used, but without limitation to the above-mentioned devices, equivalent devices such as their successors may be used for measurement.

The thickness of the sensor 10 is not limited to any particular value, and may be 500 μm or less. In terms of handling or the like and in terms of being thinner, the thickness of the sensor 10 is more preferably 5 μm or more and 500 μm or less, 5 μm or more and 250 μm or less, 5 μm or more and 100 μm or less, 10 μm or more and 500 μm or less, 10 μm or more and 250 μm or less, 10 μm or more and 100 μm or less, 20 μm or more and 500 μm or less, 20 μm or more and 250 μm or less, or 20 μm or more and 100 μm or less. Furthermore, in cases where flexibility is considered to be more important, the thickness of the sensor 10 is more preferably 5 μm or more and 78 μm or less, 10 μm or more and 78 μm or less, 20 μm or more and 78 μm or less, particularly preferably 5 μm or more and 45 μm or less, 10 μm or more and 45 μm or less, or 20 μm or more and 45 μm or less. Accordingly, in cases where flexibility is considered to be important, the thickness of the sensor 10 is suitably 5 μm or more and 78 μm or less, more suitably 5 μm or more and 28 μm or less, or 5 μm or more and 20 μm or less. The thickness of the sensor 10 is determined as the average value of the thickness values at eight locations obtained by excluding the maximum value and the minimum value from the thickness values measured at ten locations, wherein the thickness values measured at the ten locations are randomly selected in a cross-sectional image of the sensor acquired using a transmission electron microscope (TEM), a scanning transmission electron microscope (STEM), or scanning electron microscope (SEM). The sensor generally has uneven thickness. In the present embodiment, the sensor is for optical use, and thus, the unevenness in the thickness is the average thickness value±2 μm or less, more preferably ±1 μm or less.

Measuring the thickness of the sensor using a transmission electron microscope (TEM) or a scanning transmission electron microscope (STEM) can be performed in the same manner as measuring the thickness of the first electroconductive part 12. However, the magnification used for acquiring a cross-sectional image of the sensor is from 100 to 20,000 times. In cases where the thickness of the sensor is measured using a scanning electron microscope (SEM), the cross-section of the sensor may be obtained using an ultramicrotome (product name "Ultramicrotome EM U07", manufactured by Leica Microsystems GmbH) or the like. As a sample for the measurement with TEM or STEM, ultra-thin sections are produced using the ultramicrotome at a feeding rate of 100 nm. The ultra-thin sections produced are collected on collodion-coated meshes (150) to obtain the sample. Upon cutting with the ultramicrotome, the sample may be subjected to a pretreatment that facilitates cutting, such as embedding the sample in a resin.

A sensor according to the present invention (for example, the sensor 10 depicted in FIG. 1) is not limited to any particular application, and a sensor according to the present invention can be used for any of various articles. Specifically, a sensor according to the present invention may be used, for example, for an optical application or a touch panel application. Additionally, a sensor according to the present invention is suitable for use in vehicles (including all types of vehicles such as railroad cars and carriage building machines) as well as for use in image display devices (including smartphones, tablet terminals, wearable terminals, personal computers, televisions, digital signages, public information displays (PID), on-vehicle displays, and the like). Examples of a sensor which is used as a sensor for on-vehicle applications include a sensor arranged at a portion that is touched by a person, such as a steering wheel or a seat. Additionally, the sensor is also preferable for applications that require flexible forms, such as foldable or rollable forms. The sensor may be used for electrical appliances and windows used for houses and cars (including all types of vehicles such as railroad cars and carriage building machines). A sensor according to the present invention can suitably be used particularly for portions for which transparency is deemed to be important. Additionally, a sensor according to the present invention can suitably be used for electrical appliances that not only are seen from a technical viewpoint such as transparency but also require higher devisal quality and design quality. Other than an image display device, specific examples of applications of the sensor include carrier films and the like used in biosensors, defrosters, antennas, solar cells, audio systems, loudspeakers, electric fans, interactive whiteboards, and semiconductors. The shape of the sensor as used is suitably designed in accordance with the application, without particular limitation, and, for example, may be a curved face.

The sensor 10 may be cut to a desired size or may be rolled. The sensor that is rolled may be cut to a desired size in this stage. In cases where the sensor 10 is cut to a desired size, the sensor is not limited to any particular size, and the size of the sensor is appropriately determined depending on the display size of an image display device. Specifically, the sensor piece may be, for example, 5 inches or more and 500 inches or less in size. The term "inch" as used herein refers to the length of a diagonal in cases where the sensor is quadrilateral, to the length of a diameter in cases where the sensor is circular, and to the average of major and minor axes in cases where the sensor is elliptical. In this respect, if the sensor is quadrilateral, the aspect ratio of the sensor is not limited to any particular ratio when the above-described size in inch is determined, as long as no problem is found with the sensor used for the display screen of an image display device. Examples of the aspect ratio include height-to-width ratios of 1:1, 4:3, 16:10, 16:9, and 2:1. However, particularly in sensors to be used for on-vehicle applications and digital signage systems that are rich in designs, the aspect ratio is not limited to the above-described aspect ratios. Additionally, in cases where the sensor 10 is large in size, the sensor is appropriately cut at any position into an easy-handling size such as an A4 size (210 mm×297 mm) or an A5 size (148 mm×210 mm), and then cut to a size for each measurement item. For example, in cases where the sensor 10 is roll-shaped, the sensor 10 in roll shape is unrolled by a predetermined length, and cut to a desired size not at the non-effective region extending along the longitudinal direction of the roll and including both ends but at the effective regions being at and around the central portion and having stable quality.

<<Base Material>>

The base material 11 is not particularly limited, but is preferably light-transmitting, depending on the application. For example, in cases where the sensor 10 is used for optical applications, the base material is preferably light-transmitting. The term "light-transmitting" as used herein refers to a property that causes light to be transmitted. Additionally, the term "light-transmitting" does not necessarily refer to transparency, and may refer to translucency.

Examples of constituent materials of the light-transmitting base material 11 include base materials containing a light-transmitting resin. Such a resin is not limited to any particular one as long as it is light-transmitting, and examples of such resins include polyolefin resins, polycarbonate resins, polyacrylate resins, polyester resins, aromatic polyetherketone resins, polyethersulfone resins, polyimide resins, polyamide resins, polyamide-imide resins, and mixtures obtained by mixing two or more of these resins. Among these, polyester resins are preferred because a base material composed of a polyester resin is hardly damaged even upon contacting to a coating apparatus, and is thus capable of inhibiting an increase in the haze value even if the base material is contacted to a coating machine for coating of the first electroconductive part or the like, and thus likely to be damaged, as well as a base material composed of a polyester resin has superior heat resistance, barrier property, and water resistance to those of base materials composed of any light-transmitting resin other than polyester resins.

In cases where a foldable sensor is produced as the sensor, a polyimide resin, a polyamide-imide resin, a polyamide resin, a polyester resin, or a combination thereof is preferably used as a resin constituting a base material because the resulting sensor will provide excellent flexibility. Among these, polyimide resins, polyamide resins, or a mixture thereof are preferred because they show excellent hardness and transparency as well as excellent flexibility, and also have excellent heat resistance, thereby imparting further excellent hardness and transparency by firing.

Examples of the polyolefin resin include resins composed of at least one of, for example, polyethylene, polypropylene, or cycloolefin polymer resins. Examples of the cycloolefin polymer resin include resins having the norbornene backbone.

Examples of the polycarbonate resin include aromatic polycarbonate resins containing a bisphenol (such as bisphenol A) as a base material, and aliphatic polycarbonate resins such as diethylene glycol bis(allyl carbonate).

Examples of the polyacrylate resin include methyl poly(meth)acrylate base materials, ethyl poly(meth)acrylate base materials, and methyl (meth)acrylate-butyl (meth)acrylate copolymers.

Examples of the polyester resin include resins composed of at least one of polyethylene terephthalate (PET), polypropylene terephthalate (PBT), polybutylene terephthalate, or polyethylene naphthalate (PEN). Among these, PET is preferred from the below-described viewpoint.

Examples of the aromatic polyetherketone resin include polyether ether ketone (PEEK).

The polyimide resin may partially contain a polyamide structure. Examples of the polyamide structure that may be contained include a polyamide-imide structure containing a tricarboxylic acid residue such as trimellitic anhydride, and a polyamide structure containing a dicarboxylic acid residue such as terephthalic acid. The concept of polyamide resin includes aromatic polyamides (aramids) as well as aliphatic polyamides. Specific examples of the polyimide resin include compounds having a structure represented by the below-described chemical formula (1) or (2). In the below-described chemical formulae, n represents the number of repeating units, which is an integer of 2 or more. In this regard, a compound represented by the chemical formula (1) is preferable among the compounds represented by the below-described chemical formulae (1) and (2) because the former has a low phase difference and high transparency.

[Chem. 1]

(1)

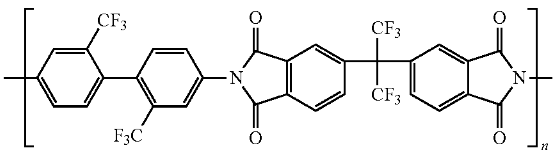

[Chem. 2]

(2)

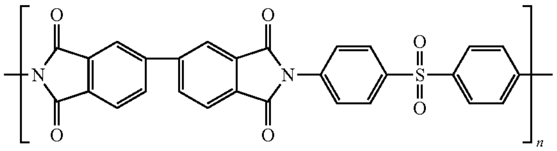

The thickness of the base material 11 is not limited to any particular value, and can be made 500 μm or less. In terms of handling or the like and in terms of further thinness, the thickness of the base material 11 is more preferably 3 μm or more and 500 μm or less, 3 μm or more and 250 μm or less, 3 μm or more and 100 μm or less, 3 μm or more and 80 μm or less, 3 μm or more and 50 μm or less, 5 μm or more and 500 μm or less, 5 μm or more and 250 μm or less, 5 μm or more and 100 μm or less, 5 μm or more and 80 μm or less, 5 μm or more and 50 μm or less, 10 μm or more and 500 μm or less, 10 μm or more and 250 μm or less, 10 μm or more and 100 μm or less, 10 μm or more and 80 μm or less, 10 μm or more and 50 μm or less, μm or more and 500 μm or less, 20 μm or more and 250 μm or less, 20 μm or more and 100 μm or less, 20 μm or more and 80 μm or less, or 20 μm or more and 50 μm or less. Furthermore, in cases where flexibility is considered to be more important, the thickness of the base material 11 is more preferably 3 μm or more and 35 μm or less, 5 μm or more and 35 μm or less, 10 μm or more and 35 μm or less, or 20 μm or more and 35 μm or less, particularly preferably 3 μm or more and 18 μm or less, 5 μm or more and 18 μm or less, or 10 μm or more and 18 μm or less. The thickness of the base material is determined as the average value of the thickness values at eight locations obtained by excluding the maximum value and the minimum value from the thickness values measured at ten locations, wherein the thickness values measured at the ten locations are randomly selected in a cross-sectional image of the base material acquired using a transmission electron microscope (TEM), a scanning transmission electron microscope (STEM), or scanning electron microscope (SEM). The base material generally has uneven thickness. In cases where the base material is for optical use, the unevenness in the thickness is the average thickness value±2 μm or less, more preferably ±1 μm or less.

Measuring the thickness of the base material using a transmission electron microscope (TEM) or a scanning transmission electron microscope (STEM) can be performed in the same manner as measuring the thickness of the first electroconductive part 12. However, the magnification used for acquiring a cross-sectional image of the base material 11 is from 100 to 20,000 times. In cases where the thickness of the base material is measured using a scanning electron microscope (SEM), the cross-section of the base material may be obtained using an ultramicrotome (product name "Ultramicrotome EM U07", manufactured by Leica Microsystems GmbH) or the like. As a sample for TEM or STEM, ultra-thin sections are produced using the ultramicrotome at a feeding rate of 100 nm. The ultra-thin sections produced are collected on collodion-coated meshes (150) to obtain the sample for TEM or STEM. Upon cutting with the ultramicrotome, the sample may be subjected to a pretreatment that facilitates cutting, such as embedding the sample in a resin.

Electroconductive fibers such as silver nanowires are themselves suitable in terms of, for example, flexibility, but if a base material on which to laminate an electroconductive part containing electroconductive fibers has a large thickness or if a resin layer has a large thickness, the base material and the resin layer at the bent part generate breaks when folded, the breaks will undesirably cause the electroconductive fibers to be broken, and the base material and the resin layer at the bent part generate creases and microcracks in some cases. The above-mentioned breakage makes it impossible to obtain an intended resistance value and, in addition, will undesirably cause poor appearance, specifically white turbidity and poor adhesion due to cracks. Thus, it will be important to control the thickness of the base material and/or the resin layer and the adhesion between layers (the adhesion by chemical bonding, which is depending on the types of materials, and/or the physical adhesion, which prevents cracking) if the sensor is used for flexible uses. In particular, in cases where the base material 11 contains a polyester resin or polyimide resin, the breakage depends on the thickness, and thus, it is important to control the thickness of the base material.

For example, the base material 11 preferably has a thickness of 45 μm or less in cases where the base material 11 contains a polyester resin. In cases where the base material 11 has a thickness of 45 μm or less, the base material 11 can be inhibited from being broken at the bent part when folded and makes it possible to inhibit white turbidity at the bent part. In terms of handling or the like, the thickness of the base material 11 in this case is preferably 5 μm or more and 45 μm or less, 5 μm or more and 35 μm or less, or 5 μm or more and 29 μm or less, particularly preferably 5 μm or more and 18 μm or less.

For example, in cases where the base material 11 contains a polyimide resin, polyamide resin, polyamide-imide resin, or a mixture thereof, the thickness of the base material 11 is preferably smaller in terms of inhibiting the base material 11 from being broken when folded, and in terms of optical characteristics and mechanical characteristics, and specifically, the thickness is preferably 75 μm or less. In terms of handling or the like, the thickness of the base material 11 in this case is preferably 5 μm or more and 70 μm or less, 5 μm or more and 50 μm or less, 5 μm or more and 35 μm or less, or 5 μm or more and 29 μm or less, and is particularly preferably 5 μm or more and 20 μm or less, or 5 μm or more and 18 μm or less.

The above-described base material having a thickness of 5 μm or more and 35 μm or less, particularly 5 μm or more and 20 μm or less, or 5 μm or more and 18 μm or less, has better processing suitability when the base material has a protective film attached thereto during production, and thus, is preferable.

The base material 11 may have a surface treated by a physical treatment such as corona discharge treatment or oxidation treatment to improve the adhesion. Additionally, the base material 11 may have an underlayer on at least one face thereof for the purpose of improving adhesion to other layers, preventing the base material from sticking to itself when the base material is rolled, and/or inhibiting crater formation on the surface of a coating liquid applied for forming another layer. However, in cases where an electroconductive part is formed on the surface of an underlayer using an electroconductive fiber dispersion liquid containing electroconductive fibers and a dispersion medium, permeation of the dispersion medium into the underlayer, the extent of which varies depending on the type of the dispersion system, may involve transfer of the electroconductive fibers into the underlayer and will consequently increase the electrical resistance value undesirably, and thus, it is preferable that the electroconductive part side of the base material is not provided with an underlayer and that the electroconductive part is directly provided on the base material. In this specification, the underlayer provided on at least one face of the base material and attached to the base material will be a part of the base material.

The underlayer is a layer having a function that enhances adhesion to other layers, a function that prevents the base material from sticking to itself when the base material is rolled, and/or a function that inhibits crater formation on the surface of a coating liquid applied for forming another layer. Whether the base material has an underlayer can be determined by observing a cross-section at and near the interface between the base material 11 and the first electroconductive part 12 and at and near the interface between the base material 11 and the resin layer 17 using a scanning electron microscope (SEM), a scanning transmission electron microscope (STEM), or a transmission electron microscope (TEM) at a magnification of 1,000 to 500,000 times (preferably 25,000 to 50,000 times). The underlayer may contain particles as, for example, lubricant additives for the purpose of preventing the base material from sticking to itself when the base material is rolled. Accordingly, this layer can be identified as an underlayer by the presence of the particles between the base material and each of the first electroconductive part and the second electrode portion.

The film thickness of the underlayer is preferably 10 nm or more and 1 μm or less. The underlayer having a film thickness of 10 nm or more allows the underlayer to achieve its functions sufficiently, and the underlayer having a film thickness of 1 μm or less will not undesirably have any optical impact. The film thickness of the underlayer is determined as the arithmetic mean of the thickness values at eight locations obtained by excluding the maximum value and minimum value from the thickness values measured at ten locations, wherein the thickness values measured at the ten locations are randomly selected in a cross-sectional image acquired from the underlayer using a scanning electron microscope (SEM), a scanning transmission electron microscope (STEM), or a transmission electron microscope (TEM) at a magnification of 1,000 to 500,000 times (preferably a magnification of to 50,000 times). The film thickness of the underlayer is more preferably 10 nm or more and 150 nm or less, 30 nm or more and 1 μm or less, 30 nm or more and 150 nm or less. The film thickness of the underlayer can also be measured in the same manner as the film thickness of the first electroconductive part 12. When a cross-sectional image is acquired by SEM, TEM, or STEM, a sample is preferably created using an ultramicrotome as described above.

The underlayer contains, for example, an anchoring agent and/or a priming agent. As the anchoring agent and the priming agent, at least any of, for example, polyurethane resins, polyester resins, polyvinyl chloride resins, polyvinyl acetate resins, vinyl chloride-vinyl acetate copolymers, acrylic resins, polyvinyl alcohol resins, polyvinyl acetal resins, copolymers of ethylene and vinyl acetate or acrylic acid, copolymers of ethylene and styrene and/or butadiene, thermoplastic resins such as olefin resins and/or modified resins thereof, polymers of radiation-polymerizable compounds, polymers of thermopolymerizable compounds, or the like can be used.

The underlayer may contain particles of a lubricant or the like for the purpose of preventing the sensor from sticking to itself when the sensor is rolled, as above-mentioned. Examples of the particles include silica particles.

<<First Electroconductive Part>>

The first electroconductive part 12 is an electrically conductible part. In cases where conduction is determined from the surface resistance value of the first electroconductive part 12, a surface resistance value of less than 2000Ω/□ on the first electroconductive part 12 makes it possible to judge that the first electroconductive part 12 affords electrical conduction. The surface resistance value of the first electroconductive part 12 is determined as follows. First, a sample S1 to be used for a foldability test is produced. After the sample S1 is obtained, the probe terminals of a tester (product name "Digital MΩ Hitester 3454-11", manufactured by Hioki E.E. Corporation) is contacted with the cured silver paste 21 in an environment at a temperature of 23±5 °C and a relative humidity of 30% or more and 70% or less to measure the resistance value. Specifically, the Digital MΩ Hitester 3454-11 includes two probe terminals (a red probe terminal and a black probe terminal, which are both pin-type terminals). The red probe terminal is contacted with one portion of the cured silver paste 21, wherein the portion is in contact with the first electroconductive part 12. The black probe terminal is contacted with the other portion of the cured silver paste 21, wherein the other portion is in contact with the first electroconductive part 12. The resistance value is thus measured. Then, the surface resistance value of the first electroconductive part 12 is determined from the following equation (1).

$$Rs = R \times (C_W \times C_N / C_L) \quad (1)$$

In the equation (1) above, Rs is a surface resistance value (Ω/□), R is a measured resistance value (Ω), $C_W$ is the line width (μm) of one first electroconductive part, $C_N$ is the number of first electroconductive parts, and $C_L$ is the line length (μm) of one first electroconductive part.

The surface resistance value of the first electroconductive part 12 is preferably 3Ω/□ or more and 1000Ω/□ or less. With a surface resistance value of 3Ω/□ or more on the first electroconductive part 12, the optical performance is sufficient. In addition, a surface resistance value of 1000Ω/□ or less on the first electroconductive part 12 makes it possible to inhibit a problem such as a slow speed of response in touch panel applications in particular. The surface resistance value of the first electroconductive part 12 is more preferably 3Ω/□ or more and 100Ω/□ or less, 3Ω/□ or more and 70Ω/□ or less, 3Ω/□ or more and 60Ω/□ or less, 3Ω/□ or more and 50Ω/□ or less, 5Ω/□ or more and 1000Ω/□ or less, 5Ω/□ or more and 100Ω/□ or less, 5Ω/□ or more and 70Ω/□ or less, 5Ω/□ or more and 60Ω/□ or less, 5 Ω/□ or more and 50Ω/□ or less, 10Ω/□ or more and 1000Ω/□ or less, 10Ω/□ or more and 100Ω/□ or less, 10Ω/□ or more and 70Ω/□ or less, 10Ω/□ or more and 60Ω/□ or less, or 10Ω/□ or more and 50Ω/□ or less.

In cases where conduction is determined from the line resistance value of the first electroconductive part 12, a line resistance value of less than 20000Ω on at least the first electroconductive part 12 makes it possible to judge that the surface of the first electroconductive part 12 affords electrical conduction. The line resistance value of the first electroconductive part 12 is determined as follows. First, the resistance value of a sample is measured in the same manner as the surface resistance value of the first electroconductive part 12. Then, the line resistance value of the first electroconductive part 12 is determined from the following equation (2).

$$R_L = R \times C_N \quad (2)$$

In the equation (2) above, $R_L$ is a line resistance value (Ω), R is a measured resistance value (Ω), and $C_N$ is the number of electroconductive parts.

The line resistance value of the first electroconductive part 12 is preferably 15000Ω or less. In cases where the first electroconductive parts 12 each have a line resistance value of 15000Ω or less, a problem such as a slow speed of response can be inhibited in touch panel applications in particular. The line resistance value of the first electroconductive part 12 is more preferably 20Ω or more and 15000Ω or less, 20Ω or more and 12000 or less, 20Ω or more and 8000Ω or less, 20Ω or more and 1000Ω or less, 100Ω or more and 15000Ω or less, 100Ω or more and 12000Ω or less, 100Ω or more and 8000Ω or less, 100Ω or more and 1000Ω or less, 200Ω or more and 15000Ω or less, 200Ω or more and 12000Ω or less, 200 or more and 8000Ω or less, or 200Ω or more and 1000Ω or less.

The thickness T1 of the first electroconductive part 12 (see FIG. 2) is preferably 160 nm or more and 1.8 μm or less. The first electroconductive part 12 having a thickness of 160 nm or more can cover the electroconductive fiber 18A, and in addition, 1.8 μm or less makes it possible to obtain good flexibility. In terms of ensuring that the electroconductive fibers 18A are covered, the thickness of the first electroconductive part 12 is more preferably 160 nm or more and 1.6 μm or less, 160 nm or more and 1.5 μm or less, 160 nm or more and 1.2 μm or less, 180 nm or more and 1.8 μm or less, 180 nm or more and 1.6 μm or less, 180 nm or more and 1.5 μm or less, 180 nm or more and 1.2 μm or less, 200 nm or more and 1.8 μm or less, 200 nm or more and 1.6 μm or less, 200 nm or more and 1.5 μm or less, 200 nm or more and 1.2 μm or less, 250 nm or more and 1.8 μm or less, 250 nm or more and 1.6 μm or less, 250 nm or more and 1.5 μm or less, or 250 nm or more and 1.2 μm or less.

The thickness of the first electroconductive part 12 means the maximum thickness from the first face 11A of the base material 11 to the surface of the first electroconductive part 12.

The thickness of the first electroconductive part 12 is determined as the arithmetic mean of the thickness values at eight locations obtained by excluding the maximum value and the minimum value from the thickness values measured at ten locations, wherein the thickness values measured at the ten locations are randomly selected in a cross-sectional image acquired from the first electroconductive part 12 using a scanning transmission electron microscope (STEM), transmission electron microscope (TEM), or scanning electron microscope (SEM).

A specific method of acquiring a cross-sectional image will be described below. First, a sample for observing a cross-section is produced from the sensor by the same method as described above. In some of the cases where this sample conducts no electricity, an image observed by STEM will appear blurry. Thus, the sample is preferably sputtered with Pt—Pd for about seconds. The sputtering time can be appropriately adjusted, but needs careful attention. A period of 10 seconds is too short, and a period of 100 seconds is so long that the metal used for sputtering is observed as particulate foreign bodies. Then, a cross-sectional image of an STEM sample is acquired using a scanning transmission electron microscope (STEM) (for example, product name "S-4800 (Type 2)", manufactured by Hitachi High-Technologies Corporation). The cross-sectional image is acquired and observed under STEM by setting the detector switch (signal selection) to "TE", the accelerating voltage to "30 kV", and the emission current to "10 μA". The focus, contrast, and brightness are appropriately adjusted at a magnification of 5,000 to 200,000 times so that each layer can be identified. The magnification is preferably in the range from 10,000 to 100,000 times, more preferably in the range from 10,000 to 50,000 times, most preferably in the range from 25,000 to 50,000 times. The cross-sectional image may be acquired by additionally setting the beam monitor aperture to 3 and the objective lens aperture to 3, and also setting the WD to 8 mm. For the measurement of the film thickness of the first electroconductive part or the second electroconductive part, it is important that the contrast at the interface between the electroconductive part and another layer (such as the base material or the embedding resin) can be observed as clearly as possible upon observation of a cross-section. If the interface is hard to observe owing to a lack of contrast, the surface of the electroconductive part may undergo any pretreatment process commonly used for electron microscopy, such as formation of a metal layer of Pt—Pd, Pt, Au, or the like by sputtering. Additionally, the sample may be stained with osmium tetraoxide, ruthenium tetraoxide, phosphotungstic acid, or the like because such staining enables easier observation of the interface between organic layers. Furthermore, the contrast of the interface may be hard to observe at a higher magnification. In that case, the sample is also observed at a lower magnification. For example, the first electroconductive part is observed at two different magnifications including a higher magnification, such as 25,000 or 50,000 times, and a lower magnification, such as 50,000 or 100,000 times, to determine the above-mentioned arithmetic means at both the magnifications, which are further averaged to determine the line thickness of the electroconductive part.

The first electroconductive part 12 functions, for example, as an electrode in the X direction in a projected capacitive touch panel. The first electroconductive part 12 is provided in a rectangular active area that is a region where a position of touch can be detected.

A described above, the first electroconductive part 12 has a plurality of first electrode portions 12A and the wiring portion 12B.

<First Electrode Portion>

The first electrode portion 12A is not limited to any particular shape, and may be, for example, in the shape of a quadrilateral, rhomb, or the like. The width W1 (electrode width) of the first electrode portion 12A needs to be equal to or smaller than the area of contact with a finger (approximately 10 mm in diameter), and thus, is preferably 10 mm or less. The width W1 of the first electrode portion 12A may be 0.35 mm or more and 10 mm or less, mm or more and 9 mm or less, 0.35 mm or more and 8.5 mm or less, mm or more and 8 mm or less, 0.5 mm or more and 10 mm or less, 0.5 mm or more and 9 mm or less, 0.5 mm or more and 8.5 mm or less, 0.5 mm or more and 8 mm or less, 0.7 mm or more and 10 mm or less, 0.7 mm or more and 9 mm or less, 0.7 mm or more and 8.5 mm or less, or 0.7 mm or more and 8 mm or less.

As depicted in FIG. 2, the first electrode portion 12A contains a resin portion 17A and a plurality of electroconductive fibers 18A (first electroconductive fibers) disposed in the resin portion 17A. The term "electroconductive fiber" as used herein refers to a fiber having electroconductivity and a length sufficiently longer than the thickness (for example, the diameter), specifically a length five times or more as long as the thickness (with an aspect ratio (length/thickness) of 5 or more). The resin portion 17A and the below-described resin portion 17B are each part of the resin layer 17 depicted in FIG. 2. The first electrode portion 12A is formed in desired shape, and thus, the first electrode portion 12A contains an electroconductive fiber pattern 12A1 composed of a plurality of the electroconductive fibers 18A, and formed in desired shape (see FIG. 2).

(Resin)

The resin portion 17A covers the electroconductive fibers 18A. Covering the electroconductive fibers 18A with the resin portion 17A makes it possible to prevent the electroconductive fibers 18A from being detached from the first electrode portion 12A and the second electrode portion 13A, and to enhance the durability and abrasion resistance of the first electrode portion 12A and the second electrode portion 13A.

The thickness of the resin portion 17A is similar to the thickness of the first electroconductive part 12, and further description is thus omitted here.

Without particular limitation, the resin portion 17A is preferably a light-transmitting resin in cases where the sensor is used for optical applications.

Examples of the resin portion 17A include resins containing a polymer (a cured or cross-linked product) of a polymerizable compound. The resin portion 17A may contain a resin which cures by solvent evaporation, in addition to a polymer of a polymerizable compound. Examples of the polymerizable compound include radiation-polymerizable compounds and/or thermopolymerizable compounds. Among these, radiation-polymerizable compounds are preferable as such polymerizable compounds in terms of a higher speed of curing and easiness of designing.

The radiation-polymerizable compound refers to a compound having at least one radiation-polymerizable functional group in one molecule. The term "radiation-polymerizable functional group" as used herein refers to a functional group which can undergo radiation-induced polymerization. Examples of the radiation-polymerizable functional group include ethylenic unsaturated groups such as (meth)acryloyl group, vinyl group, and allyl group. Both "acryloyl group" and "methacryloyl group" are meant by the word "(meth)acryloyl group". Additionally, the types of ionizing radiation applied to induce polymerization of a radiation-polymerizable compound include visible light, ultraviolet light, X ray, electron beam, α ray, β ray, and γ ray.

Examples of the radiation-polymerizable compound include radiation-polymerizable monomers, radiation-polymerizable oligomers, and radiation-polymerizable prepolymers, and these compounds can be used as appropriate. A combination of a radiation-polymerizable monomer and a radiation-polymerizable oligomer or a radiation-polymerizable prepolymer is preferred as the radiation-polymerizable compound.

Examples of the radiation-polymerizable monomer include: monomers containing a hydroxyl group(s), such as 2-hydroxyethyl (meth)acrylate and 2-hydroxypropyl (meth)

acrylate; and (meth)acrylate esters, such as 2-ethylhexyl (meth)acrylate, ethylene glycol di(meth)acrylate, diethylene glycol di(meth)acrylate, triethylene glycol di(meth)acrylate, tetraethylene glycol di(meth)acrylate, tetramethylene glycol di(meth)acrylate, trimethylolpropane tri(meth)acrylate, trimethylolethane tri(meth)acrylate, pentaerythritol di(meth) acrylate, pentaerythritol tri(meth)acrylate, pentaerythritol tetra(meth)acrylate, dipentaerythritol tetra(meth)acrylate, dipentaerythritol hexa(meth)acrylate, and glycerol (meth) acrylate.

The radiation-polymerizable oligomer is preferably a polyfunctional oligomer having two or more functional groups, preferably a polyfunctional oligomer having three or more radiation-polymerizable functional (trifunctional or more polyfunctional) groups. Examples of the above-described polyfunctional oligomer include polyester (meth) acrylate, urethane (meth)acrylate, polyester-urethane (meth) acrylate, polyether (meth)acrylate, polyol (meth)acrylate, melamine (meth)acrylate, isocyanurate (meth)acrylate, and epoxy (meth)acrylate.

The radiation-polymerizable prepolymer has a weight average molecular weight of 10,000 or more, preferably a weight average molecular weight of or more and 80,000 or less, more preferably a weight average molecular weight of 10,000 or more and 40,000 or less. In cases where the polymerizable prepolymer has a weight average molecular weight of more than 80,000, the coating suitability is reduced owing to the high viscosity of the prepolymer, which will undesirably deteriorate the appearance of a resulting light-transmitting resin. Examples of the polyfunctional prepolymer include urethane (meth)acrylate, isocyanurate (meth)acrylate, polyester-urethane (meth)acrylate, and epoxy (meth)acrylate.

The thermopolymerizable compound refers to a compound having at least one thermopolymerizable functional group in one molecule. The term "thermopolymerizable functional group" as used herein refers to a functional group which can undergo heat-induced polymerization with the same type of functional group or with other types of functional groups. Examples of the thermopolymerizable functional group include a hydroxyl group, carboxyl group, isocyanate group, amino group, cyclic ether group, and mercapto group.

Examples of the thermopolymerizable compound include, but are not limited particularly to, epoxy compounds, polyol compounds, isocyanate compounds, melamine compounds, urea compounds, and phenol compounds.

The resin which cures by solvent evaporation refers to a resin, such as a thermoplastic resin, which forms a coating film just by evaporation of a solvent added to adjust the solid content in a coating process. In forming the electrically-insulating layer 14, addition of a resin which cures by solvent evaporation can effectively prevent failure in coating on a surface where a coating liquid is applied. The resin which cures by solvent evaporation is not limited to any particular resin, and a thermoplastic resin can generally be used as the resin which cures by solvent evaporation.

Examples of the thermoplastic resin include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubber or elastomer materials.

The thermoplastic resin is preferably amorphous and soluble in an organic solvent (particularly, a common solvent which can dissolve a plurality of polymers or curable compounds). In particular, for example, styrene resins, (meth)acrylic resins, alicyclic olefin resins, polyester resins, and cellulose derivatives (such as cellulose esters) are preferred in terms of transparency and/or weather resistance.

The resin portion 17A can be formed using a curable resin composition containing a polymerizable compound or the like. Such a resin composition contains the above-described polymerizable compound and the like, and may additionally contain a solvent and a polymerization initiator, if necessary. Furthermore, the resin composition may be supplemented with, for example, a conventionally known dispersing agent, surfactant, silane coupling agent, thickener, coloring inhibitor, coloring agent (pigment and dye), antifoam agent, flame retardant, ultraviolet absorber, adhesion promoter, polymerization inhibitor, antioxidant, surface modifier, and/or lubricant in accordance with various purposes of, for example, increasing hardness, reducing cure shrinkage, and/or controlling refractive index in the resin.

Examples of the solvent include alcohols (such as methanol, ethanol, propanol, isopropanol, n-butanol, s-butanol, t-butanol, benzyl alcohol, PGME, and ethylene glycol), ketones (such as acetone, methyl ethyl ketone (MEK), cyclohexanone, methyl isobutyl ketone, diacetone alcohol, cycloheptanone, and diethyl ketone), ethers (such as 1,4-dioxane, dioxolane, diisopropyl ether dioxane, and tetrahydrofuran), aliphatic hydrocarbons (such as hexane), alicyclic hydrocarbons (such as cyclohexane), aromatic hydrocarbons (such as toluene and xylene), halocarbons (such as dichloromethane and dichloroethane), esters (such as methyl formate, methyl acetate, ethyl acetate, propyl acetate, butyl acetate, and ethyl lactate), cellosolves (such as methyl cellosolve, ethyl cellosolve, and butyl cellosolve), cellosolve acetates, sulfoxides (such as dimethyl sulfoxide), amides (such as dimethylformamide and dimethylacetamide), and combinations thereof.

The polymerization initiator is a component that generates radicals or ionic species upon degradation induced by exposure to light or heat and initiates or promotes the polymerization (cross-linking) of a polymerizable compound. Examples of a polymerization initiator used in the resin composition include photopolymerization initiators (for example, photo-radical polymerization initiators, photo-cationic polymerization initiators, photo-anionic polymerization initiators), thermal polymerization initiators (for example, thermal radical polymerization initiators, thermal cationic polymerization initiators, thermal anionic polymerization initiators), and combinations thereof.

As above-described, in cases where the sensor 10 is used in flexibility applications, it is important that the resin 17 is caused to adhere to the base material 11, and conform to the base material 11 when folded. To form such a resin 17 that adheres to the base material 11 and can conform to the base material 11 when folded, it is preferable to use an oxime ester compound as a polymerization initiator. Examples of commercially available oxime ester compounds include IRGACURE (registered trademark) OXE01, IRGACURE (registered trademark) OXE02, and IRGACURE (registered trademark) OXE03 (which are all manufactured by BASF Japan Ltd.).

(Electroconductive Fibers)

A plurality of the electroconductive fibers 18A are present in the resin portion 17A. The first electrode portion 12A is electrically conductible, and accordingly, the electroconductive fibers 18A are in contact with each other in the thickness direction of the first electrode portion 12A.

In the first electrode portion 12A, it is preferable that the electroconductive fibers 18A are in contact with each other to form a network structure (meshwork) in the surface direction (two-dimensional direction) of the first electrode portion 12A. Formation of the electroconductive fibers 18A into a network structure enables a conductive path to be formed.

The thicker the electroconductive fiber, the more portions at which the electroconductive fibers overlap with each other. Thus, a low line resistance value can be achieved. In some cases, however, excessive overlap of the electroconductive fibers result in increasing the cost and making it difficult to maintain a low haze value. Because of this, the thickness of the electroconductive fiber 18A is preferably 300 nm or less. In terms of optical characteristics and further thinness, the thickness of the first electroconductive part is preferably smaller as long as the low line resistance value can be maintained. In terms of attempting at further thinness, and in terms of obtaining good optical characteristics such as a low haze value, the thickness of each of the electroconductive fibers 18A is 10 nm more preferably or more and 200 nm or less, 10 nm or more and 145 nm or less 10 nm or more and 140 nm or less, 10 nm or more and 120 nm or less, 10 nm or more and 110 nm or less, 10 nm or more and 80 nm or less, or 10 nm or more and 50 nm or less. The electroconductive fiber 18A having a thickness of 10 nm or more can afford stable electrical conduction. To obtain stabler electrical conduction, it is desirable that two or more electroconductive fibers overlap with each other to be in contact, and thus, the lower limit of the thickness of the electroconductive fiber 18A is more preferably 20 nm or more and 200 nm or less, 20 nm or more and 145 nm or less, 20 nm or more and 140 nm or less, 20 nm or more and 120 nm or less, nm or more and 110 nm or less, 20 nm or more and 80 nm or less, 20 nm or more and 50 nm or less, 30 nm or more and 200 nm or less, 30 nm or more and 145 nm or less, 30 nm or more and 140 nm or less, 30 nm or more and 120 nm or less, 30 nm or more and 110 nm or less, 30 nm or more and nm or less, or 30 nm or more and 50 nm or less. In this regard, the electroconductive fiber 18A having a thickness of 300 nm or less affords a stable line resistance value in terms of obtaining flexibility in cases where the above-mentioned gap φ is rather large and where the folding and unfolding process is repeated about 100,000 times. Additionally, in cases were the above-described gap φ is small, and where the folding and unfolding process is repeated more than 100,000 times, the thickness of the electroconductive fiber 18A is preferably smaller, and is preferably, for example, 10 nm or more and 200 nm or less, 10 nm or more and 145 nm or less, 10 nm or more and 120 nm or less, 20 nm or more and 200 nm or less, 20 nm or more and 145 nm or less, 20 nm or more and 120 nm or less, 30 nm or more and 200 nm or less, 30 nm or more and 145 nm or less, or 30 nm or more and 120 nm or less.

In cases where the average fiber diameter of the electroconductive fibers 18A is measured using the sensor 10, the average fiber diameter of the electroconductive fibers 18A is preferably 30 nm or less. The electroconductive fibers 18A having an average fiber diameter of 30 nm or less makes it possible to inhibit the sensor 10 from having an increased haze value, and to have a sufficient light transmittance. In terms of the electroconductivity of the first electrode portion 12A, the average fiber diameter of the electroconductive fibers 18A is more preferably 5 nm or more and 28 nm or less, 5 nm or more and 25 nm or less, 5 nm or more and 20 nm or less, 7 nm or more and 28 nm or less, 7 nm or more and 25 nm or less, 7 nm or more and 20 nm or less, 10 nm or more and 28 nm or less, 10 nm or more and 25 nm or less, or 10 nm or more and 20 nm or less. Among these, a more preferable range of the fiber diameter of the electroconductive fiber 18A is 7 nm or more and 25 nm or less to control the balance between the resistance value and the haze value within a preferable range.

In cases where the average fiber diameter of the electroconductive fibers 18A is measured using the sensor 10, a cross-sectional image of the first electrode portion is acquired using a scanning transmission electron microscope (STEM, product name "S-4800", manufactured by Hitachi High-Technologies Corporation), and ten electroconductive fibers 18A are observed in the cross-sectional image. The shortest diameter (minor axis) of each of the electroconductive fibers 18A is measured. From the ten data, the smallest three data are selected, and the average fiber diameter of the electroconductive fibers 18A is determined as the arithmetic mean of the three data. A specific method of acquiring a cross-sectional image will be described below. First, a sample containing the first electrode portion is cut to a size of 1 mm×10 mm out of a sensor, and placed in a silicone embedding plate, into which an epoxy resin is poured, and the whole sample is embedded in the resin. Then, the embedding resin is left to stand at 25 °C for 12 hours or more and cured. Subsequently, ultra-thin sections are produced using an ultramicrotome (product name "Ultramicrotome EM UC7", manufactured by Leica Microsystems GmbH) at a feeding rate of 100 nm. The ultra-thin sections produced are collected on collodion-coated meshes (150) to obtain the sample for STEM. Then, a cross-sectional image of an STEM sample is acquired using a scanning transmission electron microscope (STEM) (product name "S-4800 (Type 2)", manufactured by Hitachi High-Technologies Corporation). The cross-sectional image is acquired by setting the detector switch (signal selection) to "TE", the accelerating voltage to 30 kV, and the emission current to "10 μA". The focus, contrast, and brightness are appropriately adjusted at a magnification of 5,000 to 200,000 times so that each layer can be identified. The magnification is preferably in the range from 10,000 to 50,000 times, more preferably in the range from 25,000 to 40,000 times. An excessively increased magnification causes the interface to have a coarse pixel, and to be difficult to recognize, and thus, the magnification is preferably not increased excessively during the measurement of the fiber diameter. The cross-sectional image is acquired by additionally setting the beam monitor aperture to 3 and the objective lens aperture to 3, and also setting the WD to 8 mm.

As described below, the first electrode portion 12A is formed using the electroconductive fiber dispersion liquid containing the electroconductive fibers 18A. The average fiber diameter of the electroconductive fibers 18A can also be measured using an electroconductive fiber dispersion liquid. In cases where the average fiber diameter of the electroconductive fibers 18A is measured in the electroconductive fiber dispersion liquid, the preferable range of the average fiber diameter of the electroconductive fibers 18A is the same as the preferable range of the average fiber diameter of the electroconductive fibers 18A in cases where the average fiber diameter of the electroconductive fibers 18A is measured using the sensor 10.

Below, an example in which the average fiber diameter of the electroconductive fibers 18A is measured using an electroconductive dispersion liquid will be described. The average fiber diameter is determined as the arithmetic mean of the fiber diameters of 100 electroconductive fibers in 50 images acquired at a magnification of 100,000 to 200,000 times, for example, using a transmission electron microscope (TEM) (for example, product name "H-7650", manufactured by Hitachi High-Technologies Corporation), wherein the fiber diameters are measured on the acquired images with a software program accessory to the TEM. The fiber diameter is measured using the above-mentioned H-7650 by setting the accelerating voltage to "100 kV", the emission current to "10 μA", the condenser lens aperture to "1", the objective lens aperture to "0", the observation mode to "HC", and the Spot to "2". Additionally, the fiber diameter of the electroconductive fibers can also be measured using a scanning transmission electron microscope (STEM) (for example, product name "S-4800 (Type 2)", manufactured by Hitachi High-Technologies Corporation). In that case, the average fiber diameter of the electroconductive fibers will be determined as the arithmetic mean of the fiber diameters of 100 electroconductive fibers in 50 images acquired at a magnification of 100,000 to 200,000 times using the STEM, wherein the fiber diameters are measured on the acquired images by a software program accessory to the STEM. The fiber diameter is measured using the above-mentioned S-4800 (Type 2) by setting the signal selection to "TE", the accelerating voltage to "30 kV", the emission current to "10 μA", the probe current to "Norm", the focus mode to "UHR", the condenser lens 1 to "5.0", the WD to "8 mm", and the Tilt to "0°".

When the fiber diameter of the electroconductive fibers 18A is measured using an electroconductive dispersion liquid, a measurement sample produced by the following method is used. In this respect, TEM measurement is performed at high magnifications and it is consequently critical to reduce the concentration of the electroconductive fiber dispersion liquid as much as possible for the purpose of preventing overlap of the electroconductive fibers as much as possible. Specifically, the electroconductive fiber dispersion liquid is preferably diluted with water or alcohol depending on the dispersion medium to reduce the concentration of electroconductive fibers to 0.05 mass % or less or to reduce the solid content to 0.2 mass % or less. Furthermore, a drop of the diluted electroconductive fiber dispersion liquid is applied to a carbon-coated grid mesh for TEM or STEM observation, dried at room temperature, and then observed under the above-mentioned conditions to obtain observation image data. The resulting observation image data are used to calculate the arithmetic mean. As the carbon-coated grid mesh, a Cu grid with the model "#10-1012, Elastic Carbon Film ELS-C10 in the STEM Cu100P grid specification" is preferred, and any grid having better resistance against electron beam exposure and a higher electron beam transmittance than a plastic substrate, and thus being suitable for observation at a high magnification, and having better resistance against organic solvents is also preferred. Additionally, a drop of the diluted electroconductive fiber dispersion liquid can be applied to a grid mesh placed on a slide glass because the grid mesh is so small that it is difficult to apply the drop of the diluted electroconductive fiber dispersion liquid to a plain grid mesh.

The above-described fiber diameter can be obtained by image-based measurement or may be calculated from the binarized image data. In the case of actual measurement, images may be printed or enlarged as appropriate. In that case, each electroconductive fiber is visualized in darker black than other components. In the measurement, a starting point and an end point are selected as the measurement points on the outer contour of each fiber. The concentration of electroconductive fibers will be obtained based on the ratio of the mass of the electroconductive fibers to the total mass of the electroconductive fiber dispersion liquid, while the solid content will be obtained based on the ratio of the mass of all components except for the dispersion medium (including the electroconductive fibers, the resin component, and other additives) to the total mass of the electroconductive fiber dispersion liquid. The fiber diameter determined using an electroconductive fiber dispersion liquid and the fiber diameter determined by actual measurement using an image are substantially the same values.

The average fiber length of the electroconductive fibers 18A can be measured using an electroconductive fiber dispersion liquid. In cases where the average fiber length of the electroconductive fibers 18A is measured using the electroconductive fiber dispersion liquid, the average fiber length of the electroconductive fibers 18A is preferably 15 μm or more and 20 μm or less to inhibit white turbidity. The electroconductive fibers 18A having an average fiber length of 15 μm or more make it possible to form a first electrode portion having sufficient electroconductive performance, and will not cause an influence for white turbidity by aggregation, a higher haze value, or a lower light transmittance. In addition, the electroconductive fibers 18A having an average fiber length of 20 μm or less makes it possible to perform coating without clogging the filter. In this regard, the average fiber length of the electroconductive fibers 18A may be 5 μm or more and 40 μm or less, 5 μm or more and 35 μm or less, 5 μm or more and 30 μm or less, 5 μm or more and 20 μm or less, 7 μm or more and 40 μm or less, 7 μm or more and 35 μm or less, 7 μm or more and 30 μm or less, 7 μm or more and 20 μm or less, 10 μm or more and 40 μm or less, 10 μm or more and 35 μm or less, 10 μm or more and 30 μm or less, 10 μm or more and 20 μm or less, 15 μm or more and 40 μm or less, 15 μm or more and 35 μm or less, or 15 μm or more and 30 μm or less.

Below, an example in which the average fiber length of the electroconductive fibers 18A is measured using an electroconductive dispersion liquid will be described. The average fiber length will be determined as the arithmetic mean of the fiber length values of 98 electroconductive fibers obtained by excluding the maximum value and the minimum value from the fiber lengths of 100 electroconductive fibers in 10 images acquired at a magnification of 500 to 20,000,000 times, for example, using a scanning electron microscope (SEM) (for example, product name "5-4800 (Type 2)", manufactured by Hitachi High-Technologies Corporation) on the SEM mode, wherein the fiber lengths of the 100 electroconductive fibers are measured on the acquired images by an accessory software program. The fiber lengths are measured using the above-described S-4800 (Type 2) together with a 45° pre-tilted sample stub by setting the signal selection to "SE", the accelerating voltage to "3 kV", the emission current to "10 μA to 20 μA", the SE detector to "Mixed", the probe current to "Norm", the focus mode to "UHR", the condenser lens 1 to "5.0", the WD to "8 mm", and the Tilt to "30°". Because no TE detector is used for SEM observation, it is essential to remove the TE detector before SEM observation. Although either the STEM mode or the SEM mode can be selected as an operation mode of the above-described S-4800, the SEM mode will be used for the measurement of the above-described fiber length.

When the fiber length of the electroconductive fibers 18A is measured using an electroconductive dispersion liquid, a measurement sample produced by the following method is used. First, an electroconductive fiber dispersion liquid is applied to an untreated surface of a polyethylene terephthalate (PET) film having a B5 size and having a thickness of 50 μm, in such a manner that the amount of application of electroconductive fibers is 10 mg/$m^2$. The dispersion medium is evaporated, and the electroconductive fibers are disposed on the surface of the PET film to produce a sensor. A piece having a size of 10 mm×10 mm is cut out of the central part of this sensor. Then, the cut sensor is attached flat against the tilted surface of a pre-tilted SEM sample stub (model number "728-45", manufactured by Nissin EM Co., Ltd.; 45° pre-tilted sample stub; 15 mm in diameter×10 mm in height; made of M4 aluminum) using a silver paste. Furthermore, the cut sensor is sputtered with Pt—Pd for 20 seconds to 30 seconds to obtain electroconductivity. Because an image of the sample without a suitable sputtered film may not be clearly visible, the sputtering process is appropriately modified in that case.

The above-described fiber length can be obtained by image-based measurement, or may be calculated from the binarized image data. In the case of an actual measurement based on an image, the measurement is made by the same method as described above. The fiber length determined using an electroconductive fiber dispersion liquid and the fiber length determined by actual measurement using an image are substantially the same values.

The electroconductive fibers 18A are preferably at least one type of fibers selected from the group consisting of electroconductive carbon fibers, metallic fibers such as metallic nanowires, metal-coated organic fibers, metal-coated inorganic fibers, or carbon nanotubes. The electroconductive fibers 18A have undergone no blackening treatment for inhibiting metallic luster.

Examples of the above-described electroconductive carbon fiber include vapor grown carbon fiber (VGCF), carbon nanotube, wire cup, and wire wall. These electroconductive carbon fibers may be used individually or in combination of two or more.

Preferable examples of the above-mentioned metallic fibers include stainless steel, Ag, Cu, Au, Al, Rh, Ir, Co, Zn, Ni, In, Fe, Pd, Pt, Sn, Ti, and metallic nanowires composed of these alloys, and among the metallic nanowires, silver nanowires are preferable in terms of being capable to achieve a low resistance value, more unlikely to be oxidized, and suitable for wet type coating. As the above-mentioned metallic fibers, fibers produced by, for example, a wire drawing process or coil shaving process that forms a thin and long wire of the above-mentioned metal can be used. Such metallic fibers may be used individually or in combination of two or more.

In cases where silver nanowires are used as metallic fibers, such silver nanowires can be synthesized by liquid phase reduction of a silver salt (for example, silver nitrate) in the presence of a polyol (for example, ethylene glycol) and poly(vinylpyrrolidone). High-volume production of silver nanowires having a uniform size can be achieved, for example, by a method described in Xia, Y. et al., Chem. Mater. (2002), 14, 4736-4745 and Xia, Y. et al., Nanoletters (2003) 3(7), 955-960.

A means of producing metallic nanowires is not limited to any particular one, and a known means, for example, a liquid phase method or a gas phase method, can be used. Additionally, a specific production method is not limited to any particular one, and a known production method can be used. For example, for a method of producing silver nanowires, Adv. Mater., 2002, 14, 833 to 837; Chem. Mater., 2002, 14, 4736 to 4745 and the like can be consulted; for a method of producing gold nanowires, JP2006-233252A and the like can be consulted; for a method of producing Cu nanowires, JP2002-266007A and the like can be consulted; and for a method of producing cobalt nanowires, JP2004-149871A and the like can be consulted.

Examples of the above-described metal-coated synthetic fibers include acrylic fibers coated with a metal such as gold, silver, aluminum, nickel, or titanium. Such metal-coated synthetic fibers may be used individually or in combination of two or more.

<Wiring Portion>

The wiring portion 12B also extends along the first direction DR1 (see FIG. 1). As depicted in FIG. 3, the wiring portion 12B contains the electroconductive fibers 18A in the same manner as the first electrode portion 12A, but using metal nanowires as the electroconductive fibers 18A will undesirably cause the metal nanowires to be broken by concentration of static electricity. To inhibit such a breakage, the width W2 (neck width) of the wiring portion 12B is preferably 0.35 mm or more. In terms of further inhibiting the above-described breakage and in terms of securing the area of the first electrode portion 12A, the width W2 of the wiring portion 12B is preferably 0.35 mm or more and 5.0 mm or less, 0.35 mm or more and 4.5 mm or less, 0.35 mm or more and 4.0 mm or less, 0.4 mm or more and 5.0 mm or less, 0.4 mm or more and 4.5 mm or less, 0.4 mm or more and 4.0 mm or less, 0.45 mm or more and 5.0 mm or less, 0.45 mm or more and 4.5 mm or less, 0.45 mm or more and 4.0 mm or less, 0.5 mm or more and 5.0 mm or less, 0.5 mm or more and 4.5 mm or less, or 0.5 mm or more and 4.0 mm or less.

In terms of securing the area of the first electrode portion 12A, the width W2 of the wiring portion 12B is preferably ½ or less of the width W1 (electrode width) of the first electrode portion 12A. In terms of further securing the area of the first electrode portion 12A, the upper limit of the width W2 of the wiring portion 12B is preferably ⅓ or less, or ¼ or less, of the width W1 of the first electrode portion 12A.

The wiring portion 12B contains a constituent material (for example, a resin) of the electrically-insulating layer 14 and a plurality of electroconductive fibers 18A disposed in the constituent material of the electrically-insulating layer 14. In addition, the wiring portion 12B extends along the first direction DR1, and accordingly, the wiring portion 12B contains the electroconductive fiber pattern 12B1 (see FIG. 3) composed of a plurality of the electroconductive fibers 18A, and extending along the first direction DR1. The constituent material of the electrically-insulating layer 14 will be described in the section on the electrically-insulating layer 14, and further description is thus omitted here. In addition, the electroconductive fibers 18A are described in the section on the first electrode portion 12A, and further description is thus omitted.

The absolute value of a difference in the refractive index between the wiring portion 12B and the base material 11 (|refractive index of wiring portion 12B−refractive index of base material 11|) and the absolute value of a difference in the refractive index between the wiring portion 12B and the electrically-insulating layer 14 (|refractive index of wiring portion 12B−refractive index of electrically-insulating layer 14|) are each preferably 0.08 or less. That is, the refractive index of the wiring portion 12B is substantially not different from the refractive index of the base material 11 and the refractive index of the electrically-insulating layer 14. The reason for this is follows: the wiring portion 12B contains the electroconductive fibers 18A; thus, the influence of the electroconductive fibers 18A is not taken into consideration in the refractive index of the wiring portion 12B, and the refractive index of the wiring portion 12B is the refractive index of the constituent material of the electrically-insulating layer 14 contained in the wiring portion 12B. This makes it possible to inhibit the interfacial reflection between the wiring portion 12B and the base material 11 and the interfacial reflection between the wiring portion 12B and the electrically-insulating layer 14, thus making it possible to inhibit the wiring portion 12B from being visible. The difference in the refractive index between the wiring portion 12B and the base material 11 and the difference in the refractive index between the index wiring portion 12B and the electrically-insulating layer 14 are each more preferably 0.07 or less, 0.06 or less, or 0.05 or less.

<<Second Electroconductive Part>>

The second electroconductive part 13 is an electrically conductible part. The surface resistance value, line resistance value, and thickness T2 (see FIG. 3) of the second electroconductive part 13 are similar to the surface resistance value, line resistance value, and thickness T1 of the first electrode portion 12A, and further description is thus omitted.

The second electroconductive part 13 functions, for example, as an electrode in the Y direction in a projected capacitive touch panel. The second electroconductive part 13 is provided in a rectangular active area that is a region where a position of touch can be detected.

A described above, the second electroconductive part 13 has a plurality of second electrode portions 13A and the bridge wiring portion 13B.

<Second Electrode Portion>

The second electrode portion 13A is not limited to any particular shape, and may be, for example, in the shape of a quadrilateral, rhomb, or the like. The width W3 (electrode width) of the second electrode portion 13A needs to be equal to or smaller than the area of contact with a finger (approximately mm in diameter), and thus, is preferably 10 mm or less. The width W3 of the second electrode portion 13A may be 0.35 mm or more and 10 mm or less, 0.35 mm or more and 9 mm or less, 0.35 mm or more and 8.5 mm or less, 0.35 mm or more and 8 mm or less, 0.5 mm or more and 10 mm or less, 0.5 mm or more and 9 mm or less, 0.5 mm or more and 8.5 mm or less, mm or more and 8 mm or less, 0.7 mm or more and 10 mm or less, 0.7 mm or more and 9 mm or less, 0.7 mm or more and 8.5 mm or less, or 0.7 mm or more and 8 mm or less.

As depicted in FIG. 3, the second electrode portion 13A contains a resin portion 17A and a plurality of electroconductive fibers 18A disposed in the resin portion 17A. Additionally, the second electrode portion 13A is formed in desired shape, and thus, the second electrode portion 13A contains an electroconductive fiber pattern 13A1 (a second electroconductive fiber pattern; see FIG. 3) composed of a plurality of the electroconductive fibers 18A, and formed in desired shape. The resin portion 17A and the electroconductive fibers 18A are described in the section on the first electrode portion 12A, and further description is thus omitted.

<Bridge Wiring Portion>

The bridge wiring portion 13B also extends along the second direction DR2 (see FIG. 1). The bridge wiring portion 13B contains a resin portion 17B and electroconductive fibers 18B (second electroconductive fibers) disposed in the resin portion 17B. The resin portion 17B is similar to the resin portion 17A, the electroconductive fiber 18B is similar to the electroconductive fiber 18A, and further description is thus omitted. In addition, the bridge wiring portion 13B extends along the second direction DR2, and accordingly, the bridge wiring portion 13B contains an electroconductive fiber pattern 13B1 (see FIG. 3) composed of a plurality of the electroconductive fibers 18B, and extending along the second direction DR2.

The width W4 (neck width) of the bridge wiring portion 13B is preferably mm or more for the same reason as the reason described in the section on the wiring portion 12B. In terms of further inhibiting the above-described breakage and in terms of securing the area of the second electrode portion 13A, the width W4 of the bridge wiring portion 13B is preferably 0.35 mm or more and 5.0 mm or less, 0.35 mm or more and 4.5 mm or less, 0.35 mm or more and 4.0 mm or less, 0.4 mm or more and 5.0 mm or less, 0.4 mm or more and 4.5 mm or less, 0.4 mm or more and 4.0 mm or less, 0.45 mm or more and 5.0 mm or less, 0.45 mm or more and 4.5 mm or less, 0.45 mm or more and 4.0 mm or less, 0.5 mm or more and 5.0 mm or less, 0.5 mm or more and 4.5 mm or less, or 0.5 mm or more and 4.0 mm or less.

In terms of securing the area of the second electrode portion 13A, the width W4 of the bridge wiring portion 13B is preferably ½ or less of the width W3 (electrode width) of the second electrode portion 13A. In terms of further securing the area of the second electrode portion 13A, the upper limit of the width W4 of the bridge wiring portion 13B is preferably ⅓ or less, or ¼ or less, of the width W3 of the second electrode portion 13A.

The thickness T3 of the bridge wiring portion 13B (see FIG. 3) is preferably 0.16 μm or more and 1.8 μm or less. The bridge wiring portion 13B having a thickness of 0.16 μm or more makes it possible that covering the electroconductive fibers 18B with the resin 17B enhances reliability, and in addition, 1.8 μm or less makes it possible to secure flexibility. The thickness T3 of the bridge wiring portion 13B is more preferably 0.2 μm or more and 1.6 μm or less, 0.2 μm or more and 1.4 μm or less, 0.2 μm or more and 1.2 μm or less, 0.3 μm or more and 1.6 μm or less, 0.3 μm or more and 1.4 μm or less, 0.3 μm or more and 1.2 μm or less, 0.5 μm or more and 1.6 μm or less, 0.5 μm or more and 1.4 μm or less, or 0.5 μm or more and 1.2 μm or less. In the case of FIG. 3, the thickness of the bridge wiring portion 13B means a distance from the upper face 14A1 of the electrically-insulating layer 14 to the surface of the resin portion 17B.

The bridge wiring portion 13B preferably contains the same kind of electroconductive material as the electroconductive material contained in the second electrode portion 13A. For example, the second electrode portion 13A contains electroconductive fibers, and thus, the bridge wiring portion 13B also preferably contains electroconductive fibers. As used herein, "the same kind" means that the kind is the same, and does not necessarily mean that each of the length and the diameter is also the same.

The mass concentration of the electroconductive fibers, as measured in a 1 cm square sample containing the bridge wiring portion 13B and having the bridge wiring portion 13B in the center, is preferably less than 10 wt %. The electroconductive fibers to be used to measure the mass concentration may contain electroconductive fibers of a portion other than the bridge wiring portion 13B, besides the electroconductive fibers 18B in the bridge wiring portion 13B. This mass concentration of the electroconductive fibers can be determined from a ratio between the masses of the resin portion 17B before and after an organic material such as the resin portion 17B contained in the bridge wiring portion 13B is removed, wherein the organic material is removed by a dry ash method. That the electroconductive fibers have a mass concentration of less than 10 wt % means that the bridge wiring portion 13B is constituted substantially by the resin portion 17B, and thus, the refractive index of the bridge wiring portion is substantially the refractive index of the resin portion 17B, making it difficult for the electroconductive fibers 18B to be visible. In terms of securing the electrical conduction of the bridge wiring portion 13B, and in terms of making it difficult for the bridge wiring portion 13B to be visible, this mass concentration of the electroconductive fibers is preferably 0.2 wt % or more and 40 wt % or less, wt % or more and 30 wt % or less, 0.2 wt % or more and 20 wt % or less, wt % or more and 15 wt % or less, 0.5 wt % or more and 40 wt % or less, wt % or more and 30 wt % or less, 0.5 wt % or more and 20 wt % or less, wt % or more and 15 wt % or less, 1 wt % or more and 40 wt % or less, 1 wt % or more and 30 wt % or less, 1 wt % or more and 20 wt % or less, or 1 wt % or more and 15 wt % or less.

In the bridge wiring portion 13B, the electroconductive fibers 18B are preferably unevenly distributed from the position HL, which defines half the thickness of the bridge wiring portion 13 B (the resin portion 17B), to the base material 11, as depicted in FIG. 3. Making the electroconductive fibers 18B unevenly distributed toward the base material 11 decreases the electroconductive fibers 18B present toward the surface of the bridge wiring portion 13B, and thus, the surface of the bridge wiring portion 13B is substantially composed of the resin portion 17B, thus making it difficult for the bridge wiring portion 13B to be visible. Whether the electroconductive fibers 18B are unevenly distributed from the half-thickness position HL of the bridge wiring portion 13B toward the base material 11 can be determined as follows. First, a sample for observing a cross-section is produced from the sensor. Specifically, a 2 mm×5 mm sample containing the bridge wiring portion is cut out of the sensor. Then, the sample cut out is placed in a silicone-based embedding plate, into which an epoxy resin is poured to embed the whole sample in the resin. Then, the embedding resin is left to stand at 65 °C for 12 hours or more and cured. Subsequently, ultra-thin sections are produced using an ultramicrotome (product name "Ultramicrotome EM UC7", manufactured by Leica Microsystems GmbH) at a feeding rate of 100 nm. The ultra-thin sections produced are collected on collodion-coated meshes (150) to obtain a sample for STEM. In some of the cases where this sample conducts no electricity, an image observed by STEM will appear blurry. Thus, the sample is preferably sputtered with Pt—Pd for about 20 seconds. The sputtering time can be appropriately adjusted, but needs careful attention. A period of 10 seconds is too short, and a period of 100 seconds is so long that the metal used for sputtering is observed as particulate foreign bodies. Then, a cross-sectional image of the electroconductive part in the sample for STEM sample is acquired using a scanning transmission electron microscope (STEM) (product name "S-4800 (Type 2)", manufactured by Hitachi High-Technologies Corporation). The cross-sectional image is acquired under STEM at a magnification of 5,000 to 200,000 times by setting the detector switch (signal selection) to "TE", the accelerating voltage to 30 kV, and the emission current to "10 μA", and appropriately adjusting the focus, contrast, and brightness so that each layer can be identified. The magnification is preferably in the range from 10,000 to 100,000 times, more preferably in the range from 10,000 to 50,000 times, and most preferably in the range from 25,000 to 50,000 times. The cross-sectional image may be acquired by additionally setting the beam monitor aperture to 3 and the objective lens aperture to 3, and also setting the WD to 8 mm. Then, the cross-sectional images at ten locations acquired as described above are prepared. Upon completion of acquiring the cross-sectional images of the bridge wiring portion, the half-thickness position of the bridge wiring portion is determined on each cross-sectional image. Then, it is determined whether the electroconductive fibers appearing on each cross-sectional image are distributed from this half-thickness position to the base material. Specifically, the electroconductive fibers in the above-described electron microscopic cross-sectional images of the bridge wiring portion are first visualized as darker areas (for example, in black) compared to the resin portion so that the electroconductive fibers can be identified in the cross-sectional images of the bridge wiring portion. Meanwhile, by enlarging each cross-sectional image, pixels that make up the image become visible. All pixels are the same size and are arranged into a grid (lattice). The number of pixels covering the electroconductive fibers distributed from the above-described half-thickness position to the base material and the number of pixels covering the electroconductive fibers distributed from the above-described half-thickness position to the surface of the bridge wiring portion are counted in each cross-sectional image to determine the ratio of the number of pixels covering the electroconductive fibers distributed from the above-described half-thickness position to the base material relative to the total number of pixels covering all the electroconductive fibers. In this respect, for the pixels covering the electroconductive fibers, each pixel straddling the above-described half-thickness position will be divided into the portion ranging from the above-described half-thickness position to the base material and the portion ranging from the above-described position to the surface of the bridge wiring portion, to divide one pixel based on the area ratio between the divided portions. Then, the above-described ratio determined from the cross-sectional images is determined as the abundance of electroconductive fibers distributed from the half-thickness position of the bridge wiring portion to the base material. In cases where the abundance is 55% or more, the electroconductive fibers are determined to be unevenly distributed from the half-thickness position of the bridge wiring portion to the base material. The abundance should be the arithmetic mean of the abundance values determined from the cross-sectional images. In this regard, a low surface resistance value represents even distribution of electroconductive fibers in the bridge wiring portion. Accordingly, the abundance of electroconductive fibers determined using cross-sectional images of a portion of the bridge wiring portion is considered as the abundance of electroconductive fibers in the whole bridge wiring portion. The abundance of electroconductive fibers distributed from the half-thickness position of the bridge wiring portion to the base material, as determined from the above-described cross-sectional images, is more preferably 70% or more, still more preferably 80% or more.

Whether the electroconductive fibers 18B are unevenly distributed from the half-thickness position HL of the bridge wiring portion 13B to the base material 11 can be determined as follows. First, a first sample of the sensor in which a metal layer of Pt—Pd, Pt, Au, or the like has been formed by sputtering on the surfaces of the bridge wiring portion and a second sample of the sensor in which a metal layer is not formed on the surface are prepared. Then, the thickness of the bridge wiring portion 13B is determined using the first sample by the below-described measurement method. Additionally, the second sample is used to acquire cross-sectional images of the electroconductive part by the above-described method, and the acquired cross-sectional image data is loaded to and binarized by image analysis and measurement software (product name "Win ROOF Version 7.4", manufactured by Mitani Corporation). In STEM observations, the difference in the intensity of the transmitted electron beam produces image contrast. Accordingly, high density metals tend less to transmit an electron beam, and thus are visualized in black, and organic materials, which have a lower density than metals, are visualized in white. Thus, the portions visualized in black and the remaining portions visualized in gray to white in the image data are determined as electroconductive fibers and a resin portion respectively. Accordingly, in cases where the ratio accounted for by a black-colored area in the area from the half-thickness position of the bridge wiring portion to the base material is larger than the ratio accounted for by a black-colored area in the area from the half-thickness position to the surface of the bridge wiring portion, the electroconductive fibers 18B can be determined to be unevenly distributed from the half-thickness position HL of the bridge wiring portion 13B to the base material 11. The portions visualized in black can be extracted based on the brightness. Additionally, the difference in contrast between images of metals and organic materials is so clear that the area of each portion can be determined by an automated area measurement system alone.

The above-described binarization-mediated area measurement is performed by the following procedures. First, a cross-sectional image is loaded to the above-described software and displayed on the image window of the software program. Then, ROIs (regions of interest) are selected as subjects of image processing in the image window and then binarized to calculate the total areas covered by electroconductive fibers distributed either below or above the half-thickness position. The selection of a region of interest is performed by clicking the rectangular ROI selection button in the image tool bar and setting a rectangular ROI in the image window. The above-described software outputs each measured value in pixel unit, which can be converted and outputted as a real length after calibration. When an area ratio is calculated, the measured value in pixel unit is not needed to be converted to a real length for the purpose of determining whether or not electroconductive fibers are unevenly distributed toward the base material, but calibration is required for measuring the surface resistance value and the haze value and for imaging the presence of fibers in the sensor. Each STEM image displays a scale, which can be used to perform the ROI calibration. Specifically, the line ROI selection button in the image tool bar is clicked to draw a line having a length equal to the scale displayed in each STEM image, and the calibration dialog box is then displayed to choose the drawn line and to input the length value of the scale displayed in the STEM image and the unit for the length value. In binarization, the regions of interest covering electroconductive fibers are separated from other regions. Specifically, binarization with two thresholds is selected from the menu of binarization. Because each electroconductive fiber has a high density and is visualized in black and the remaining region is visualized in white to gray, appropriately selected two density (brightness) thresholds (for example, 0 and 80) are inputted to perform binarization with two thresholds. If the area covered by electroconductive fibers in an actual STEM image does not exactly match with the area covered by the same electroconductive fibers (colored in, for example, green) in a binarized image produced by applying the thresholds to convert the image into two colors, the binarized image is corrected by appropriately changing the values of the thresholds until a binarized image most closely resembling the STEM image is obtained. For example, the difference between the STEM image and the binarized image can be appropriately corrected by the fill function and/or the delete function selected from the binarization menu. Any uncolored area inside or any excess colored area outside a binarized electroconductive fiber identified by the comparison with the same actual electroconductive fiber will be filled with a color or deleted. For the addition or deletion of a colored area, an area of interest can be filled with a color or be deleted by adjusting the threshold value for the area. Clicking an area to be deleted gives a threshold value suitable for deleting the area. The binarized image would be corrected as much as possible by other functions in the binarization menu as necessary, so that the resulting binarized image is matched with the STEM image. Additionally, an excess colored area in the binarized image can also be manually selected and deleted using the eraser tool button. In addition, an area can also be filled with a color for correction using the pen tool button through manual painting in the window. Upon completion of this task, one of the shape features in the analysis menu is selected to choose areas to be measured. The summed areas of electroconductive fibers can be determined, as well as the area of each of the electroconductive fibers is measured. By the above-described operation, the total areas below and above the half-thickness position of the bridge wiring portion are determined, and the areas of the ROIs located below and above the half-thickness position are further determined by manual measurement, and the above-described ratio is thereby calculated. The manual measurement can be performed by selecting the line length measurement function from the manual measurement functions in the analysis menu and choosing all the line length measurement items. Tools in the line length tool palette can be appropriately used to measure the length of a line and the area of an ROI selected by dragging the cursor from a starting point to an end point with a mouse button. The details of the task will be according to the WinROOF Version 7.4 User's Manual.

The absolute value of a difference in the refractive index between the bridge wiring portion 13B and the electrically-insulating layer 14 (I refractive index of bridge wiring portion 13B—refractive index of electrically-insulating layer 141) is preferably 0.08 or less. That is, the refractive index of the bridge wiring portion 13B is substantially not different from the refractive index of the electrically-insulating layer 14. The reason for this is follows: the bridge wiring portion 13B contains the electroconductive fibers 18B, thus, the influence of the electroconductive fibers 18B is not taken into consideration in the refractive index of the bridge wiring portion 13B, and the refractive index of the bridge wiring portion 13B is the refractive index of the resin portion 17B. This makes it possible to inhibit the interfacial reflection between the bridge wiring portion 13B and the electrically-insulating layer 14, thus making it possible to inhibit the bridge wiring portion 13B from being visible. In this regard, if the electroconductive fibers 18B are visible, the reason for this is not a problem of interfacial reflection, but the influence of a haze caused by the scatter of the electroconductive fibers, and thus, decreasing the fiber diameter of the electroconductive fiber 18B, for example, to 30 nm or less makes it possible to solve such a problem. The difference in the refractive index between the bridge wiring portion 13B and the electrically-insulating layer 14 is more preferably 0.07 or less, 0.06 or less, or or less.

Without particular limitation, the refractive index of the bridge wiring portion 13B can be measured by the Becke method. The Becke method is as follows: a refractive index standard liquid having a known refractive index is used; a fragment collected from the bridge wiring portion is placed on a slide glass or the like; the refractive index standard liquid is dropped on the fragment; the fragment is immersed in the refractive index standard liquid; the state of the fragment is observed under a microscope; a difference in the refractive index between the surface of the bridge wiring portion and the refractive index standard liquid generates a bright line (the Becke line) on the surface of the fragment; the refractive index of the refractive index standard liquid that no longer enables the bright light to be visually observed is defined as the refractive index of the bridge wiring portion. In cases where the refractive index of the bridge wiring portion 13B is measured by the Becke method, a fragment of the bridge wiring portion 13B is first taken from each of any five locations of the bridge wiring portion 13B by cutting or the like. Here, the refractive index that influences the visibility of the bridge wiring portion 13B consists in the refractive index of the surface side of the bridge wiring portion 13B, and accordingly, the fragments are collected from the surface side of the bridge wiring portion 13B. The fragment to be taken out does not need to be the electroconductive fibers alone. That is, the fragment may contain the resin portion 17B and the electroconductive fibers 18B, or may contain the resin portion 17B alone not containing the electroconductive fibers 18B. In this regard, an observation by the Becke method is performed visually using a microscope, and thus, the observation is performed at a low magnification. In such an observation at a low magnification, the electroconductive fibers 18B cannot be visually observed. Because of this, the fragment may be the resin portion 17B alone not containing the electroconductive fibers 18B. Then, the refractive index of the bridge wiring portion 13B is measured by the Becke method with each of the five fragments taken out. The refractive index of the bridge wiring portion 13B is determined as the arithmetic mean of the refractive index values of three fragments obtained by excluding the maximum value and the minimum value from the refractive index values of the five fragments measured. The refractive index of each of the base material 11, the wiring portion 12B, and the electrically-insulating layer 14 can be measured by the same method as the refractive index of the bridge wiring portion 13B. The refractive index of the bridge wiring portion 13B is not limited to any particular value, and may be, for example, 1.45 or more and 1.60 or less.

The electroconductive fibers 18B in the bridge wiring portion 13B may be disposed randomly, and may be arranged along the second direction DR2, as depicted in FIG. 4. Whether the electroconductive fibers 18B are arranged along the second direction DR2 can verified, for example, using a surface fiber orientation analysis program (V. 8.03) (http://www.enomae.com/FiberOri/index.htm). This program is based on Enomae, T., Han, Y.-H. and Isogai, A., "Nondestructive determination of fiber orientation distribution of fiber surface by image analysis", Nordic Pulp and Paper Research Journal 21(2): 253-259(2006) and Enomae, T., Han, Y.-H. and Isogai, A., "Fiber orientation distribution of paper surface calculated by image analysis", Proceedings of International Papermaking and Environment Conference, Tianjin, P. R. China (May 12-14), Book 2, 355-368 (2004) (see http://www.enomae.com/publish.htm). In this program, a plane image of electroconductive fibers, acquired by a scanning electron microscope (SEM), is binarized, and then Fourier-transformed. The image Fourier-transformed is converted to polar coordinates, and the mean amplitude with respect to the angle is calculated to prepare a fiber orientation distribution. Then, this fiber orientation distribution is approximated to an ellipse. The angle between the major axis of the approximated ellipse and the second direction is regarded as the orientation angle. The ratio of the length of the major axis of the approximated ellipse to the length of the minor axis (length of major axis/length of minor axis) is calculated as the orientation strength. Specifically, ten plane images of the electroconductive fibers of the electroconductive part are acquired by SEM at a magnification of 1000 times to 6000 times, a fiber orientation distribution of each of the ten images is calculated, and the average fiber orientation distribution is calculated by averaging the fiber orientation distributions. The results calculated from the average fiber orientation distribution as described above are regarded as the orientation angle and the orientation strength. In the electroconductive fibers 18B in the bridge wiring portion 13B, having an orientation angle within 0°±10° (however, the calculated orientation angle is a value from 0° to 180°, but 180° to 90° is read as −0° to)−90° and an orientation strength of 1.2 or more makes it possible to judge that the electroconductive fibers 18B are arranged along the second direction. The orientation angle is more preferably within 0°±5°, and in addition, the orientation strength is more preferably 1.3 or more, 1.5 or more, or 1.7 or more. In the above description, the electroconductive fibers 18B of the bridge wiring portion 13B are arranged along the second direction DR2, but the electroconductive fibers 18A of the first electrode portion 12A and the wiring portion 12B may be arranged along the first direction DR1, and in addition, the electroconductive fibers 18A of the second electrode portion 13A may be arranged along the second direction DR2. Additionally, in cases where the electroconductive fibers 18B in the bridge wiring portion 13B are disposed randomly, substantially the same resistance value can be obtained even if resistance values are measured in various directions.

<<Electrically-Insulating Layer>>

The electrically-insulating layer 14 is provided between the wiring portion 12B and the bridge wiring portion 13B. Providing the electrically-insulating layer 14 makes it possible to inhibit contact between the wiring portion 12B and the bridge wiring portion 13B, thus making it possible to inhibit electrical short-circuit between the first electroconductive part 12 and the second electroconductive part 13.

The size of the electrically-insulating layer 14 is preferably larger than the size of each of the wiring portion 12B and the bridge wiring portion 13B. This makes it possible to reliably inhibit contact between the wiring portion 12B and the bridge wiring portion 13B.

The thickness of the electrically-insulating layer 14 is preferably 160 nm or more and 2000 nm or less. The electrically-insulating layer 14 having a thickness of 160 nm or more makes it possible to reliably inhibit contact between the wiring portion 12B and the bridge wiring portion 13B, and in addition, the electrically-insulating layer 14 having a thickness of 2000 nm or less makes it possible to inhibit cracking during folding. In terms of more reliably inhibiting contact between the wiring portion 12B and the bridge wiring portion 13B, and in terms of making it possible to inhibit cracking during folding, the thickness of the electrically-insulating layer 14 is more preferably 160 nm or more and 2000 nm or less, 160 nm or more and 1500 nm or less, 160 nm or more and 1300 nm or less, 160 nm or more and 1100 nm or less, 160 nm or more and 1000 nm or less, 180 nm or more and 2000 nm or less, 180 nm or more and 1500 nm or less, 180 nm or more and 1300 nm or less, 180 nm or more and 1100 nm or less, 180 nm or more and 1000 nm or less, 200 nm or more and 2000 nm or less, 200 nm or more and 1500 nm or less, 200 nm or more and 1300 nm or less, 200 nm or more and 1100 nm or less, 200 nm or more and 1000 nm or less, or 250 nm or more and 2000 nm or less, 250 nm or more and 1500 nm or less, 250 nm or more and 1300 nm or less, 250 nm or more and 1100 nm or less, or 250 nm or more and 1000 nm or less.

The thickness of the electrically-insulating layer is determined as the average value of the thickness values at eight locations obtained by excluding the maximum value and the minimum value from the thickness values measured at ten locations, wherein the thickness values measured at the ten locations are randomly selected in a cross-sectional image of the electrically-insulating layer 14 acquired using a transmission electron microscope (TEM), a scanning transmission electron microscope (STEM), or scanning electron microscope (SEM). The electrically-insulating layer generally has uneven thickness. In the present embodiment, the electrically-insulating layer is for optical use, and thus, the unevenness in the thickness is the average thickness value±10% or less, more preferably ±5% or less.

Measuring the thickness of the electrically-insulating layer 14 using a transmission electron microscope (TEM) or a scanning transmission electron microscope (STEM) can be performed in the same manner as measuring the thickness of the first electroconductive part 12. However, the magnification used for acquiring a cross-sectional image of the electrically-insulating layer 14 is from 100 to 20,000 times. In cases where the thickness of the base material is measured using a scanning electron microscope (SEM), the cross-section of the electrically-insulating layer 14 may be obtained using an ultramicrotome (product name "Ultramicrotome EM U07", manufactured by Leica Microsystems GmbH) or the like. As a sample for TEM or STEM, ultra-thin sections are produced using the ultramicrotome at a feeding rate of 100 nm. The ultra-thin sections produced are collected on collodion-coated meshes (150) to obtain the sample for TEM or STEM. Upon cutting with the ultramicrotome, the sample may be subjected to a pretreatment that facilitates cutting, such as embedding the sample in a resin.

The electrically-insulating layer 14 is not limited to any particular constituent material as long as the material is electrically-insulating, and the material is preferably light-transmitting in cases where the sensor is used for optical applications. In cases where a constituent material of the electrically-insulating layer 14 is a resin, examples of the resin include the same resins as described in the section on the first electrode portion 12A, and further description is thus omitted here.

<<Electrical Lead-Out Line Portion>>

The electrical lead-out line portion 15 is electrically connected to the first electrode portion 12A. Specifically, the electrical lead-out line portion 15 is electrically connected to the first electrode portion 12A at an end among a plurality of the first electrode portions 12A disposed along the first direction DR1. The electrical lead-out line portion 15 depicted in FIG. 1 is formed on the first electrode portion 12A and the base material 11.

The electrical lead-out line portion 15 is not limited to any particular material as long as the portion is constituted by an electroconductive material. For example, the electrical lead-out line portion may be constituted by a cured electroconductive paste. Examples of the electroconductive paste include, but are not limited to, silver pastes.

<<Other Sensors>>

In the sensor 10, the electroconductive fibers 18A of the first electrode portion 12A and the second electrode portion 13A are covered by the resin portion 17A, but, as in the sensor 30 depicted in FIG. 10, the electroconductive fibers 18A of the first electrode portion 12A and the second electrode portion 13A may be covered by the resin portion 17A and 17C (see FIG. 11 FIG. 12). The thickness of the resin portion 17C is preferably 40 nm or more and 100 nm or less. In cases where the first electroconductive part 12 is formed by a roll-to-roll process, and where the base material 11 having the electroconductive fibers 18A disposed thereon is wound up with the electroconductive fibers 18A not covered by the resin portion, the electroconductive fibers 18A will undesirably be peeled away. However, the resin portion 17C having a thickness of 40 nm or more makes it possible that, when a laminate having the resin portion 17C formed on the electroconductive fibers 18A is wound up, the electroconductive fibers 18A are inhibited from being peeled away as above-mentioned. In addition, the smaller thickness the resin portion 17C has, the more the electroconductive fibers 18A is exposed out of the resin portion 17C. Because of this, the resin portion 17C having a thickness of 100 nm or less means that the resin portion 17C has a small thickness, and thus, those portions of the electroconductive fibers 18A which are exposed out of the resin portion 17C are increased, thus making it possible to decrease a resistance value of contact between the first electroconductive part 12 and the electrical lead-out line portion 15.

The sensor 10 does not include an electrically insulating wall portion between the first electroconductive part 12 and the second electrode portion 13A, but may include an electrically insulating wall portion 41 between the first electroconductive part 12 and the second electrode portion 13A as the sensor 40 depicted in FIG. 13 does.

<<Wall Portion>>

The wall portion 41 has a function for guiding the filling of the first electroconductive part 12 and the second electrode portion 13A, and also has a function for inhibiting an electrical short-circuit between the first electroconductive part 12 and the second electrode portion 13A. The wall portion 41 is constituted by an electrically-insulating material. Examples of the electrically-insulating material include resins. Examples of the resin include, but are not limited to, resins described in the section on the electrically-insulating layer.

The width W5 of the wall portion 41 (see FIG. 13) is preferably 5 μm or more and 500 μm or less. The wall portion 41 having the width W5 of 5 μm or more makes it difficult to fall over during the filling of the below-described electroconductive fiber dispersion liquid, and in addition, makes it possible to further inhibit the electrical short-circuit. The wall portion 41 having the width W of 500 μm or less makes it possible to dispose a fine pattern. The width W of the wall portion 41 is preferably 5 μm or more and 300 μm or less, μm or more and 200 μm or less, 5 μm or more and 100 μm or less, 10 μm or more and 500 μm or less, 10 μm or more and 300 μm or less, 10 μm or more and 200 μm or less, 10 μm or more and 100 μm or less, 20 μm or more and 500 μm or less, 20 μm or more and 300 μm or less, 20 μm or more and 200 μm or less, 20 μm or more and 100 μm or less, 30 μm or more and 500 μm or less, 30 μm or more and 300 μm or less, 30 μm or more and 200 μm or less, or 30 μm or more and 100 μm or less.

The width W5 of the wall portion 41 is determined as the arithmetic mean of the width values at eight locations obtained by excluding the maximum value and the minimum value from the width values measured at ten locations, wherein the width values measured at the ten locations are randomly selected in a cross-sectional image of the wall portions 41 acquired using a scanning transmission electron microscope (STEM) or a transmission electron microscope (TEM). The method of acquiring a cross-sectional image of the wall portion 41 is the same as the method of acquiring a cross-sectional image of the first electroconductive part 12.

The thickness of the wall portion 41 is preferably larger than the thickness of each of the first electroconductive part 12 and the second electrode portion 13A. In FIG. 14, the thickness T of the wall portion 41 is larger than the thickness of the first electrode portion 12A. Making the thickness of the wall portion 41 larger than the thickness of each of the first electroconductive part 12 and the second electrode portion 13A makes it possible to further inhibit an electrical short-circuit between the first electroconductive part 12 and the second electrode portion 13A. Specifically, the thickness of the wall portion 41 is more preferably 0.02 μm or more larger than the thickness of each of the first electroconductive part 12 and the second electrode portion 13A. The thickness of the wall portion 41 is the length of the wall portion 41 in the direction normal to the base material 11, and the thickness of each of the first electroconductive part 12 and the second electrode portion 13A is the length of each of the first electroconductive part 12 and the second electrode portion 13A in the direction normal to the base material 11.

The thickness of the wall portion 41 is preferably 0.1 μm or more and 100 μm or less. The wall portion 41 having a thickness of 0.1 μm or more makes it possible to inhibit the electroconductive fiber dispersion liquid from spilling out during the filling of the below-described electroconductive fiber dispersion liquid. The wall portion 41 having a thickness of 50 μm or less makes it possible to secure foldability, and to secure conformability during attachment. The thickness of the wall portion 41 is preferably 0.1 μm or more and 40 μm or less, 0.1 μm or more and 30 μm or less, 0.1 μm or more and 25 μm or less, 0.2 μm or more and 100 μm or less, 0.2 μm or more and μm or less, 0.2 μm or more and 30 μm or less, 0.2 μm or more and 25 μm or less, 0.5 μm or more and 100 μm or less, 0.5 μm or more and 40 μm or less, 0.5 μm or more and 30 μm or less, 0.5 μm or more and 25 μm or less, 1 μm or more and 100 μm or less, 1 μm or more and 40 μm or less, 1 μm or more and 30 μm or less, or 1 μm or more and 25 μm or less.

The thickness of the wall portion 41 is determined as the arithmetic mean of the thickness values at eight locations obtained by excluding the maximum value and the minimum value from the thickness values measured at ten locations, wherein the thickness values measured at the ten locations are randomly selected in a cross-sectional image of the wall portion 41 acquired using a scanning transmission electron microscope (STEM) or a transmission electron microscope (TEM). The method of acquiring a cross-sectional image of the wall portion 41 is the same as the method of acquiring a cross-sectional image of the first electroconductive part 12.

The absolute value of a difference in the refractive index between the wall portion 41 and the base material 11 (refractive index of wall portion 41−refractive index of base material 11) is preferably 0.2 or less. Having 0.2 or less as this absolute value of a difference in the refractive index makes it possible to inhibit a rise in the haze value, and also makes it possible to inhibit the shape of the wall portion 41 from being visible (a bone-visible phenomenon). The refractive index of the wall portion 41 can be measured by the same method as the refractive index of the first electroconductive part 12.

The wall portion 41 can be formed by applying, to the first face 11A of the base material 11, a composition that is for the wall portion and contains a polymerizable compound, such as a radiation-polymerizable compound, and then by curing the composition. The composition for the wall portion can be applied, for example, by flexographic printing, off-set printing, gravure printing, screen printing, or an ink-jet technique, or with a dispenser.

<<Method of Producing Sensor>>

The sensor 10 can be produced, for example, as described below. First, as depicted in FIG. 15 (A), an electroconductive fiber dispersion liquid containing the electroconductive fibers 18B and a dispersion medium is applied to regions in which the first electroconductive part 12 and the second electrode portion 13A are to be formed on the first face 11A of the base material 11, using a dispenser or an ink-jet technique, and the dispersion is dried, whereby the electroconductive fibers 18A are disposed in the regions in which the first electroconductive part 12 and the second electrode portion 13A are to be formed.

The electroconductive fiber dispersion liquid may contain a resin material composed of a thermoplastic resin or a polymerizable compound, in addition to the electroconductive fibers 18A and the dispersion medium. The term "resin material" as used herein inclusively refers to a component such as a polymerizable compound that can be polymerized to a resin, in addition to a resin (however, excluding a resin (for example, polyvinylpyrrolidone) as a component of an organic protective layer that is formed surrounding electroconductive fibers in the synthesis of the electroconductive fibers, for the purpose of, for example, preventing the electroconductive fibers from weld anchoring to each other or from reacting with substances in the atmosphere).

The dispersion medium may be either a water-based dispersion medium or an organic dispersion medium. However, in cases where the resin material content of the electroconductive fiber dispersion liquid is excessively high, the resin material permeates into the space between the electroconductive fibers, and the electroconductivity of the electroconductive part may be consequently deteriorated. In particular, in cases where the electroconductive part has a small film thickness, the electroconductivity of the electroconductive part is more likely to be deteriorated. Additionally, use of an organic dispersion medium allows the electroconductive fiber dispersion liquid to have a lower resin content than use of a water-based dispersion medium. Because of this, an organic dispersion medium is preferably used in forming the first electroconductive part 12 and the second electrode portion 13A each having a small film thickness, for example, a film thickness of 300 nm. The organic dispersion medium may contain water in an amount of less than 10 mass %.

The organic dispersion medium is not limited to any particular organic dispersion medium, and is preferably a hydrophilic organic dispersion medium. Examples of the organic dispersion medium include saturated hydrocarbons, such as hexane; aromatic hydrocarbons, such as toluene and xylene; alcohols, such as methanol, ethanol, propanol, and butanol; ketones, such as acetone, methyl ethyl ketone (MEK), methyl isobutyl ketone, and diisobutyl ketone; esters, such as ethyl acetate and butyl acetate; ethers such as tetrahydrofuran, dioxane, and diethyl ether; amides, such as N,N-dimethylformamide, N-methylpyrrolidone (NMP), and N,N-dimethylacetamide; and halogenated hydrocarbons, such as ethylene chloride and chlorobenzene. Among those organic dispersion media, alcohols are preferred in terms of the stability of the electroconductive fiber dispersion liquid.

Examples of a thermoplastic resin that may be contained in the electroconductive fiber dispersion liquid include acrylic resins; polyester resins, such as polyethylene terephthalate; aromatic resins, such as polystyrene, polyvinyl toluene, polyvinyl xylene, polyimide, polyamide, and polyamide-imide; polyurethane resins; epoxy resins; polyolefin resins; acrylonitrile-butadiene-styrene copolymer (ABS); cellulose-based resins; polyvinyl chloride resins; polyacetate resins; polynorbornene resins; synthetic rubber; and fluorine-based resins.

Examples of a polymerizable compound that may be contained in the electroconductive fiber dispersion liquid include polymerizable compounds similar to the polymerizable compounds described in the section on the electrically-insulating layer 14, and further description is thus omitted here.

After the electroconductive fibers 18A are disposed, a dispenser or an ink-jet technique is used to form a coating film by applying an electroconductive paste to part of the surface of the electroconductive fibers 18A, wherein the part becomes the first electrode portion 12A disposed at an end among a plurality of the first electrode portions 12A along the first direction DR1. Then, the electroconductive paste is cured by heating at a temperature of 80 °C or more and 150 °C or less for a predetermined period of time to form an electrical lead-out line portion 15 depicted in FIG. 15 (B).

After the electrical lead-out line portion 15 is formed, a dispenser or an ink-jet technique is used to form a coating film by applying a composition for an electrically-insulating layer to the electroconductive fibers 18A disposed in the region in which the wiring portion 12B is to be formed, and then by drying the composition. The composition for an electrically-insulating layer contains a polymerizable compound and a solvent, and may additionally contain a polymerization initiator and a reaction inhibitor, if necessary. Next, the coating film is exposed to ionizing radiation such as ultraviolet light to polymerize (cross-link) the polymerizable compound and to cure the coating film, whereby the electrically-insulating layer 14 depicted in FIG. 16(A) is formed.

After the electrically-insulating layer 14 is formed, an electroconductive fiber dispersion liquid containing the electroconductive fibers 18B and a dispersion medium was applied to a region in which the bridge wiring portion 13B is to be formed on the surface of the electrically-insulating layer 14 and the surface of the electroconductive fiber pattern 13A1, using a dispenser or an ink-jet technique, and the liquid is dried to dispose the electroconductive fibers 18B depicted in FIG. 16 (B).

The viscosity of the electroconductive fiber dispersion liquid is preferably Pa·s or more and 20 Pa·s or less. The electroconductive fiber dispersion liquid having a viscosity of 0.01 Pa·s or more, for example, makes it less likely that the electroconductive fiber dispersion liquid runs down when the electroconductive fiber dispersion liquid is applied to the below-described three-dimensional surface, and thus, makes it possible to fix the electroconductive fiber dispersion liquid at a desired location. In addition, the electroconductive fiber dispersion liquid having a viscosity of 20 Pa·s or less makes it possible to inhibit the electroconductive fiber dispersion liquid from being stuck when the electroconductive fiber dispersion liquid is applied using a dispenser or an ink-jet technique. Thus, the liquid is discharged more easily. The viscosity of the electroconductive fiber dispersion liquid is more preferably 0.01 Pa·s or more and 10 Pa·s or less, 0.01 Pa·s or more and 8 Pa·s or less, 0.01 Pa·s or more and 5 Pa·s or less, 0.01 Pa·s or more and 1 Pa·s or less, 0.02 Pa·s or more and 20 Pa·s or less 0.02 Pa·s or more and 10 Pa·s or less, 0.02 Pa·s or more and 8 Pa·s or less, 0.02 Pa·s or more and 5 Pa·s or less, 0.02 Pa·s or more and 1 Pa·s or less, 0.03 Pa·s or more and 20 Pa·s or less, 0.03 Pa·s or more and 10 Pa·s or less, 0.03 Pa·s or more and 8 Pa·s or less, 0.03 Pa·s or more and 5 Pa·s or less, 0.03 Pa·s or more and 1 Pa·s or less, 0.05 Pa·s or more and 20 Pa·s or less, 0.05 Pa·s or more and 10 Pa·s or less, 0.05 Pa·s or more and 8 Pa·s or less, 0.05 Pa·s or more and 5 Pa·s or less, or 0.05 Pa·s or more and 1 Pa·s or less.

The viscosity of the electroconductive fiber dispersion liquid can be measured using an oscillational viscometer (for example, product name "VM-10A-M", manufactured by Sekonic Corporation). Specifically, the viscosity of the electroconductive fiber dispersion liquid is measured ten times in an environment at a temperature of 25 °C and a relative humidity of 30% to 70%, and the viscosity is determined by calculating the arithmetic mean of eight viscosity values obtained by excluding the maximum value and the minimum value from the ten viscosity values measured.

The electroconductive fiber dispersion liquid is preferably applied using a contact dispenser. Applying the electroconductive fiber dispersion liquid using a contact dispenser enables the electroconductive fibers 18B of the bridge wiring portion 13B to be arranged in the second direction DR2. Specifically, the discharge outlet of a contact dispenser is moved in the second direction DR2 relatively with respect to the base material 11, during which the electroconductive fiber dispersion liquid is discharged through the discharge outlet along the second direction DR2, so that the electroconductive fiber dispersion liquid is applied linearly. The electroconductive fibers are thus disposed. As used herein, a "contact dispenser" is the type of dispenser which has a discharge outlet configured to come in direct contact with the standing electroconductive fiber dispersion liquid formed on a face intended for application. In addition, the phrase "a discharge outlet of a dispenser is moved relatively with respect to the base material" may mean any one of the following: that a discharge outlet of a dispenser is moved with respect to the base material; and that the base material is moved with respect to a discharge outlet a dispenser. The discharge outlet is configured, for example, to discharge the electroconductive fiber dispersion liquid with a plunger pushed pneumatically. Examples of the discharge outlet include syringes, nozzles, and the like.

When the electroconductive fiber dispersion liquid is discharged, the relative moving rate of the discharge outlet with respect to the base material 11 is preferably 5 mm/second or more and 500 mm/second or less. The relative moving rate of 5 mm/second or more makes it possible to inhibit the electroconductive fibers 18B from spreading wetly, and 500 mm/second or less makes it possible to discharge the electroconductive fiber dispersion liquid linearly without a break in the discharge. The relative moving rate is more preferably 5 mm/second or more and 450 mm/second or less, 5 mm/second or more and 420 mm/second or less, 5 mm/second or more and 400 mm/second or less, 10 mm/second or more and 500 mm/second or less, mm/second or more and 450 mm/second or less, 10 mm/second or more and 420 mm/second or less, 10 mm/second or more and 400 mm/second or less, 15 mm/second or more and 500 mm/second or less, 15 mm/second or more and 450 mm/second or less, 15 mm/second or more and 420 mm/second or less, 15 mm/second or more and 400 mm/second or less, 20 mm/second or more and 500 mm/second or less, 20 mm/second or more and 450 mm/second or less, 20 mm/second or more and 420 mm/second or less, or 20 mm/second or more and 400 mm/second or less. As used herein, the "relative moving rate of the discharge outlet with respect to the base material" refers to a relative moving rate in the direction in which a linear coating is formed.

While the electroconductive fiber dispersion liquid is discharged, the gap (coating gap) between the discharge outlet and the electrically-insulating layer is preferably 5 μm or more and 80 μm or less. The coating gap of 5 μm or more makes it possible to inhibit contact between the discharge outlet and the electrically-insulating layer, and 80 μm or less makes it possible to discharge the electroconductive fiber dispersion liquid linearly without a break in the discharge. The coating gap is more preferably 5 μm or more and 70 μm or less, 5 μm or more and 60 μm or less, 5 μm or more and 50 μm or less, 10 μm or more and 80 μm or less, 10 μm or more and 70 μm or less, 10 μm or more and 60 μm or less, 10 μm or more and 50 μm or less, 15 μm or more and 80 μm or less, 15 μm or more and 70 μm or less, 15 μm or more and 60 μm or less, 15 μm or more and 50 μm or less, 20 μm or more and 80 μm or less, 15 μm or more and 70 μm or less, 15 μm or more and 60 μm or less, or 15 μm or more and 50 μm or less.

The diameter of the discharge opening of the discharge outlet is preferably 20 μm or more and 200 μm or less. The discharge opening having a diameter of 20 μm or more makes it possible to inhibit the electroconductive fiber dispersion liquid from being stuck at the discharge opening, and 200 μm makes it possible to inhibit the electroconductive fiber dispersion liquid from flowing out. The diameter of the discharge opening is more preferably 20 μm or more and 160 μm or less, 20 μm or more and 120 μm or less, 20 μm or more and 100 μm or less, 22 μm or more and 200 μm or less, 22 μm or more and 160 μm or less, 22 μm or more and 120 μm or less, 22 μm or more and 100 μm or less, 24 μm or more and 200 μm or less, 24 μm or more and 160 μm or less, 24 μm or more and 120 μm or less, 24 μm or more and 100 μm or less, 25 μm or more and 200 μm or less, 25 μm or more and 160 μm or less, 25 μm or more and 120 μm or less, or 25 μm or more and 100 μm or less.

The discharge pressure of the electroconductive fiber dispersion liquid during the discharge of the electroconductive fiber dispersion liquid is preferably 1 kPa or more and 50 kPa or less. The discharge pressure of 1 kPa or more makes it possible to discharge the electroconductive fiber dispersion liquid without causing the liquid to be stuck, and 50 kPa or less makes it possible to inhibit the electroconductive fiber dispersion liquid from being subjected to an excessive pressure. The discharge pressure is more preferably 1 kPa or more and 40 kPa or less, 1 kPa or more and 30 kPa or less, 1 kPa or more and 20 kPa or less, 2 kPa or more and 50 kPa or less, 2 kPa or more and 40 kPa or less, 2 kPa or more and 30 kPa or less, 2 kPa or more and 20 kPa or less, 4 kPa or more and 50 kPa or less, 4 kPa or more and 40 kPa or less, 4 kPa or more and 30 kPa or less, 4 kPa or more and 20 kPa or less, 5 kPa or more and 50 kPa or less, 5 kPa or more and 40 kPa or less, 5 kPa or more and 30 kPa or less, or 5 kPa or more and 20 kPa or less.

The drying temperature of the electroconductive fiber dispersion liquid is preferably 60 °C or more and 200 °C or less. The electroconductive fiber dispersion liquid having a drying temperature of 60 °C or more makes it possible, for example, that there are more kinds of base materials are available to be used when the electroconductive fiber dispersion liquid is applied to the below-described three-dimensional surface. In addition, the electroconductive fiber dispersion liquid having a drying temperature of 200 °C or less makes it possible to inhibit a dimensional change of the base material. The drying temperature of the electroconductive fiber dispersion liquid is more preferably 60 °C or more and 180 °C or less, 60 °C or more and 160 °C or less, 60 °C or more and 150 °C or less, 80 °C or more and 200 °C or less, 80 °C or more and 180 °C or less, 80 °C or more and 160 °C or less, 80 °C or more and 150 °C or less, 90 °C or more and 200 °C or less, 90 °C or more and 180 °C or less, 90 °C or more and 160 °C or less, 90 °C or more and 150 °C or less, 100 °C or more and 200 °C or less, 100 °C or more and 180 °C or less, 100 °C or more and 160 °C or less, or 100 °C or more and 150 °C or less.

After the electroconductive fibers 18B are disposed, a resin composition is applied to cover the electroconductive fibers 18A and 18B, using a die coater, a dispenser, or an ink-jet technique, and dried to form a coating film. The resin composition contains a polymerizable compound and a solvent, and may additionally contain a polymerization initiator and a reaction inhibitor as necessary. Next, the coating film is exposed to ionizing radiation such as ultraviolet light to polymerize (cross-link) the polymerizable compound and to cure the coating film, whereby the resin layer 17 containing the resin portions 17A and 17B as depicted in FIG. 17 is formed. The sensor 10 depicted in FIG. 1 is thus obtained.

As above-mentioned, the electroconductive fiber dispersion liquid containing the electroconductive fibers 18A or the electroconductive fiber dispersion liquid containing the electroconductive fibers 18B is applied using a dispenser or an ink-jet technique, but these electroconductive fiber dispersion liquids may be applied, for example, by a spray coating method, dip coating method, drop casting method, or the like. Among these, a dispenser or an ink-jet technique can inhibit the aggregation of electroconductive fibers, can form a fine pattern, and makes it possible to obtain a coating film having excellent uniformity, and hence, application with a dispenser or by an ink-jet technique is particularly preferable.

<<Another Method of Producing Sensor>>

The sensor 30 can be produced, for example, by the following method. First, as depicted in FIG. 18 (A), an electroconductive fiber dispersion liquid containing the electroconductive fibers 18A and a dispersion medium is applied to the whole first face 11A of the base material 11, using a coating apparatus, such as a die coater, and the dispersion is dried to dispose the electroconductive fibers 18A.

Then, a resin composition containing a polymerizable compound and a solvent is applied to the whole surface of the electroconductive fibers 18A using a coating apparatus, such as a die coater, and the composition is dried to form a coating film of the resin composition. Then, the coating film is exposed to ionizing radiation such as ultraviolet light to polymerize (cross-link) the polymerizable compound, whereby the coating film is cured to form a resin depicted in FIG. 18 (B), thus forming an electroconductive layer 51 having the resin portion 17C and the electroconductive fibers 18A disposed in the resin portion 17C.

After the electroconductive layer 51 is formed, a screen printing method or the like is used to apply an electroconductive paste to the surface of the area of the resin portion 17C on the region in which the first electrode portion 12A is to be formed. A coating film is thus formed. Then, the electroconductive paste is cured by heating at a temperature of 80 °C or more and 150 °C or less for a predetermined period of time to obtain a cured electroconductive paste 52 depicted in FIG. 19 (A).

After the electroconductive paste is cured, the electroconductive layer 51 and the cured electroconductive paste 52 are patterned to form the electroconductive fibers 18A into the shapes of the first electroconductive part 12 and the second electrode portion 13A, and also form the electrical lead-out line portion 15. Specifically, the regions for the first electroconductive part 12 and the second electrode portion 13A are exposed to a laser light (for example, an infrared light laser) so that the electroconductive layer 51 can be etched by dry etching. In addition, the cured electroconductive paste 52 is exposed to a laser light (for example, an infrared light laser) to be etched so that the cured electroconductive paste 52 can be disposed on part of the surface of the first electrode portion 12A disposed at an end among a plurality of the first electrode portions 12A along the first direction DR1. When the electroconductive layer 51 is exposed to a laser light, the heat of the laser light sublimates the electroconductive fibers 18A contained in this region. The electroconductive fibers 18A sublimated break out through the resin portion 17C to be discharged out of the resin portion 17C. As described above, the electroconductive layer 51 and the cured electroconductive paste 52 are patterned by dry etching, but the electroconductive layer 51 and the cure electroconductive paste 52 may be patterned by a photolithography method.

The subsequent step of forming the electrically-insulating layer 14, and step of forming the bridge wiring portion 13B are similar to the step of producing the sensor 10, and further description is thus omitted here. The sensor 30 can be thus obtained.

In cases where the bridge wiring portion is formed from an oxide material such as ITO, the sensor will undesirably generate a break or a crack when folded, thus failing to obtain good flexibility. According to the present embodiment, however, the bridge wiring portion 13B contains the electroconductive fibers 18B, and thus, makes it possible to obtain good flexibility.

According to the present embodiment, the bridge wiring portion 13B contains the electroconductive fibers 18B. The electroconductive fibers 18B are disposed in the resin portion 17B, and thus, most of the bridge wiring portion 13B is within the resin portion 17B. Because of this, the refractive index of the bridge wiring portion 13B is substantially the refractive index of the resin portion 17B. This makes it possible to achieve the invisibility of the bridge wiring portion.

According to the present embodiment, the bridge wiring portion 13B contains the electroconductive fibers 18B that are the same electroconductive material as the electroconductive fibers 18A that are the electroconductive material contained in the second electrode portion 13A. The electroconductive fibers 18B are disposed in the resin portion 17B, and thus, most of the bridge wiring portion 13B is within the resin portion 17B. Because of this, the refractive index of the bridge wiring portion 13B is substantially the refractive index of the resin portion 17B. This makes it possible to decrease a difference in the refractive index between the second electrode portion 13A and the bridge wiring portion 13B, thus making it possible to achieve the invisibility of the bridge wiring portion 13B. In this regard, the second electrode portion and the bridge wiring portion are formed conventionally by etching. Using the same constituent electroconductive material for the second electrode portion and the bridge wiring portion causes the second electrode portion to be etched when the bridge wiring portion is etched, and accordingly, it is difficult to constitute the second electrode portion and the bridge wiring portion using the same electroconductive material.

According to the present embodiment, the electroconductive fiber dispersion liquid is applied to form the first electrode portion 12A, the wiring portion 12B, the second electrode portion 13A, and the bridge wiring portion 13B, and thus, patterning by etching is not necessary. This makes it possible to reduce unnecessary portions of the electroconductive fibers 18A and 18B, thus making it possible to attempt cost reduction. In addition, making etching unnecessary decreases the number of processes, thus making it possible to attempt to shorten the production time.

In the sensor 40, the wall portion 41 is formed between the first electroconductive part 12 and the second electrode portion 13A, and thus, migration of the electroconductive fibers from the first electroconductive part 12 and the second electrode portion 13A can be inhibited by the wall portion 41, making it possible to inhibit an electrical short-circuit between the first electroconductive part 12 and the second electrode portion 13A.

The electroconductive fiber dispersion liquid is usually applied using a die coating method or a bar coating method, but using a die coating method or a bar coating method to form an electroconductive layer causes the electroconductive fibers to be disposed randomly. Thus, even if the electroconductive layer is patterned by etching to form a linear electroconductive part, the electroconductive fibers are disposed randomly. In addition, in cases where the electroconductive fiber dispersion liquid is applied with a noncontact dispenser or by an ink-jet technique to form a linear electroconductive part, each droplet of the electroconductive fibers is directional, but the whole electroconductive fibers applied are not directional, and thus, the electroconductive fibers in the electroconductive part are disposed randomly. Furthermore, also in cases where an electroconductive fiber dispersion liquid is applied by a screen printing method to form a linear electroconductive part, the electroconductive fibers in the electroconductive part are disposed randomly. On the other hand, in cases where the electroconductive fibers are arranged along a direction, the line resistance value is lower than in cases where the electroconductive fibers are disposed randomly. According to the present embodiment, in cases where the discharge outlet of a contact dispenser is moved relatively with respect to the base material 11, during which the electroconductive fiber dispersion liquid containing the electroconductive fibers 18B is applied through the discharge outlet to the first face 11A side of the base material 11, the electroconductive fibers 18B can be arranged along the moving direction of the discharge outlet or the base material 11. This is considered to be because the discharge outlet of the dispenser has a narrow opening, and thus, the electroconductive fiber dispersion liquid is applied without laying down the electroconductive fibers, that is, the electroconductive fibers are applied, allowing the longitudinal direction of the electroconductive fibers 18B to be normal to the base material 11. This makes it possible to decrease the line resistance value of the bridge wiring portion 13B, thus making it possible to decrease the amount of the electroconductive fibers 18B contained in the bridge wiring portion 13B. This makes it possible to achieve a desired line resistance value, and simultaneously attempt cost reduction.

As described above, in cases where an electroconductive fiber dispersion liquid is applied using a die coating method or a bar coating method, the electroconductive part is formed in layer form, and thus, forming a linear electroconductive part necessitates patterning by etching. Patterning by etching removes unnecessary portions of the electroconductive part, and thus, the electroconductive fibers contained in the portions removed by etching are wasted. According to the present embodiment, however, directly applying an electroconductive fiber dispersion liquid linearly does not necessitate patterning by etching. This makes it possible to reduce waste of the electroconductive fibers 18A and 18B, thus making it possible to attempt cost reduction. In addition, making etching unnecessary decreases the number of processes, thus making it possible to attempt to shorten the production time.

According to the present embodiment, in cases where the electroconductive fibers 18B in the bridge wiring portion 13B are arranged along the second direction DR2, the line resistance value of the bridge wiring portion 13B can be decreased, resulting in making it possible to decrease the amount of the electroconductive fibers 18B contained in the bridge wiring portion 13B. This makes it possible to achieve a desired line resistance value, and simultaneously attempt cost reduction.

According to the present embodiment, the portions between the wall portions 41 are filled with the electroconductive fiber dispersion liquid to form the first electroconductive part 12 and the second electrode portion 13A, and thus, patterning by etching is not necessary. This makes it possible to reduce unnecessary portions of the electroconductive fibers 18A, thus making it possible to attempt cost reduction. In addition, making etching unnecessary decreases the number of processes, thus making it possible to attempt to shorten the production time.

According to the present embodiment, the first electroconductive part 12 and the second electrode portion 13A are formed between the wall portions 41, the wall portions 41 can inhibit the migration of the electroconductive material from the first electroconductive part 12 and/or the second electrode portion 13A, thus making it possible to inhibit an electrical short-circuit between the first electroconductive part 12 and the second electroconductive part 13.

The sensors 10 and 20 are each incorporated in an article, and used. Examples of such an article include, but are not limited particularly to, an image display device. FIG. 20 is a schematic diagram of an image display device according to the present embodiment.

<<<Image Display Device>>>

The image display device 60 depicted in FIG. 20 includes a display element 70, a circularly polarizing plate 80, a sensor 10, and a cover member in this order toward the observer side. The sensor 10 functions as a touch panel, and the bridge wiring portion 13B is disposed on the observer side from the first electroconductive part 12. Adhesion is achieved via adhesion layers 91 to 93 between the display element 70 and the circularly polarizing plate 80, between the circularly polarizing plate 80 and the sensor and between the sensor 10 and the cover member 90 respectively. As used herein, the term “adhesion” refers to a concept encompassing adhesiveness.

<<Display Element>>

Examples of the display element 70 include liquid crystal display elements, organic light-emitting diode elements (hereinafter referred to as “OLED elements”), inorganic light-emitting diode elements, micro LEDs, and plasma elements. As the organic light-emitting diode element, a known organic light-emitting diode element can be used. In addition, the liquid crystal display element may be an in-cell touch panel liquid crystal display element including a touch panel function in the element.

<<Circularly Polarizing Plate>>

The circularly polarizing plate 80 has a function for inhibiting external light reflection, and thus, the circularly polarizing plate 80 is effective particularly in cases where an OLED element is used as a display element. The circularly polarizing plate 80 includes, for example, a first retardation film, an adhesion layer, a second retardation film, an adhesion layer, and the polarizing plate in this order toward the observer side.

The thickness of the circularly polarizing plate 80 is 100 μm or less in terms of attempting further thinness. In terms of processability with a decrease in strength, the thickness of the circularly polarizing plate 80 is preferably 20 μm or more and 100 μm or less, 20 μm or more and 95 μm or less, 20 μm or more and 90 μm or less, 20 μm or more and 80 μm or less, 30 μm or more and 100 μm or less, 30 μm or more and 95 μm or less, 30 μm or more and 90 μm or less, 30 μm or more and 80 μm or less, 50 μm or more and 100 μm or less, 50 μm or more and 95 μm or less, 50 μm or more and μm or less, or 50 μm or more and 80 μm or less. The thickness of the circularly polarizing plate 80 can be determined as the arithmetic mean of the thickness values at eight locations obtained by excluding the maximum value and the minimum value from the thickness values measured at ten locations, wherein the thickness values at the ten locations are measured in a cross-sectional image of the circularly polarizing plate 80, wherein the cross-sectional image of the circularly polarizing plate 80 is acquired using a scanning electron microscope (SEM).

The circularly polarizing plate 80 may be incorporated into an image display device using one of a chip-cutting method and a roll-to-panel method. A chip-cutting method is a method in which a circularly polarizing plate having a predetermined size according to the size of an image display device is cut out of a roll-shaped circularly polarizing plate, and attached via an adhesion layer to a cover member such as of glass. In addition, a roll-to-panel method is a method in which a roll-shaped circularly polarizing plate is cut while being sent out in a production line of an image display device, and attached via an adhesion layer to a cover member such as of glass.

<<Cover Member>>

The surface 90A of the cover member 90 is the surface 60A of the image display device 60. The cover member 90 may be a cover glass or a cover film made of a resin. In cases where the image display device 60 is bendable, the cover member 90 is preferably constituted by bendable glass or bendable resin. Examples of bendable resins include resins such as polyimide resins, polyamide-imide resins, polyamide resins, polyester resins (for example, polyethylene terephthalate resins and polyethylene naphthalate resins), and mixtures of two or more of these resins.

<<Adhesion Layer>>

The adhesion layers 91 and 93 can each be constituted by a cured product of a liquid radiation-curable bonding agent (for example, OCR: Optically Clear Resin) containing a polymerizable compound or by an adhesive (for example, OCA: Optical Clear Adhesive).

<<<Electric Conductor>>>

The electric conductor includes: a three-dimensional object having a three-dimensional surface (three-dimensional surface); and an electroconductive part provided on the three-dimensional surface and containing a resin portion and an electroconductive fiber pattern (first electroconductive fiber pattern) disposed in the resin portion, composed of a plurality of electroconductive fibers, and in conformity to the shape of the three-dimensional surface. Such an electric conductor is not limited to any particular conductor as long as the conductor includes an electroconductive fiber pattern in conformity with the shape of the three-dimensional surface, and is, for example, the above-described sensor 10. As used herein, the “conformity” means that the electroconductive fiber pattern as a whole is along the three-dimensional surface, and is electrically conductible. Accordingly, each electroconductive fiber is optionally not along the three-dimensional surface. In addition, the electroconductive fiber pattern does not need to be strictly in conformity to the shape of the three-dimensional surface, and is considered to be in conformity to the three-dimensional surface if generally in conformity. Whether the electroconductive fiber pattern is electrically conductible can be verified by measuring the line resistance value. For example, in cases where the line resistance value of an electroconductive fiber pattern is 1,000,000Ω or less, the electroconductive fiber pattern can be determined to be electrically conductible.

The electric conductor is not limited to any particular application. The electric conductor is incorporated, for example, in a sensor, and can be used for various articles (for example, image display devices and biosensors). The applications of the sensor are the same as the applications of the sensor described in the above-described section on the sensor.

Below, an electric conductor 100 (see FIG. 1 and FIG. 3) as the sensor 10 will be described. As depicted in FIG. 3, the electric conductor 100 includes a three-dimensional object 101. In FIG. 3, the three-dimensional object 101 is constituted by: the base material 11; the first electroconductive part 12 provided on the first face 11A side of the base material 11, having a plurality of the first electrode portions 12A disposed in the first direction DR1, and having the wiring portion 12B that electrically connects the first electrode portions 12A adjacent to each other; a plurality of the electroconductive fiber patterns 13A1 provided on the first face 11A side of the base material 11, disposed apart from the first electroconductive part 12, and disposed in the second direction DR2 intersecting with the first direction DR1; and the electrically-insulating layer 14 disposed on the wiring portion 12B.

The three-dimensional object 101 has the three-dimensional surface 101A. The three-dimensional surface is not limited to any particular three-dimensional surface, and is, for example, a three-dimensional surface formed by combining planes with each other, a combination of curved faces, a combination of planes and curved faces, a surface having steps, and the like. It is usually very difficult to apply electroconductive fibers to a shape having a step 50 μm or more high, but applying is possible with a dispenser or by an ink-jet technique, and thus, the three-dimensional surface may have a step μm or more high (for example, a step 1 mm or more high or a step 1 cm or more high). In FIG. 3, the wiring portion 12B and the electroconductive fiber pattern 13A1 are both formed on the first face 11A of the base material 11, the electrically-insulating layer 14 is formed on the wiring portion 12B, and thus, the position of the surface 14A of the electrically-insulating layer 14 is higher than the position of the surface 13A11 of the electroconductive fiber pattern 13A1. Accordingly, the surface constituted by the surface 14A of the electrically-insulating layer 14 and the surface 13A11 of the electroconductive fiber pattern 13A1 is the three-dimensional surface 101A. In this regard, the upper face 14A1 of the surface 14A of the electrically-insulating layer 14 depicted in FIG. 3 is planar, and the side 14A2 is generally in parallel with the normal direction DR3 of the base material 11. For example, however, as with the electric conductor 110 depicted in FIG. 21, the upper face 14A1 of the electrically-insulating layer 14 may be curved, and the side 14A2 may be tilted with respect to the normal direction DR3 of the base material 11. In FIG. 21, the elements denoted by the same reference signs as in FIG. 3 are the same as the elements denoted in FIG. 3, and further description is thus omitted.

The electroconductive part 102 includes the electroconductive fiber pattern 102A. The electroconductive fiber pattern 102A is formed to straddle the wiring portion 12B and formed on the surfaces 13A11 of the adjacent electroconductive fiber patterns 13A1 and on the surface 14A of the electrically-insulating layer 14 between the electroconductive fiber patterns 13A1 in such a manner that the electroconductive fiber patterns 13A1 adjacent to each other are electrically connected. That is, the electroconductive part 102 is the bridge wiring portion 13B. In cases where the electroconductive part 102 is the bridge wiring portion 13B, the electroconductive part 102 includes the resin portion 17B in addition to the electroconductive fiber pattern 102A, but optionally does not include the resin portion as long as the electroconductive part includes the electroconductive fiber pattern.

As described above, the three-dimensional object 101 is constituted by the base material 11 and the like, and is not limited to any particular constituent as long as the three-dimensional object 101 has a shape having a three-dimensional surface. In addition, the three-dimensional surface 101A is constituted by the surface 14A of the electrically-insulating layer 14 and the surface 13A11 of the electroconductive fiber pattern 13A1, but is not limited particularly to the surfaces of these constituents. For example, the three-dimensional object may be a plano-convex lens having a three-dimensional surface that is convex. As described above, the electroconductive part 102 is the bridge wiring portion 13B, but is optionally not the bridge wiring portion 13B.

In cases where the electroconductive fiber pattern 102A is formed on the three-dimensional surface 101A, the electroconductive fiber dispersion liquid is applied with movement of the discharge outlet of a dispenser or an ink-jet device or movement of the three-dimensional object 101, the application is preferably performed in control of the distance between this discharge outlet and each of the surface 14A of the electrically-insulating layer 14 and the surface 13A11 of the electroconductive fiber pattern 13A1. For example, the distance between the discharge outlet of the dispenser and each of the surface 14A of the electrically-insulating layer 14 and the surface 13A11 of the electroconductive fiber pattern 13A1 may be controlled so as to be substantially constant. When the electroconductive fiber dispersion liquid is applied, controlling the distance between the discharge outlet and each of the surface 14A of the electrically-insulating layer 14 and the surface 13A11 of the electroconductive fiber pattern 13A1 makes it possible to dispose the electroconductive fibers 18A without unevenness, even in cases where the electroconductive fibers 18A having an aspect ratio of 5 or more are disposed on the three-dimensional surface 101A. Thus, the electroconductive fiber pattern 13B1 can be formed uniformly on the three-dimensional surface 101A. This makes it possible to form the electroconductive fiber pattern 13B1 in conformity to the three-dimensional surface 101A.

The electric conductor 130 depicted in FIG. 22 is incorporated, for example, in a cotton swab type of biosensor 120. The biosensor 120 includes an electric conductor 130 and a covering portion 140 covering part of the electric conductor 130. The electric conductor 130 includes; a support (three-dimensional object) 131 having a three-dimensional surface 131A; and an electroconductive part 132 provided on the three-dimensional surface 131A and containing an electroconductive fiber pattern 132A composed of a plurality of electroconductive fibers and in conformity to the shape of the three-dimensional surface 131A. The covering portion 140 covers the electroconductive part 132. For example, when the inside of the nasal cavity or the inside of the oral cavity is wiped with the biosensor 120, nasal discharge, mucosa, saliva, or the like as a sample is attached to the covering portion 140 of the biosensor 120, and the sample is allowed to pass to the electroconductive part 132 through the covering portion 140, and thus, can be used for examination.

The electroconductive part 132 includes a resin portion (not shown) in addition to the electroconductive fiber pattern 132A, but optionally does not include a resin portion as long as the electroconductive part 132 includes the electroconductive fiber pattern 132A. The constituent electroconductive fibers constituting the electroconductive fiber pattern 132A are the same as the electroconductive fibers 18A, and further description is thus omitted here.

According to the present embodiment, the electric conductors 100, 110, and 130 contain the electroconductive fiber pattern 102A or 132A in conformity to the three-dimensional surface 101A or 131A, thus making it possible to obtain an electric conductor 100, 110, or 130 having the electroconductive fiber pattern 102A or 132A that can conform to any of various three-dimensional surfaces 101A and 131A. Additionally, such an electric conductor 100, 110, or 130 can afford performance in accordance with the purpose.

EXAMPLES

Now, the present invention will be described in more detail by way of Examples. However, the present invention is not limited to those Examples.

Preparation of Silver Nanowire Dispersion Liquid (Silver Nanowire Dispersion Liquid 1)

Ethylene glycol as an alcohol solvent, silver nitrate as a silver compound, sodium chloride as a chloride, sodium bromide as a bromide, sodium hydroxide as an alkali metal hydroxide, aluminum nitrate nonahydrate as an aluminum salt, and a copolymer of vinylpyrrolidone and diallyldimethylammonium nitrate as an organic protecting agent (copolymer prepared with 99 mass % of vinylpyrrolidone and 1 mass % of diallyldimethylammonium nitrate, a weight average molecular weight of 130,000) were prepared.

At room temperature, into 540 g of ethylene glycol, 0.041 g of sodium chloride, 0.0072 g of sodium bromide, 0.0506 g of sodium hydroxide, 0.0416 g of aluminum nitrate nonahydrate, and 5.24 g of the copolymer of vinylpyrrolidone and diallyldimethylammonium nitrate were added and dissolved to obtain a solution A. In a different container, 4.25 g of silver nitrate was added and dissolved in 20 g of ethylene glycol to prepare a solution B. In this example, the Al/OH molar ratio was 0.0876 and the OH/Ag molar ratio was 0.0506.

The whole amount of the solution A was heated from room temperature to 115 °C with stirring, and the whole amount of the solution B was added into the solution A over one minute. After the addition of the solution B was completed, the stirring was further continued and maintained at 115 °C for 24 hours. Then, the reaction liquid was cooled to room temperature. After cooling, acetone was added to the reaction liquid in an amount 10 times that of the reaction liquid, and the resulting mixture was stirred for 10 minutes and left to stand for 24 hours. After the mixture was left to stand, a concentrate and a supernatant were observed, and the supernatant was carefully removed with a pipette to obtain the concentrate.

To the obtained concentrate, 500 g of pure water was added, and the resulting mixture was stirred for 10 minutes to disperse the concentrate. Then, acetone was further added in an amount 10 times that of the mixture, and the resulting mixture was stirred and then left to stand for 24 hours. After the mixture was left to stand, a concentrate and a supernatant were observed again, and the supernatant was carefully removed with a pipette. Since an excessive amount of the organic protecting agent is unnecessary for obtaining good electroconductivity, this washing operation was performed about 1 to 20 times as necessary to sufficiently wash the solid content.

Pure water was added to the solid content after washing to obtain a dispersion liquid of this solid content. The dispersion liquid was fractionated, and pure water, which was a solvent, was volatilized on an observation table, followed by the observation with a high-resolution FE-SEM (high-resolution field emission scanning electron microscope). As a result, the solid content was confirmed to be silver nanowires.

Isopropyl alcohol was added to the washed silver nanowires to obtain a silver nanowire dispersion liquid 1. Measurement of the average fiber diameter and the average fiber length of the silver nanowires in the silver nanowire dispersion liquid 1 indicated that the silver nanowires had an average fiber diameter of 45 nm and an average fiber length of 15 μm. The concentration of silver nanowires in the silver nanowire dispersion liquid 1 was 1.5 mg/ml. Furthermore, the viscosity of the silver nanowire dispersion liquid 1 was 0.08 Pa·s.

The average fiber diameter of the silver nanowires was determined as the arithmetic mean of the fiber diameters of 100 electroconductive fibers in 50 images acquired at a magnification of 100,000 to 200,000 times using a transmission electron microscope (TEM) (product name "H-7650", manufactured by Hitachi High-Technologies Corporation), wherein the fiber diameters were actually measured on the acquired images by a software program accessory to the TEM. The above-mentioned fiber diameters were measured by setting the accelerating voltage to "100 kV", the emission current to "10 μA", the condenser lens aperture to "1", the objective lens aperture to "0", the observation mode to "HC", and the Spot to "2". Additionally, the average fiber length of the silver nanowires was determined as the arithmetic mean of the fiber lengths of 98 silver nanowires obtained by excluding the maximum value and the minimum value from the fiber length values of 100 silver nanowires, wherein the values of the 100 silver nanowires were measured using a scanning electron microscope (SEM) (product name "S-4800 (Type 2)", manufactured by Hitachi High-Technologies Corporation) at a magnification of 500 to 20,000,000 times. The above-mentioned fiber lengths were measured by setting the signal selection to "SE", the accelerating voltage to "3 kV", the emission current to "10 μA", and the SE detector to "Mixed". The fiber length of the silver nanowires was determined as the arithmetic mean of the fiber lengths of 98 silver nanowires obtained by excluding the maximum value and the minimum value from the fiber lengths of 100 silver nanowires in ten images acquired at a magnification of 500 to 20,000,000 times using a scanning electron microscope (SEM) (product name "S-4800 (Type 2)", manufactured by Hitachi High-Technologies Corporation) on the SEM mode, wherein the fiber lengths of the 100 silver nanowires were measured on the acquired images by an accessory software program. The above-described fiber lengths were measured using a 45° pre-tilted sample stub by setting the signal selection to "SE", the accelerating voltage to "3 kV", the emission current to "10 μA to 20 μA", the SE detector to "Mixed", the probe current to "Norm", the focus mode to "UHR", the condenser lens 1 to "5.0", the WD to "8 mm", and the Tilt to "30°". The TE detector was removed from the microscope system prior to the observation. When the fiber diameter of the silver nanowires was determined, a measurement sample produced by the following method was used. First, the silver nanowire dispersion liquid 1 was diluted with ethanol depending on the type of the dispersion medium to reduce the concentration of silver nanowires to 0.05 mass % or less. Furthermore, a drop of the diluted silver nanowire dispersion liquid 1 was applied on a carbon-coated grid mesh for TEM or STEM observation (a Cu grid with the model "#10-1012, Elastic Carbon Film ELS-C10 in the STEM Cu100P grid specification"), dried at room temperature, and then observed under the above-mentioned conditions to obtain observation image data. The resulting observation image data were used to calculate the arithmetic mean. When the fiber length of the silver nanowires was determined, a measurement sample produced by the following method was used. First, the silver nanowire dispersion liquid 1 was applied to an untreated surface of a polyethylene terephthalate (PET) film having a B5 size and having a thickness of 50 μm, in such a manner that the amount of application of silver nanowires is 10 mg/m$^2$. The dispersion medium was evaporated, and the electroconductive fibers were disposed on the surface of the PET film to produce a sensor. A piece having a size of 10 mm×10 mm was cut out of the central part of this sensor. Then, the cut sensor was attached flat against the tilted surface of a pre-tilted SEM sample stub (model number "728-45", manufactured by Nissin EM Co., Ltd.; 45° pre-tilted sample stub; 15 mm in diameter×10 mm in height; made of M4 aluminum) using a silver paste. Furthermore, the cut sensor was sputtered with Pt—Pd for 20 seconds to 30 seconds to obtain electroconductivity.

The viscosity of the silver nanowire dispersion liquid 1 was measured using an oscillational viscometer (product name "VM-10A-M", manufactured by Sekonic Corporation). Specifically, the viscosity of the silver nanowire dispersion liquid 1 was measured ten times in an environment at a temperature of 25 °C and a relative humidity of 50%, and the viscosity is determined by calculating the arithmetic mean of eight viscosity values obtained by excluding the maximum value and the minimum value from the ten viscosity values measured.

(Silver Nanowire Dispersion Liquid 2)

The silver nanowire dispersion liquid 2 was obtained in the same manner as the silver nanowire dispersion liquid 1 except that the amount of isopropyl alcohol added was larger than in the silver nanowire dispersion liquid 1, and that the viscosity was changed to 0.008 Pa·s.

(Silver Nanowire Dispersion Liquid 3)

The silver nanowire dispersion liquid 3 was obtained in the same manner as the silver nanowire dispersion liquid 1 except that the amount of isopropyl alcohol added was smaller than in the silver nanowire dispersion liquid 1, and that the viscosity was 30 Pa·s.

Preparation of Electrically-Insulating Layer Compositions

The following components were combined to meet the composition requirements indicated below and thereby obtain an electrically-insulating layer composition 1.

(Electrically-Insulating Layer Composition 1)

Dipentaerythritol hexaacrylate (DPHA): 100 parts by mass

Polymerization initiator (product name "Omnirad 184", manufactured by IGM Resins B.V.): 4.0 parts by mass

Preparation of Resin Compositions

The following components were combined to meet the composition requirements indicated below and thereby obtain resin compositions.

(Resin Composition 1)

Dipentaerythritol hexaacrylate (DPHA): 100 parts by mass

Polymerization initiator (product name "Omnirad 184", manufactured by IGM Resins B.V.): 4.0 parts by mass Methyl isobutyl ketone (MIBK): 500 parts by mass (Resin Composition 2)

Dipentaerythritol hexaacrylate (DPHA): 100 parts by mass

Polymerization initiator (product name "Omnirad 184", manufactured by IGM Resins B.V.): 4.0 parts by mass Methyl isobutyl ketone (MIBK): 2000 parts by mass

Preparation of High-Refractive-Index Layer Compositions

The following components were combined to meet the composition requirements indicated below and thereby obtain a high-refractive-index layer composition 1.

(High-Refractive-Index Layer Composition 1)

Dipentaerythritol hexaacrylate (DPHA): 14 parts by mass

Zirconium oxide microparticle dispersion liquid (a dispersion liquid in which zirconium oxide microparticles having an average particle diameter of 10 to 15 nm were dispersed in methyl isobutyl ketone (having a solid concentration of 32.5%)): 69 parts by mass Polymerization initiator (product name "Omnirad 127", manufactured by IGM Resins B.V.): 1.0 parts by mass Methyl isobutyl ketone (MIBK): 1000 parts by mass

Preparation of Low-Refractive-Index Layer Compositions

The following components were combined to meet the composition requirements indicated below and thereby obtain a low-refractive-index layer composition 1.

(Low-Refractive-Index Layer Composition 1)

Dipentaerythritol hexaacrylate (DPHA) (product name "KAYARAD DPHA", manufactured by Nippon Kayaku Co., Ltd.): 3.5 parts by mass Solid silica microparticle dispersion liquid (a dispersion liquid in which solid silica microparticles having an average particle diameter of 10 to 15 nm were dispersed in methyl isobutyl ketone (having a solid concentration of 30%)): 21.7 parts by mass Polymerization initiator (product name "Omnirad 127", manufactured by IGM Resins B.V.): 0.7 parts by mass Methyl isobutyl ketone (MIBK): 1000 parts by mass

Example 1

First, a polyethylene terephthalate film (tradename "COSMO SHINE (registered trademark) A4100", manufactured by Toyobo Co., Ltd.) having a thickness of 48 μm and having an underlayer on one face thereof as a base material was prepared. The silver nanowire dispersion liquid 1 was used to dispose silver nanowires on each of the regions in which a first electroconductive part and a plurality of second electrode portions respectively are to be formed on the untreated side of this polyethylene terephthalate film, wherein the first electroconductive part had a plurality of first electrode portions disposed in a first direction and a wiring portion electrically connecting the first electrode portions adjacent to each other, and wherein the second electrode portions were disposed apart from the first electroconductive part, and disposed in a second direction perpendicular to the first direction. Specifically, a dispenser capable of discharging the silver nanowire dispersion liquid was first used to apply the silver nanowire dispersion liquid 1 in the shape of the first electroconductive part and in the shape of the second electrode portion, whereby a coating film was formed. Subsequently, the coating film formed was subjected to a flow of dry air at 40 °C at a flow rate of 0.5 m/s for 15 seconds, and further subjected to a flow of dry air at 70 °C at a flow rate of 15 m/s for 30 seconds to be dried, whereby the solvent was evaporated from the coating film. In this manner, the silver nanowires were disposed in each of the regions in which the first electroconductive part and the second electrode portion respectively are to be formed on the surface of the polyethylene terephthalate film, whereby the respective silver nanowire patterns were formed.

After the silver nanowires were disposed, a dispenser was used to apply a silver paste (tradename "DW-520H-14", manufactured by Toyobo Co., Ltd.) to the silver nanowires to become the first electrode portion at an end among a plurality of the first electrode portions along the first direction. Then, the silver paste was heated at 130 °C for 30 minute, and the silver paste was thus cured to form an electrical lead-out line portion.

After the electrical lead-out line portion was formed, a dispenser was used to apply the electrically-insulating layer composition to the silver nanowires in the region in which the wiring portion of the first electroconductive part is to be formed. A coating film was thus formed. Subsequently, the coating film formed was subjected to a flow of dry air at 50 °C at a flow rate of 0.5 m/s for 15 seconds, and further subjected to a flow of dry air at 70 °C at a flow rate of 10 m/s for 30 seconds to be dried, whereby the solvent was evaporated from the coating film. The coating film was exposed to ultraviolet light to a cumulative light dose of 100 $mJ/cm^2$ to be cured, whereby an electrically-insulating layer having a size of 1 mm×2 mm, a thickness of 300 nm, and a refractive index of 1.50 was formed.

After the electrically-insulating layer was formed, a dispenser capable of discharging the silver nanowire dispersion liquid was used to apply the silver nanowire dispersion liquid 1 in the shape of the bridge wiring portion in the second direction perpendicular to the first direction, in control of the distance between the discharge outlet of the dispenser and each of the surface of the electrically-insulating layer and the surface of the silver nanowire pattern, wherein the liquid was applied to the region in which the bridge wiring portion straddling the wiring portion, and electrically connecting the second electrode portions adjacent to each other is to be formed, and wherein the region was on the three-dimensional surface composed of the surface of the electrically-insulating layer and the surface of the silver nanowire pattern in a region in which the second electrode portion is to be formed. A coating film was thus formed. This silver nanowire dispersion liquid 1 was applied under the following conditions.

(Discharge Conditions)

Discharge pressure: 5 kPa

Discharge opening diameter: 100 μm

Coating gap: 50 μm

PET film moving rate: 1 mm/second

Subsequently, the coating film formed was subjected to a flow of dry air at 40 °C at a flow rate of 0.5 m/s for 15 seconds, and further subjected to a flow of dry air at 70 °C at a flow rate of 15 m/s for 30 seconds to be dried, whereby the solvent was evaporated from the coating film. In this manner, the silver nanowires were disposed in the region in which the bridge wiring portion is to be formed. A silver nanowire pattern was thus formed.

After the silver nanowires were disposed in the regions in which the bridge wiring portion is to be formed, a die coater was used to apply the resin composition 1 to cover the silver nanowires disposed in the regions in which the first electrode portion, the second electrode portion, and the bridge wiring portion are to be formed. A coating film was thus formed. Subsequently, the coating film formed was subjected to a flow of dry air at 50 °C at a flow rate of 0.5 m/s for 15 seconds, and further subjected to a flow of dry air at 70 °C at a flow rate of 10 m/s for 30 seconds to be dried, whereby the solvent was evaporated from the coating film. The coating film was exposed to ultraviolet light to a cumulative light dose of 100 $mJ/cm^2$ to be cured, whereby a resin layer having a thickness of 1000 nm and a refractive index of 1.50 was formed. This afforded a sensor having: the first electroconductive part that had the first electrode portion composed of the resin portion and the silver nanowires disposed in the resin portion, and had the wiring portion; and the second electroconductive part that had the second electrode portion composed of the resin portion and the silver nanowires disposed in the resin portion, and had the bridge wiring portion composed of the resin portion and the silver nanowires disposed in the resin portion.

The shape of the first electrode portion of the sensor according to Example 1 was the shape depicted in FIG. 1, and the width W1 of the first electrode portion was 4 mm. The shape of the wiring portion was a strip, and the refractive index of the wiring portion was 1.50. In addition, the width W2 of the wiring portion was 1 mm, and the length of the wiring portion was 0.5 mm. The shape of the second electrode portion was the shape depicted in FIG. 1, and the width W3 of the second electrode portion was 4 mm. The thickness of each of the silver nanowire patterns constituting the first electrode portion, the wiring portion, and the second electrode portion respectively was 100 nm. The shape of the bridge wiring portion was a strip, and the refractive index of the bridge wiring portion was 1.50. In addition, the width W4 of the bridge wiring portion was 0.5 mm, the length of the bridge wiring portion was 3 mm, and the thickness T3 of the bridge wiring portion was 1 μm.

The thickness of each portion or each layer was determined as the arithmetic mean of the thickness values at eight locations obtained by excluding the maximum value and the minimum value from the thickness values measured at ten locations, wherein the thickness values measured at the ten locations were randomly selected in a cross-sectional image of the electroconductive part acquired using a scanning transmission electron microscope (STEM).

Specifically, the cross-sectional images were acquired by the following method. First, a sample for observing a cross-section was produced from the sensor. Specifically, a sample was cut to a size of 2 mm×5 mm out of the sensor, and placed in a silicone embedding plate, into which an epoxy resin was poured, and the whole sample was embedded in the resin. Then, the embedding resin was left to stand at 65 °C for 12 hours or more and cured. Subsequently, ultra-thin sections were produced using an ultramicrotome (product name "Ultramicrotome EM UC7", manufactured by Leica Microsystems GmbH) at a feeding rate of 100 nm. The ultra-thin sections produced were collected on collodion-coated meshes (150) to obtain STEM samples. Then, a cross-sectional image of an STEM sample was acquired using a scanning transmission electron microscope (STEM) (product name "S-4800 (Type 2)", manufactured by Hitachi High-Technologies Corporation). The cross-sectional image was acquired by setting the detector switch (signal selection) to "TE", the accelerating voltage to 30 kV, and the emission current to "10 μA". The focus, contrast, and brightness were suitably adjusted at a magnification of 5,000 to 200,000 times so that each layer could be identified by observation. The magnification is preferably in the range from 10,000 to 50,000 times, more preferably in the range from 25,000 to 40,000 times. An excessively increased magnification causes the interface to have a coarse pixel, and to be difficult to recognize, and thus, the magnification is preferably not increased excessively during the measurement of the thicknesses of the wall portion. The cross-sectional image was acquired by additionally setting the beam monitor aperture to 3 and the objective lens aperture to 3, and also setting the WD to 8 mm. The thickness of each portion and the thickness of each layer were measured by the above-described method not only in Example 1 but also in all of the following Examples and Comparative Examples.

The refractive index of each portion was determined as the arithmetic mean of the refractive index values of three fragments obtained by excluding the maximum value and the minimum value from the refractive index values measured from five fragments of the portion, wherein the fragments were cut out of any five locations of each portion, one each, and wherein the refractive index of each of the five fragments taken out of the portion was measured by the Becke method. The refractive index of each portion was measured by this method not only in Example 1 but also in all of the following Examples and Comparative Examples. In this regard, "BW" in the section on a difference in the refractive index in Table 1 represents the refractive index of the bridge wiring portion, and "EL" represents the refractive index of the electrically-insulating layer.

Example 2

In Example 2, a sensor was obtained in the same manner as in Example 1 except that the width W4 of the bridge wiring portion was 0.8 mm.

Example 3

In Example 3, a sensor was obtained in the same manner as in Example 1 except that the width W4 of the bridge wiring portion was 0.35 mm.

Example 4

In Example 4, a sensor was obtained in the same manner as in Example 1 except that the width W4 of the bridge wiring portion was 0.1 mm.

Example 5

First, a polyethylene terephthalate film (tradename "COSMO SHINE (registered trademark) A4100", manufactured by Toyobo Co., Ltd.) having a thickness of 48 μm and having an underlayer on one face thereof as a base material was prepared. A bar coater was used to apply the silver nanowire dispersion liquid 1 to the whole of the untreated surface of this polyethylene terephthalate film. A coating film was thus formed. Subsequently, the coating film formed was subjected to a flow of dry air at 40 °C at a flow rate of 0.5 m/s for 15 seconds, and further subjected to a flow of dry air at 70 °C at a flow rate of 15 m/s for 30 seconds to be dried, whereby the solvent was evaporated from the coating film. In this manner, the silver nanowires were disposed on the whole of the untreated surface of the polyethylene terephthalate film.

After the silver nanowires were disposed, the resin composition 2 was applied using a die coater to cover the silver nanowires. A coating film was thus formed. Subsequently, the coating film formed was subjected to a flow of dry air at 50 °C at a flow rate of 0.5 m/s for 15 seconds, and further subjected to a flow of dry air at 70 °C at a flow rate of 10 m/s for 30 seconds to be dried, whereby the solvent was evaporated from the coating film. The coating film was exposed to ultraviolet light to a cumulative light dose of 100 $mJ/cm^2$ to be cured, whereby a resin portion having a thickness of 100 nm and a refractive index of 1.6 was formed. In this manner, an electroconductive layer containing the resin portion and the silver nanowires was formed.

After the electroconductive layer was formed, a screen printing method was used to apply a silver paste (tradename "DW-520H-14", manufactured by Toyobo Co., Ltd.) to the surface of a resin portion in the region to become the first electroconductive part. Then, the silver paste was heated at 130 °C for 30 minute, whereby the silver paste was cured.

Then, a region other than the region in which the electrical lead-out line portion is to be formed in the cure silver paste and a region other than the regions in which the first electroconductive part and the second electrode portion are to be formed in the electroconductive layer were exposed to a laser light under the below-described conditions to pattern the cured silver paste and the electroconductive layer. In this regard, when the regions other than the region in which the electrical lead-out line portion is to be formed in the cured silver paste was exposed to a laser light, the silver paste present in these other regions was removed through sublimation. In this manner, the electrical lead-out line portion having the same shape and dimensions as the electrical lead-out line portion in Example 1 was formed.

(Laser Light Exposure Conditions)

Type: $YVO_4$
Wavelength: 1064 nm
Pulse width: 8 to 10 ns
Frequency: 100 kHz
Spot diameter: 30 μm
Pulse energy: 16 μJ
Processing speed: 1200 mm/s After the electrical lead-out line portion was formed, a dispenser was used to apply the electrically-insulating layer composition to the region in which the wiring portion is to be formed in the electroconductive layer. A coating film was thus formed. Subsequently, the coating film formed was subjected to a flow of dry air at 50 °C at a flow rate of 0.5 m/s for 15 seconds, and further subjected to a flow of dry air at 70 °C at a flow rate of 10 m/s for seconds to be dried, whereby the solvent was evaporated from the coating film. The coating film was exposed to ultraviolet light to a cumulative light dose of 100 $mJ/cm^2$ to be cured, whereby an electrically-insulating layer having a size of 1 mm×2 mm, a thickness of 500 nm, and a refractive index of 1.50 was formed.

After the electrically-insulating layer was formed, a dispenser capable of discharging the silver nanowire dispersion liquid was used to apply the silver nanowire dispersion liquid 1 in the shape of the bridge wiring portion in the second direction perpendicular to the first direction, wherein the liquid was applied to the region in which the bridge wiring portion is to be formed, and wherein the region was on the three-dimensional surface composed of the surface of the electrically-insulating layer and the surface of the silver nanowire pattern in a region in which the second electrode portion is to be formed. A coating film was thus formed. Subsequently, the coating film formed was subjected to a flow of dry air at 40 °C at a flow rate of 0.5 m/s for seconds, and further subjected to a flow of dry air at 70 °C at a flow rate of m/s for 30 seconds to be dried, whereby the solvent was evaporated from the coating film. In this manner, the silver nanowires were disposed in the region in which the bridge wiring portion is to be formed. A silver nanowire pattern was thus formed.

After the silver nanowires were disposed in the regions in which the bridge wiring portion is to be formed, a die coater was used to apply the resin composition 1 to cover the silver nanowires disposed in the regions in which the first electrode portion, the second electrode portion, and the bridge wiring portion are to be formed. A coating film was thus formed. Subsequently, the coating film formed was subjected to a flow of dry air at 50 °C at a flow rate of 0.5 m/s for 15 seconds, and further subjected to a flow of dry air at at a flow rate of 10 m/s for 30 seconds to be dried, whereby the solvent was evaporated from the coating film. The coating film was exposed to ultraviolet light to a cumulative light dose of 100 $mJ/cm^2$ to be cured, whereby a resin layer having a thickness of 1,000 nm and a refractive index of 1.50 was formed. This afforded a sensor having: the first electroconductive part that had the first electrode portion composed of the resin portion and the silver nanowires disposed in the resin portion, and had the wiring portion; and the second electroconductive part that had the second electrode portion composed of the resin portion and the silver nanowires disposed in the resin portion, and had the bridge wiring portion composed of the resin portion and the silver nanowires disposed in the resin portion.

The first electroconductive part having the first electrode portion and the wiring portion in the sensor according to Example 5 had the same shape and dimensions as the first electroconductive part having the first electrode portion and the wiring portion in Example 1, and in addition, the second electrode portion had the same shape and dimensions as the second electrode portion in Example 1. In addition, the shape of the bridge wiring portion in the sensor according to Example 5 was a strip, and the refractive index of the wiring portion was 1.50. In addition, the width W4 of the bridge wiring portion was 0.5 mm, the length of the bridge wiring portion was 3 mm, and the thickness T3 of the bridge wiring portion was 1 μm.

Example 6

In Example 6, a sensor was obtained in the same manner as in Example 1 except that the following process was used to dispose silver nanowires in the region in which the bridge wiring portion is to be formed. First, a contact dispenser (product name "SuperΣ (registered trademark) CMIII", manufactured by Musashi Engineering, Inc.) was used to discharge the silver nanowire dispersion liquid 1 onto the surface of the electrically-insulating layer through the discharge outlet of the dispenser under the below-described conditions in such a manner that the liquid would have a line thickness of 182 μm during the application. The liquid was thus applied linearly to form a straight-line coating portion.

(Discharge Conditions)

Discharge pressure: 5 kPa
Discharge opening diameter: 100 μm
Coating gap: 50 μm
PET film moving rate: 20 mm/second Subsequently, the coating portion formed was subjected to a flow of dry air at 40 °C at a flow rate of 0.5 m/s for 15 seconds, and further subjected to a flow of dry air at 70 °C at a flow rate of 15 m/s for 30 seconds to be dried, whereby the solvent was evaporated from the coating portion. In this manner, the silver nanowires were disposed in the region in which the bridge wiring portion is to be formed. The bridge wiring portion of the sensor according to Example 6 had the same shape, width W4, and length as the bridge wiring portion according to Example 1.

Example 7

In Example 7, a sensor was obtained in the same manner as in Example 1 except that the following process was used to dispose silver nanowires in the regions in which the first electroconductive part and the second electrode portion are to be formed. First, a flexographic printing method was used to apply a wall portion composition 1 (tradename "U-403B", manufactured by Chemitech Inc.) to both sides of the regions in which a first electroconductive part and a plurality of second electrode portions are to be formed on the untreated side of the polyethylene terephthalate film, wherein the first electroconductive part had a plurality of first electrode portions disposed in a first direction and a wiring portion electrically connecting the first electrode portions adjacent to each other, and wherein the second electrode portions were disposed apart from the first electroconductive part, and disposed in a second direction perpendicular to the first direction. A coating film was thus formed. Then, the coating film formed was subjected to a flow of dry air at 40 °C at a flow rate of 0.5 m/s for 15 seconds, and further subjected to a flow of dry air at 70 °C at a flow rate of 15 m/s for 30 seconds to be dried, whereby the solvent was evaporated from the coating film. Then, the coating film was exposed to an ultraviolet light to a cumulative light dose of 100 $mJ/cm^2$ to be cured, whereby a plurality of electrically insulating wall portions having the shape depicted in FIG. 13 were formed. The width of the wall portion was 30 μm, and the thickness of the wall portion was 1 μm.

After the plurality of wall portions were formed, the silver nanowire dispersion liquid 1 was filled between the wall portions by an ink-jet method to form a coating film. Subsequently, the coating film formed was subjected to a flow of dry air at 40 °C at a flow rate of 0.5 m/s for 15 seconds, and further subjected to a flow of dry air at 70 °C at a flow rate of 15 m/s for 30 seconds to be dried, whereby the solvent was evaporated from the coating film. In this manner, the silver nanowires were disposed in the regions in which the first electroconductive part and the second electrode portion are to be formed on the surface of the polyethylene terephthalate film.

The width of the wall portion was determined as the arithmetic mean of the width values at eight locations obtained by excluding the maximum value and the minimum value from the width values measured at ten locations, wherein the width values measured at the ten locations were randomly selected in a cross-sectional image of the wall portion acquired using a scanning transmission electron microscope (STEM). Specifically, the cross-sectional image was acquired by the following method. First, a sample for observing a cross-section was produced from the sensor. Specifically, a sensor having a size of 2 mm×5 mm was cut out, and placed in a silicone embedding plate, into which an epoxy resin was poured, and the whole sensor was embedded in the resin. Then, the embedding resin was left to stand at 65 °C for 12 hours or more and cured. Subsequently, ultra-thin sections were produced using an ultramicrotome (product name "Ultramicrotome EM UC7", manufactured by Leica Microsystems GmbH) at a feeding rate of 100 nm. The ultra-thin sections produced were collected on collodion-coated meshes (150) to obtain STEM samples. Then, a cross-sectional image of an STEM sample was acquired using a scanning transmission electron microscope (STEM) (product name "S-4800 (Type 2)", manufactured by Hitachi High-Technologies Corporation). The cross-sectional image was acquired by setting the detector switch (signal selection) to "TE", the accelerating voltage to 30 kV, and the emission current to "10 μA". The focus, contrast, and brightness were appropriately adjusted at a magnification of 5000 to 200,000 times, so that each layer could be identified by observation. The magnification is preferably in the range from 10,000 to 50,000 times, more preferably in the range from 25,000 to 40,000 times. An excessively increased magnification causes the interface to have a coarse pixel, and to be difficult to recognize, and thus, the magnification is preferably not increased excessively during the measurement of the thicknesses of the wall portion. The cross-sectional image was acquired by additionally setting the beam monitor aperture to 3 and the objective lens aperture to 3, and also setting the WD to 8 mm.

The thickness of the wall portion was determined as the arithmetic mean of the thickness values at eight locations obtained by excluding the maximum value and the minimum value from the thickness values measured at ten locations, wherein the thickness values measured at the ten locations were randomly selected in a cross-sectional image of the wall portion acquired using a scanning transmission electron microscope (STEM). The cross-sectional image for measuring the thickness of the wall portion was acquired under the same conditions as the cross-sectional image for measuring the width of the wall portion.

The shape and width of each of the first electrode portion, wiring portion, and second electrode portion in the sensor according to Example 7 are the same as the shape and width of each of the first electrode portion, wiring portion, and second electrode portion according to Example 1.

Comparative Example 1

In the case of a sensor according to Comparative Example 1, the sensor was obtained in the same manner as in Example 1 except that a process of disposing the silver nanowire in the region in which the bridge wiring portion is to be formed, and the subsequent processes were performed in the below-described manner. Specifically, a sputtering method was used to form a tin-doped indium oxide (ITO) layer having a film thickness of 30 nm on the surface of the electrically-insulating layer. After the ITO layer was formed, the ITO layer was heated at 150 °C for 30 minutes, whereby the ITO layer was crystallized. Then, the ITO layer was patterned utilizing a photolithography technology. In this manner, a bridge wiring portion that was composed of an ITO having a refractive index of 2.00, and had a width of 0.1 mm, a length of 3 mm, and a film thickness of 30 nm was formed.

After the bridge wiring portion was formed, a die coater was used to apply the resin composition 1 to cover the silver nanowires disposed in the regions in which the first electrode portion and the second electrode portion are to be formed, and cover the bridge wiring portion. A coating film was thus formed. Subsequently, the coating film formed was subjected to a flow of dry air at 50 °C at a flow rate of 0.5 m/s for 15 seconds, and further subjected to a flow of dry air at 70 °C at a flow rate of 10 m/s for 30 seconds to be dried, whereby the solvent was evaporated from the coating film. The coating film was exposed to ultraviolet light to a cumulative light dose of 100 $mJ/cm^2$ to be cured, whereby a resin layer having a thickness of 100 nm and a refractive index of 1.6 was formed. This afforded: a first electroconductive part that had the first electrode portion composed of the resin portion and the silver nanowires disposed in the resin portion, and had the wiring portion; and a second electroconductive part had the second electrode portion composed of the resin portion and the silver nanowires disposed in the resin portion, and had the bridge wiring portion composed of ITO.

Then, the high-refractive-index layer composition 1 was applied to the surface of the resin layer to form a coating film. Then, the coating film formed was dried at 70 °C for 30 seconds, and exposed to an ultraviolet light to a cumulative light dose of 150 $mJ/cm^2$ to be cured, whereby a high-refractive-index layer having a film thickness of 50 nm was formed. Then, the low-refractive-index layer composition 1 was applied to the high-refractive-index layer to form a coating film. Then, this coating film was dried at 70 °C for 30 seconds, and exposed to an ultraviolet light to a cumulative light dose of 150 $mJ/cm^2$ to be cured, whereby a low-refractive-index layer having a film thickness of 20 nm was formed. In this manner, a decreased-reflection layer composed of the high-refractive-index layer having a refractive index of 1.66 and the low-refractive-index layer having a refractive index of 1.48 was formed to obtain a sensor.

Comparative Example 2

In Comparative Example 2, the production of a sensor was attempted in the same manner as in Example 1 except that the silver nanowire dispersion liquid 2 was used in place of the silver nanowire dispersion liquid 1. However, the viscosity of the silver nanowire dispersion liquid 2 was too low, and thus, the silver nanowire dispersion liquid 2 ran down from the three-dimensional surface, failing to form a silver nanowire pattern of the bridge wiring portion.

Comparative Example 3

In Comparative Example 3, the production of a sensor was attempted in the same manner as in Example 1 except that the silver nanowire dispersion liquid 3 was used in place of the silver nanowire dispersion liquid 1. However, the viscosity of the silver nanowire dispersion liquid 3 was too high, and thus, the silver nanowire dispersion liquid 3 was stuck during the discharge of the silver nanowire dispersion liquid 3, failing to form a silver nanowire pattern.

<Evaluation of Flexibility>

(1) Evaluation of Electrical Resistance Value Ratio Between Before and After Foldability Test (FD Test)

For the sensors according to Examples 1 to 7 and Comparative Example 1, a foldability test was performed to evaluate the flexibility. Specifically, rectangular samples 1 and 2 having a size of 125 mm in length×50 mm in width were first cut out of the sensor. Here, the sample 1 was cut out in such a manner that the longitudinal direction of the sample 1 was the first direction, and the sample 2 was cut out in such a manner that the longitudinal direction of the sample 2 was the second direction.

After the samples 1 and 2 were cut out of the sensor, a silver paste (tradename "DW-520H-14", manufactured by Toyobo Co., Ltd.) was applied to an area having a size of 10 mm in length×50 mm in width on each of both longitudinal end portions of the surface of each of the samples 1 and 2, and heated at 130 °C for 30 minutes to provide the cured silver pastes on both end portions. In each of the samples 1 and 2 having the cured silver pastes provided on both end portions, the distance and width for measurement of the electrical resistance value were 105 mm and 50 mm respectively. Then, the cured silver paste was exposed to a laser light under the below-described conditions, and part of the silver paste was removed from the sample 1 as depicted in FIG. 6 in such a manner that the first electroconductive part did not electrically conduct to the second electrode portion, and in addition, part of the silver paste was removed from the sample 2 as depicted in FIG. 7 in such a manner that the second electroconductive part did not electrically conduct to the first electrode portion.

(Laser Light Exposure Conditions)

Type: $YVO_4$

Wavelength: 1064 nm

Pulse width: 8 to 10 ns

Frequency: 100 kHz

Spot diameter: 30 μm

Pulse energy: 16 μJ

Processing speed: 1200 mm/s

The electrical resistance value of each of the samples 1 and 2 was measured using a tester (product name "Digital MΩ Hitester 3454-11", manufactured by Hioki E.E. Corporation). Specifically, because the Digital MΩ Hitester 3454-11 included two probe terminals (a red probe terminal and a black probe terminal; both are pin-type terminals), the red probe terminal was contacted with the portion in contact with the first electroconductive part in the cured silver paste provided on one end portion of the sample 1, and in addition, the black probe terminal was contacted with the portion in contact with the first electroconductive part in the cured silver paste provided on the other end portion of the sample. The electrical resistance value was thus measured. Additionally, the red probe terminal was contacted with the portion in contact with the second electroconductive part in the cured silver paste provided on one end portion of the sample 2, and, the black probe terminal was contacted with the portion in contact with the second electroconductive part in the cured silver paste provided on the other end portion of the sample. The electrical resistance value was thus measured.

Subsequently, the selected sample having the short edges (50 mm) anchored with anchoring members was mounted to a U-shape Folding Test Machine (product name "DLDMLH-FS", manufactured by Yuasa System Co., Ltd.) as a folding endurance testing machine in such a manner that the minimum gap between the two opposite edges was 3 mm (the outer width of the bent part: 3.0 mm), as depicted in FIG. 8(C), and the sample with the electroconductive part facing inward was folded back and then unfolded (a foldability test performed on the sample with the first electroconductive part facing inward and the base material facing outward: an inward foldability test), and the process was repeated 100,000 times under the following conditions.

(Folding Conditions)

Reciprocation rate: 80 rpm (every minute)

Test stroke: 60 mm

Bending angle: 180°

After the foldability test was performed, the electrical resistance value of the first electroconductive part was measured in the sample after the foldability test in the same manner as in the sample before the foldability test, and, the electrical resistance value of the second electroconductive part was also measured. Then, the electrical resistance value ratio, namely the ratio of the electrical resistance value of the sample 1 after the foldability test to the electrical resistance value of the sample 1 before the foldability test (electrical resistance value of sample 1 after foldability test/electrical resistance value of sample 1 before foldability test) was calculated. Additionally, the electrical resistance value ratio, namely the ratio of the electrical resistance value of the sample 2 after the foldability test to the electrical resistance value of the sample 2 before the foldability test (electrical resistance value of sample 2 after foldability test/electrical resistance value of sample 2 before foldability test) was calculated.

Additionally, new samples 1 and 2 cut out of the sensor according to each of Examples 1 to 7 in the same manner as described above were each mounted to the above-described endurance testing machine in the same manner as described above. The sample with the base material facing inward was folded back and then unfolded (a foldability test performed on the sample with the first electroconductive part facing outward and the base material facing inward: an outward foldability test), and the process was repeated 100,000 times. The electrical resistance value of the first electroconductive part of the sample 1 after the foldability test was measured in the same manner, and the electrical resistance value ratio was calculated. Additionally, the electrical resistance value of the second electroconductive part of the sample 2 after the foldability test was measured, and the electrical resistance value ratio was calculated. Then, the results of the foldability tests were evaluated on the basis of the following evaluation criteria. In this regard, the electrical resistance value ratio was determined as the arithmetic mean of three electrical resistance value ratios obtained by excluding the maximum value and the minimum value from five electrical resistance value ratios, wherein the ratio was measured five times at different locations.

A: the electrical resistance value ratio was 1.5 or less in any of the foldability tests.

B: the electrical resistance value ratio was more than 1.5 and 3 or less in any of the foldability tests.

C: the electrical resistance value ratio was more than 3 in any of the foldability tests.

(2) Evaluation of Crease after Foldability Test

In the sensor according to each of Examples 1 to 7, the appearance was observed after the foldability test to evaluate whether any crease was formed at the bent part of each sensor. The foldability test was performed by the method described in the section on the evaluation of the electrical resistance value ratio between before and after the foldability test. A crease was visually observed in an environment at a temperature of 23 °C and a relative humidity of 50%. In observing such a crease, the bent part was uniformly observed with transmitted light and reflected light under white illumination (at 800 lux to 2000 lux) in a bright room, and both the portion corresponding to the internal side and the portion corresponding to the external side at the bent part after folding were observed. In order that the position to be observed could be easily known in observing the crease, a sample before the foldability test was placed between the anchoring members of an endurance testing machine, and folded once, and a permanent marker or the like was used to put, on both ends, marks indicating the bent part, as depicted in FIG. 8, wherein both the ends were positioned in the direction along the bent part and perpendicular to the folding direction. After the foldability test, a permanent marker was used to draw a line connecting the marks on both the ends of the bent part, with the sample removed from the endurance testing machine after the foldability test. Then, in observing the crease, the whole bent part, which was a region formed by the marks for both the ends of the bent part and the lines connecting the marks, was observed visually. When the region to become a bent part in the sensor before the foldability test was observed, no crease was found. The evaluation criteria were as below-described.

A: no crease was observed in the sensor after any of the foldability tests.

B: a slight crease(s) was/were observed in the sensor after any of the foldability tests, but at a level which was not problematic for practical use.

C: a crease(s) was/were clearly observed in the sensor after any of the foldability tests.

(3) Evaluation of Microcrack (MC) after Foldability Test

In the sensor according to each of Examples 1 to 7, the appearance was observed after the foldability test to evaluate whether any microcrack was formed at the bent part of each sensor. The foldability test was performed by the method described in the section on the evaluation of the electrical resistance value ratio between before and after the foldability test. The microcracks were observed using a digital microscope (product name "VHX-5000", manufactured by Keyence Corporation) in an environment at a temperature of 23 °C and a relative humidity of 50%. Specifically, the sample after the foldability test was first spread slowly, and the sample was fixed with a tape to the stage of a microscope. In cases where the crease was persistent, the portion to be observed was made as flat as possible. However, the region to be observed (the bent part) at and around the center of the sample was not touched with a hand and handled to a degree to which no force was applied. Then, both the portion corresponding to the internal side and the portion corresponding to the external side after folding were observed. The microcracks were observed at a magnification of 200 times in reflected light under dark field conditions using ring lighting selected as the light source for the digital microscope. In order that the position to be observed could be easily known in observing the microcracks, a sample before the foldability test was placed between the anchoring members of an endurance testing machine, and folded once, and a permanent marker or the like was used to put, on both ends, marks indicating the bent part, as depicted in FIG. 9, wherein both the ends were positioned in the direction along the bent part and perpendicular to the folding direction. After the foldability test, a permanent marker was used to draw a line connecting the marks on both the ends of the bent part, with the sample removed from the endurance testing machine after the foldability test. In observing the microcracks, the microscope was set in such a manner that the center of the field-of-view range of the microscope was aligned with the center of the bent part. When the region to become a bent part in the sensor before the foldability test was observed, no microcrack was found. The evaluation criteria were as below-described.

A: no microcrack was observed in the sensor after any of the foldability tests.

B: a slight microcrack(s) was/were observed in the sensor after any of the foldability tests, but at a level which was not problematic for practical use.

C: a microcrack(s) was/were clearly observed in the sensor after any of the foldability tests.

<Evaluation of Visibility of Bridge Wiring Portion>

Whether the shape of the bridge wiring portion was visible was evaluated about the sensor according to each of Examples 1 to 7 and Comparative Example 1. Specifically, a sample having a size of 100 mm×100 mm was first cut out of the sensor. Then, this sample was disposed with the bridge wiring portion side upward in an indoor environment at 1200 Lux. Whether the shape of the bridge wiring portion was visible was evaluated by visual observation under a white LED lamp (model number "Reach-18A", manufactured by Prime Star Co., Ltd.). The visual observation was performed at all angles (−180° to 180°), assuming that the normal direction of the sensor was a criterion (0°). The observers were 15 persons. In cases where all the observers visually recognized the shape of the bridge wiring portion, the judgment was that the shape of the bridge wiring portion was visible. The evaluation criteria were as described below.

A: the shape of the bridge wiring portion was not visible.

B: the shape of the bridge wiring portion was visible.

<Measurement of Haze Value>

For the sensor of each of Examples 1 to 7 and Comparative Example 1, the haze value (total haze value) of the sensor was measured using a haze meter (product name "HM-150", manufactured by Murakami Color Research Laboratory Co., Ltd.) in accordance with JIS K7136: 2000 in an environment at a temperature of 23 °C and a relative humidity of 50%. The haze value is a value obtained by measuring the whole sensor. A sample having a size of mm×100 mm was cut out of the sensor, and the sample without any curl or wrinkle and without any dirt such as fingerprints or grime was then placed for measurement in such a manner that the first electroconductive part side was not the light source side. The haze value was determined as the arithmetic mean of three haze values obtained by excluding the maximum value and the minimum value from five haze values, wherein the haze value was measured five times per sample.

<Evaluation of Arrangement of Silver Nanowires>

Whether the silver nanowires of the bridge wiring portion in the sensor according to each of Examples 1 and 6 were arranged along the second direction was evaluated. Specifically, a sample having a size of 5 mm×5 mm was first cut out of the sensor. Then, ten images of the bridge wiring portion in the sample were acquired at 1000 times to 6000 times using the SEM function of a scanning transmission electron microscope (product name "S-4800 (TYPE 2)", manufactured by Hitachi High-Technologies Corporation). Then, from each image of the bridge wiring portion, the orientation angle and orientation strength were calculated using the above-mentioned surface fiber orientation analysis program (V. 8.03). Then, in cases where the orientation angle of the silver nanowires was within 0°±10° in the bridge wiring portion, and where the orientation strength was 1.2 or more, the silver nanowires were regarded as arranged in the second direction. In cases where the orientation angle was within 0°±10°, but where the orientation strength was less than 1.2, in cases where the orientation strength was 1.2 or more, but where the orientation angle was more than 0°±10°, or in cases where the orientation angle was out of 0°±10°, and where the orientation strength was less than 1.2, the silver nanowires were regarded as not arranged in the direction in which the bridge wiring portion extended. The evaluation criteria were as described below.

A: the silver nanowires in the bridge wiring portion were arranged along the second direction.

B: the silver nanowires in the bridge wiring portion were not arranged along the second direction.

<Evaluation of Electrical Short-Circuit>

For the sensor according to each of Examples 1 and 7, the electrical short-circuit was evaluated. Specifically, samples having a size of 50 mm×mm were first cut out of the sensor, one each along the first direction and along the second direction. Then, a tester (product name "Digital MO Hitester 3454-11", manufactured by Hioki E.E. Corporation) was used to evaluate whether an electrical current flowed between the first electroconductive part and the second electroconductive part adjacent to the first electroconductive part. Thereafter, a durability test was performed in which a voltage of 32 V was applied to the first electroconductive part of the sample for 100 hours in an environment at 65 °C and a relative humidity of 95%. After the durability test, a tester (product name "Digital MΩ Hitester 3454-11", manufactured by Hioki E.E. Corporation) was used to evaluate whether an electrical current flowed between the first electroconductive part and the second electroconductive part adjacent to the first electroconductive part, and to thereby evaluate whether any electrical short-circuit was therebetween. The evaluation criteria were as described below.

A: no electrical current flowed between the first electroconductive part and the second electroconductive part not only before the durability test but also after the durability test.

B: no electrical current flowed between the first electroconductive part and the second electroconductive part before the durability test, and a slight electrical current flowed between the first electroconductive part and the second electroconductive part after the durability test, but at a level which was not problematic for practical use.

C: no electrical current flowed between the first electroconductive part and the second electroconductive part before the durability test, but an electrical current flowed between the first electroconductive part and the second electroconductive part after the durability test.

<Evaluation of Conformity to Three-Dimensional Surface>

In Examples 1 to 7, whether the silver nanowire pattern of the bridge wiring portion was in conformity to the three-dimensional surface composed of the surface of the electrically-insulating layer and the surface of the silver nanowire pattern of the second electrode portion was evaluated. The evaluation of conformity was determined from a cross-sectional image acquired using a scanning transmission electron microscope (STEM), and from the measurement of the line resistance value. Specifically, in cases where the silver nanowire pattern of the bridge wiring portion was along the three-dimensional surface, and where the line resistance value was 1,000,000Ω or less, the silver nanowire pattern of the bridge wiring portion was regarded as being in conformity to the three-dimensional surface. In cases where the silver nanowire pattern of the bridge wiring portion was not along the three-dimensional surface, or where the line resistance value was more than 1,000,000Ω, the silver nanowire pattern of the bridge wiring portion was regarded as being not in conformity to the three-dimensional surface. Whether the silver nanowire pattern of the bridge wiring portion was along the three-dimensional surface was determined from a cross-sectional image acquired using a scanning transmission electron microscope (STEM). The conditions for acquiring a cross-sectional image using a scanning transmission electron microscope were the same as the conditions for acquiring a cross-sectional image described in Example 1. To measure the line resistance value, the same sample as in the foldability test was first produced. After the sample was obtained, the probe terminals of a tester (product name "Digital MΩ Hitester 3454-11", manufactured by Hioki E.E. Corporation) were contacted with the cured silver paste in an environment at a temperature of 23 °C and a relative humidity of 50% to measure the resistance value. Specifically, the Digital MΩ Hitester 3454-11 included two probe terminals (a red probe terminal and a black probe terminal, which were both pin-type terminals). The red probe terminal was contacted with one portion of the cured silver paste, wherein the portion was in contact with the bridge wiring portion. The black probe terminal was contacted with the other portion of the cured silver paste, wherein the other portion was in contact with the bridge wiring portion. The resistance value was thus measured. Then, the line resistance value of the bridge wiring portion was determined from the above-described equation (2). The evaluation criteria were as described below.

A: the silver nanowire pattern of the bridge wiring portion was in conformity to the three-dimensional surface.

B: the silver nanowire pattern of the bridge wiring portion was not in conformity to the three-dimensional surface.

<Evaluation of Static Electricity>

The static electricity of the bridge wiring portion of the sensor according to each of Examples 1 to 7 was evaluated. Specifically, five samples having a size o 10 mm×150 mm and containing the bridge wiring portion were cut out of the sensor, and then, 2 kV was applied to the bridge wiring portion of each sample using an electron gun to evaluate whether the bridge wiring portion was broken. The evaluation criteria were as described below.

A: no sample had any broken wiring.

B: one to four samples had no broken wiring.

C: all five samples had any broken wiring.

<Measurement of Average Fiber Diameter of Silver Nanowires of Bridge Wiring Portion in Sensor>

For the sensor of each of Examples 1 to 7, the average fiber diameter of the silver nanowires contained in the bridge wiring portion was measured, using a scanning transmission electron microscope (STEM, product name "S-4800", manufactured by Hitachi High-Technologies Corporation). Specifically, a sample having a size of 1 mm×10 mm and containing the bridge wiring portion was first cut out of the sensor, and placed in a silicone embedding plate, into which an epoxy resin was poured, and the whole sample was embedded in the resin. Then, the embedding resin was left to stand at 25 °C for 12 hours or more and cured. Subsequently, ultra-thin sections were produced using an ultramicrotome (product name "Ultramicrotome EM UC7", manufactured by Leica Microsystems GmbH) at a feeding rate of 100 nm. The ultra-thin sections produced were collected on collodion-coated meshes (150) to obtain STEM samples. Then, a cross-sectional image of an STEM sample was acquired using a scanning transmission electron microscope (STEM) (product name "S-4800 (Type 2)", manufactured by Hitachi High-Technologies Corporation). The cross-sectional image was acquired by setting the detector switch (signal selection) to "TE", the accelerating voltage to 30 kV, and the emission current to "10 μA". The focus, contrast, and brightness were appropriately adjusted at a magnification of 5,000 to 200,000 times so that each layer could be identified. The cross-sectional image was acquired by additionally setting the beam monitor aperture to 3 and the objective lens aperture to 3, and also setting the WD to 8 mm. Then, ten silver nanowires contained in the bridge wiring portion were observed in the cross-sectional image acquired, the shortest diameter (minor axis) of each silver nanowire was measured, the smallest three data were selected from the ten data, the three data were used to determine the arithmetic mean value, and the arithmetic mean value was regarded as the average fiber diameter of the silver nanowires.

<Evaluation of Uneven Distribution>

In the sensor according to each of Examples 1 to 7, whether the silver nanowires as a whole in the bridge wiring portion were unevenly distributed in the bridge wiring portion from the half-thickness position of the bridge wiring portion to the polyethylene terephthalate film was examined. Specifically, a sample for observing a cross-section was first produced from the sensor. More specifically, a sample having a size of 2 mm×5 mm and containing the bridge wiring portion was cut out of the sensor, and placed in a silicone embedding plate, into which an epoxy resin was poured, and the whole sample was embedded in the resin. Then, the embedding resin was left to stand at 65 °C for 12 hours or more and cured. Subsequently, ultra-thin sections were produced using an ultramicrotome (product name "Ultramicrotome EM UC7", manufactured by Leica Microsystems GmbH) at a feeding rate of 100 nm. The ultra-thin sections produced were collected on collodion-coated meshes (150 meshes) to obtain STEM samples. Then, a cross-sectional image of an STEM sample was acquired using a scanning transmission electron microscope (STEM) (product name "S-4800 (Type 2)", manufactured by Hitachi High-Technologies Corporation). The cross-sectional image was acquired under STEM at a magnification of 25,000 to times by setting the detector switch (signal selection) to "TE", the accelerating voltage to "30 kV", and the emission current to "10 μA", and appropriately adjusting the focus, contrast, and brightness so that each layer could be identified. The cross-sectional image was acquired by additionally setting the beam monitor aperture to "3" and the objective lens aperture to "3", and also setting the WD to "8" mm. Then, the cross-sectional images at ten locations acquired as described above were prepared. Next, each cross-sectional image was enlarged to the pixel resolution, and the number of pixels covering the silver nanowires distributed from the above-described half-thickness position of the bridge wiring portion to the polyethylene terephthalate film and the number of pixels covering the silver nanowires distributed from the half-thickness position of the bridge wiring portion to the surface of the bridge wiring portion were counted in each cross-sectional image to determine the ratio of the number of pixels covering the silver nanowires distributed from the half-thickness position to the polyethylene terephthalate film relative to the total number of pixels covering all the silver nanowires. In this respect, for the pixels covering silver nanowires, each pixel straddling the above-described half-thickness position were divided into the portion ranging from the half-thickness position to the polyethylene terephthalate film and the portion ranging from the position to the surface of the bridge wiring portion, to divide one pixel based on the area ratio between the divided portions. Then, the ratio determined from each cross-sectional image was determined as the abundance of silver nanowires distributed from the half-thickness position of the bridge wiring portion to the polyethylene terephthalate film, and the arithmetic mean of the abundance values determined from the cross-sectional images was calculated. In cases where the arithmetic mean was 55% or more, the silver nanowires were determined to be unevenly distributed toward the polyethylene terephthalate film. The evaluation criteria were as described below.

A: silver nanowires were unevenly distributed from the half-thickness position of the bridge wiring portion to the polyethylene terephthalate film.

B: silver nanowires were not unevenly distributed from the half-thickness position of the bridge wiring portion to the polyethylene terephthalate film.

The results are shown in Table 1 and Table 2 below. In this regard, the results of the electrical resistance value ratios shown in Table 1 are those obtained by performing the inward foldability tests, and the results of the electrical resistance value ratios shown in Table 2 are those obtained by performing of the outward foldability tests.

TABLE 1

| | Flexibility Electrical Resistance Value | Evaluation of Visibility | Haze Value (%) | Difference in Refractive Index (\|BW − EL\|) |
|---|---|---|---|---|
| Example 1 | A | A | 1.0 | 0.00 |
| Example 2 | A | A | 1.1 | 0.00 |
| Example 3 | A | A | 1.0 | 0.00 |
| Example 4 | A | A | 1.0 | 0.00 |
| Example 5 | A | A | 1.0 | 0.00 |
| Example 6 | A | A | 1.2 | 0.00 |
| Example 7 | A | A | 1.0 | 0.00 |
| Comparative Example 1 | C | C | 0.6 | 0.50 |

TABLE 2

| | Flexibility | | | Evaluation of Arrangement | Evaluation of | Evaluation of Conformity | | Average Fiber Diameter of | Evaluation |
|---|---|---|---|---|---|---|---|---|---|
| | Electrical Resistance Value | Crease | MC | of Silver Nanowires | Electrical Short-circuit | to Three-dimensional Surface | Evaluation of Static Electricity | Silver Nanowire (nm) | of Uneven Distribution |
| Example 1 | A | A | A | B | B | A | A | 19 | A |
| Example 2 | A | A | A | — | — | A | A | 19 | A |
| Example 3 | A | A | A | — | — | A | A | 19 | A |
| Example 4 | A | A | A | — | — | A | C | 19 | A |
| Example 5 | A | A | A | — | — | A | A | 19 | A |
| Example 6 | A | A | A | A | — | A | A | 19 | A |
| Example 7 | A | A | A | — | A | A | A | 19 | A |

As illustrated in Table 1, the sensor according to Comparative Example 1 had the bridge wiring portion constituted by ITO, and thus, had poor flexibility. In contrast to this, the sensors according to Examples 1 to 7 had the bridge wiring portion containing the resin portion besides the silver nanowires, and thus, the evaluations of flexibility and visibility were excellent.

As illustrated in Table 2, the sensor according to Example 6 had the bridge wiring portion having the silver nanowires arranged along the second direction, and thus, had a low electrical resistance value than in Example 1. This makes it possible to decrease the silver nanowires from the bridge wiring portion in the sensor according to Example 6, thus making it possible to achieve a desired line resistance value and surface resistance value, and to attempt cost reduction.

As illustrated in Table 2, the sensor according to Example 4 had the bridge wiring portion having a width of less than 0.35 mm, and thus, the bridge wiring portion was broken under a static electricity of 2 kV. In contrast to this, the sensor according to each of Examples 1 to 3 and 5 to 7 had the bridge wiring portion having a width of 0.35 mm or more, and thus, the bridge wiring portion was not broken under the above-mentioned static electricity.

As illustrated in Table 2, the sensor according to Example 1 achieved a slight electrical current between the first electroconductive part and the second electroconductive part after the durability test. This is considered to be because the silver ions of the first electrode portion and the second electrode portion migrated owing to the durability test, and precipitated from the first electrode portion and the second electrode portion. In contrast to this, the sensor according to Example 7 had the electrically insulating wall portion formed between the first electrode portion and the second electrode portion, and thus, caused no electrical current between the electroconductive parts before and after the durability test, generating no electrical short-circuit. This is considered to be because, even in cases where the silver ions of the electroconductive part migrated owing to the durability test, and where the silver ions thus precipitated from the first electrode portion and the second electrode portion, the silver ions were blocked by the wall portion.

LIST OF REFERENCE NUMERALS

10: Sensor
11: Base Material
11A: Surface
12: First Electroconductive Part
12A: First Electrode Portion
12B: Wiring Portion
13: Second Electroconductive Part
13A: Second Electrode Portion
13B: Bridge Wiring Portion
17; Resin layer
17A, 17B: Resin Portion
18A, 18B: Electroconductive Fibers
100, 110, 130: Electric Conductor
101: Three-dimensional Object
101A, 131A: Three-dimensional Surface
102, 132 . . . Electroconductive part
102A, 132A: Electroconductive Fiber Pattern

The invention claimed is:

1. An electric conductor comprising:
a three-dimensional object having a three-dimensional surface; and
an electroconductive part provided on the three-dimensional surface and containing a first electroconductive fiber pattern composed of a plurality of electroconductive fibers and in conformity to the shape of the three-dimensional surface; wherein
the three-dimensional object comprises:
a base material;
a plurality of first electrode portions provided on a first face side of the base material and disposed in a first direction;
a wiring portion electrically connecting the first electrode portions adjacent to each other;
second electroconductive fiber patterns provided on the first face side of the base material, disposed apart from the first electrode portion, disposed in a second direction intersecting with the first direction, and composed of a plurality of electroconductive fibers; and
an electrically-insulating layer provided on the wiring portion;
the three-dimensional surface is constituted by the surface of the electrically-insulating layer and the surface of the second electroconductive fiber patterns;
the first electroconductive fiber pattern is formed on the adjacent surfaces of the second electroconductive fiber patterns and on the surface of the electrically-insulating layer between the second electroconductive fiber patterns in such a manner that the first electroconductive fiber pattern straddles the wiring portion, and electrically connects the second electroconductive fiber patterns adjacent to each other;
the three-dimensional surface has a curved face or a step of 50 μm or more in height, and
the first electroconductive fiber pattern has a width of 0.35 mm or more and 5.0 mm or less.

2. A sensor comprising the electric conductor according to claim 1.

3. An article comprising the sensor according to claim 2.

4. The article according to claim 3, wherein the article is an image display device.

5. The electric conductor according to claim 1, wherein the second electroconductive fiber patterns are formed on the same surface as the surface on which the wiring portion is formed.

6. The electric conductor according to claim 1, wherein the wiring portion is located between the second electroconductive fiber patterns.

* * * * *